US009846623B2

(12) United States Patent
Jennings et al.

(10) Patent No.: US 9,846,623 B2
(45) Date of Patent: Dec. 19, 2017

(54) SIMULTANEOUS MULTI-PROCESSOR APPARATUS APPLICABLE TO ACHEIVING EXASCALE PERFORMANCE FOR ALGORITHMS AND PROGRAM SYSTEMS

(71) Applicant: QSigma, Inc., Sunnyvale, CA (US)

(72) Inventors: Earle Jennings, Somerset, CA (US); George Landers, Tigard, OR (US)

( * ) Notice: Subject to any disclaimer, the term of this patent is extended or adjusted under 35 U.S.C. 154(b) by 0 days.

(21) Appl. No.: 15/141,031

(22) Filed: Apr. 28, 2016

(65) Prior Publication Data

US 2017/0052857 A1    Feb. 23, 2017

Related U.S. Application Data

(60) Provisional application No. 62/207,432, filed on Aug. 20, 2015, provisional application No. 62/233,547, (Continued)

(51) Int. Cl.
*G06F 11/00* (2006.01)
*G06F 11/20* (2006.01)
(Continued)

(52) U.S. Cl.
CPC ...... *G06F 11/2028* (2013.01); *G06F 11/1443* (2013.01); *G06F 11/1625* (2013.01); *G06F 11/1679* (2013.01)

(58) Field of Classification Search
CPC ............. G06F 11/1443; G06F 11/1625; G06F 11/1679; G06F 11/2002; G06F 11/2028; H04L 45/28; H04L 41/0654
See application file for complete search history.

(56) References Cited

U.S. PATENT DOCUMENTS 5,349,654 A  *  9/1994  Bond ...................... G06F 11/08
                                                  714/4.5
5,657,263 A     8/1997  Lloyd et al.
                        (Continued)

FOREIGN PATENT DOCUMENTS

WO    WO2004042599 A1    5/2004

OTHER PUBLICATIONS

Beausoleil, etal,"A Nanophotonic Interconnect for High-Performance Many-Core Computation", published 2008.
(Continued)

*Primary Examiner* — Marc Duncan
(74) *Attorney, Agent, or Firm* — Earle Jennings

(57) ABSTRACT

Apparatus adapted for exascale computers are disclosed. The apparatus includes, but is not limited to at least one of: a system, data processor chip (DPC), Landing module (LM), chips including LM, anticipator chips, simultaneous multi-processor (SMP) cores, SMP channel (SMPC) cores, channels, bundles of channels, printed circuit boards (PCB) including bundles, floating point adders, accumulation managers, QUAD Link Anticipating Memory (QUADLAM), communication networks extended by coupling links of QUADLAM, log 2 calculators, exp2 calculators, log ALU, Non-Linear Accelerator (NLA), and stairways. Methods of algorithm and program development, verification and debugging are also disclosed. Collectively, embodiments of these elements disclose a class of supercomputers that obsolete Amdahl's Law, providing cabinets of petaflop performance and systems that may meet or exceed an exaflop of performance for Block LU Decomposition (Linpack).

13 Claims, 60 Drawing Sheets

Related U.S. Application Data filed on Sep. 28, 2015, provisional application No. 62/243,885, filed on Oct. 20, 2015, provisional application No. 62/261,836, filed on Dec. 1, 2015, provisional application No. 62/328,470, filed on Apr. 27, 2016.

(51) Int. Cl.
*G06F 11/14* (2006.01)
*G06F 11/16* (2006.01)

(56) References Cited

U.S. PATENT DOCUMENTS

| | | | |
|---|---|---|---|
| 5,682,544 A | 10/1997 | Pechanek et al. | |
| 6,675,187 B1 | 1/2004 | Greenberger | |
| 7,613,958 B2* | 11/2009 | Lesartre | H03M 13/11 |
| | | | 714/701 |
| 8,250,133 B2* | 8/2012 | Blumrich | G06F 9/52 |
| | | | 709/201 |
| 9,081,501 B2* | 7/2015 | Asaad | G06F 15/76 |
| 9,477,564 B2* | 10/2016 | Swanson | G06F 11/2033 |
| 2005/0160328 A1* | 7/2005 | Lesartre | H04L 1/245 |
| | | | 714/48 |
| 2012/0119795 A1 | 5/2012 | Bresniker et al. | |
| 2014/0304462 A1 | 10/2014 | Venugopal et al. | |
| 2016/0012004 A1* | 1/2016 | Arimilli | G06F 13/4027 |
| | | | 710/306 |

OTHER PUBLICATIONS

Lucas, et al., "Top Ten Exascale Research Challenges", Feb. 10, 2014, US DOE Office of Science, Office of Advanced Scientific Computing Research.

Earle Jennings, "Breaking Amdahl's Law by Changing the Execution Architecture", (c) 2010, published on the www.qsigmainc.com.

Earle Jennings, "Introduction to an Integrated Exascale Computing Architecture", Dec. 2014, published on www.qsigmainc.com.

* cited by examiner

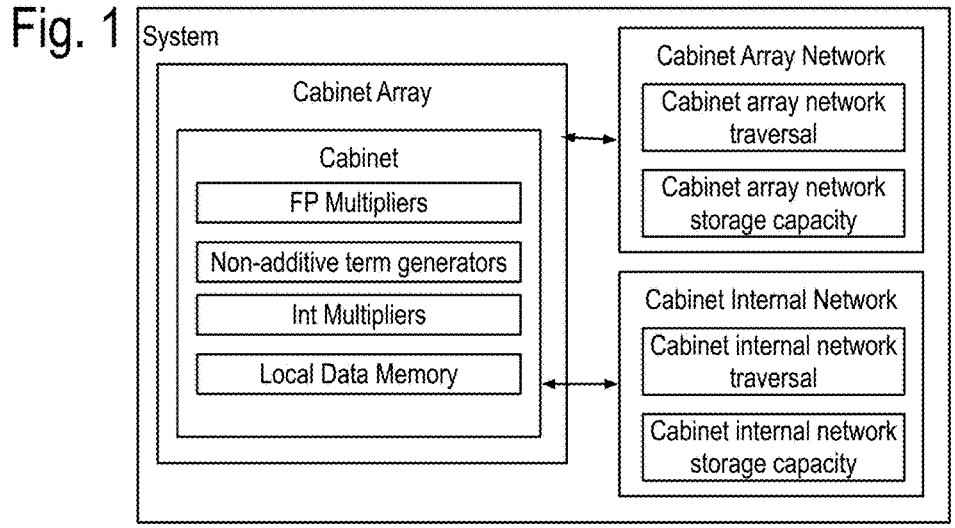
Fig. 1
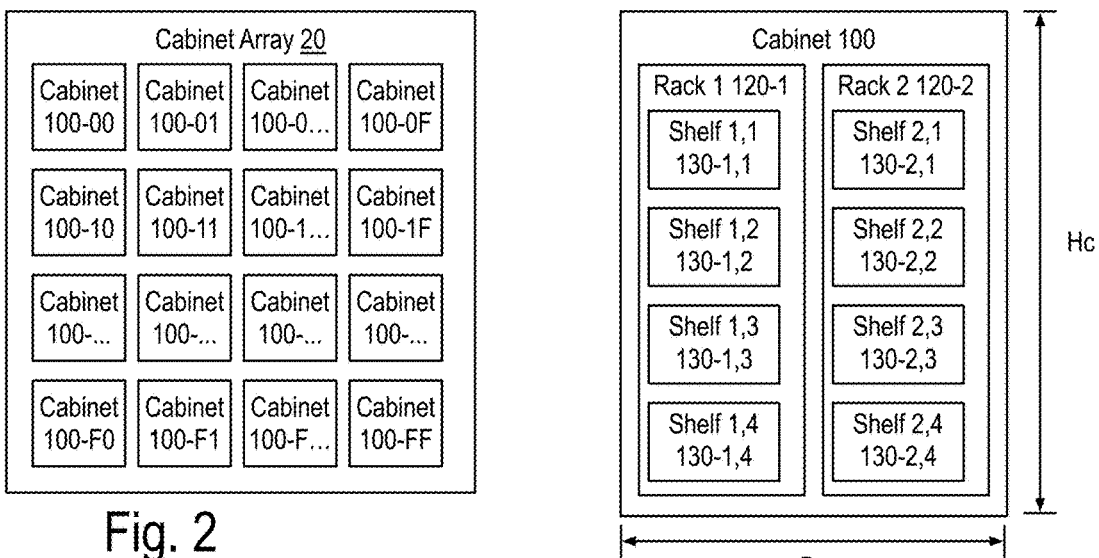
Fig. 2
Fig. 3
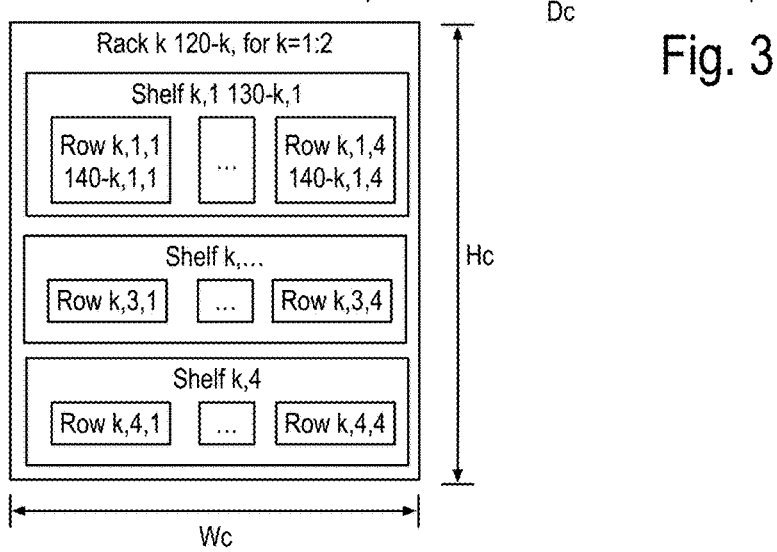
Fig. 4

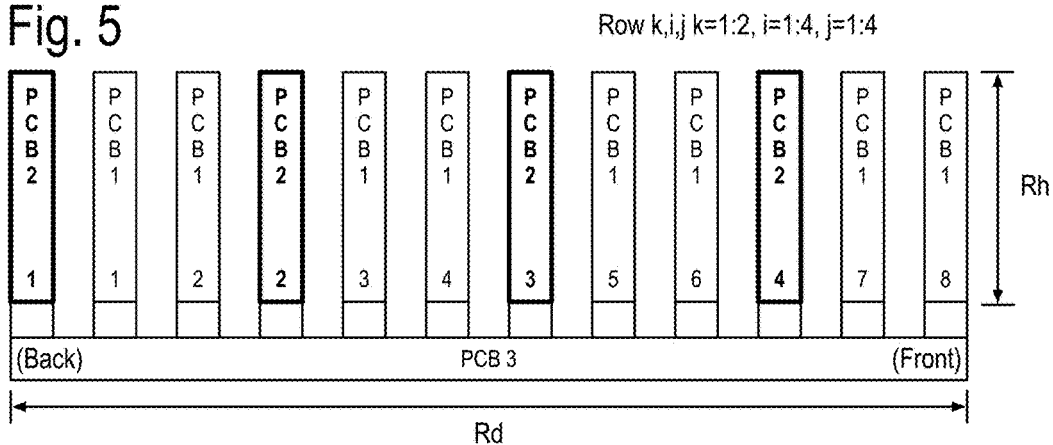
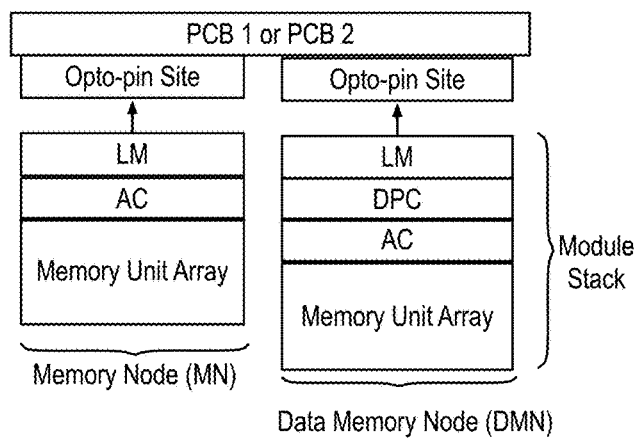
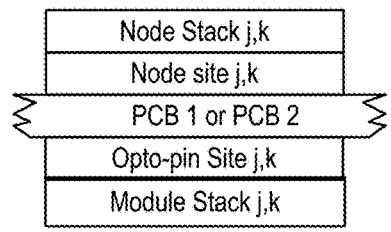
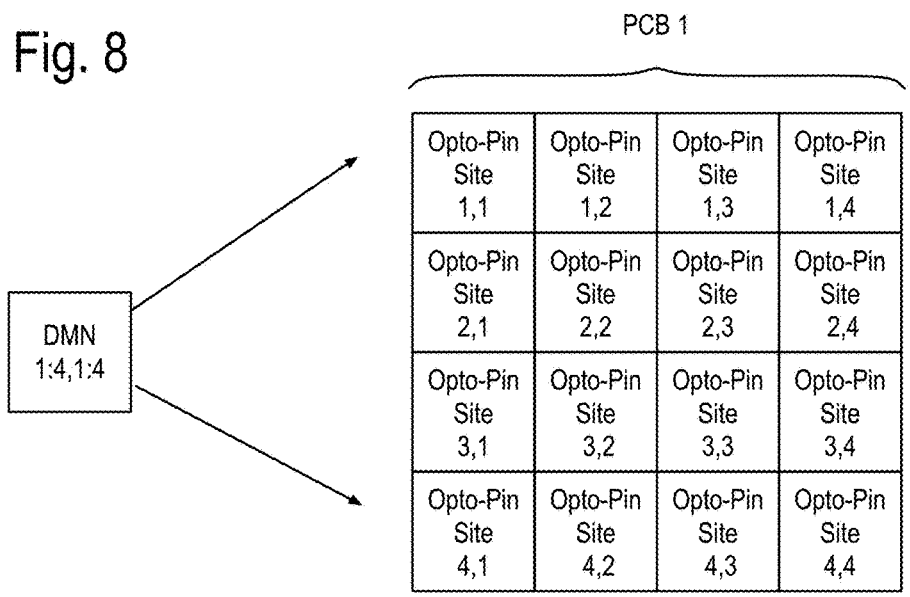

Fig. 11

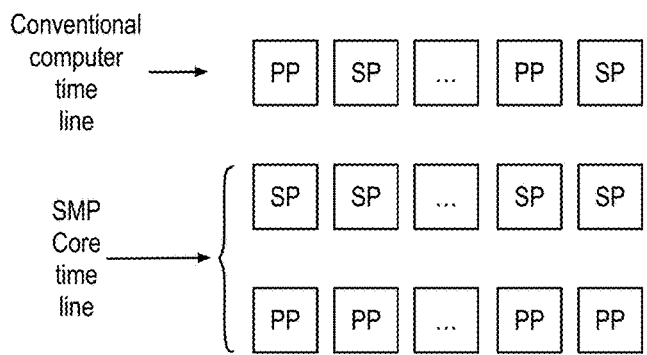

Fig. 12

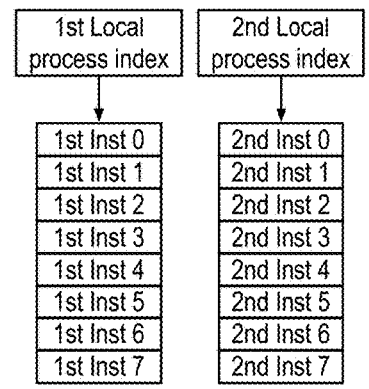

Fig. 13

| 1st Inst 0 | 2nd Inst 0 | 1st inst 2 | 2nd Inst 0 | 1st inst 4 | 2nd Inst 0 | 1st inst 6 | 2nd Inst 0 |
|---|---|---|---|---|---|---|---|
| 1st Inst 0 | 2nd Inst 1 | 1st inst 2 | 2nd Inst 1 | 1st inst 4 | 2nd Inst 1 | 1st inst 6 | 2nd Inst 1 |
| 1st Inst 0 | 2nd Inst 2 | 1st inst 2 | 2nd Inst 2 | 1st inst 4 | 2nd Inst 2 | 1st inst 6 | 2nd Inst 2 |
| 1st Inst 0 | 2nd Inst 3 | 1st inst 2 | 2nd Inst 3 | 1st inst 4 | 2nd Inst 3 | 1st inst 6 | 2nd Inst 3 |
| 1st Inst 0 | 2nd Inst 4 | 1st inst 2 | 2nd Inst 4 | 1st inst 4 | 2nd Inst 4 | 1st inst 6 | 2nd Inst 4 |
| 1st Inst 0 | 2nd Inst 5 | 1st inst 2 | 2nd Inst 5 | 1st inst 4 | 2nd Inst 5 | 1st inst 6 | 2nd Inst 5 |
| 1st Inst 0 | 2nd Inst 6 | 1st inst 2 | 2nd Inst 6 | 1st inst 4 | 2nd Inst 6 | 1st inst 6 | 2nd Inst 6 |
| 1st Inst 0 | 2nd Inst 7 | 1st inst 2 | 2nd Inst 7 | 1st inst 4 | 2nd Inst 7 | 1st inst 6 | 2nd Inst 7 |

| 1st inst 1 | 2nd Inst 0 | 1st inst 3 | 2nd Inst 0 | 1st inst 5 | 2nd Inst 0 | 1st inst 7 | 2nd Inst 0 |
|---|---|---|---|---|---|---|---|
| 1st inst 1 | 2nd Inst 1 | 1st inst 3 | 2nd Inst 1 | 1st inst 5 | 2nd Inst 1 | 1st inst 7 | 2nd Inst 1 |
| 1st inst 1 | 2nd Inst 2 | 1st inst 3 | 2nd Inst 2 | 1st inst 5 | 2nd Inst 2 | 1st inst 7 | 2nd Inst 2 |
| 1st inst 1 | 2nd Inst 3 | 1st inst 3 | 2nd Inst 3 | 1st inst 5 | 2nd Inst 3 | 1st inst 7 | 2nd Inst 3 |
| 1st inst 1 | 2nd Inst 4 | 1st inst 3 | 2nd Inst 4 | 1st inst 5 | 2nd Inst 4 | 1st inst 7 | 2nd Inst 4 |
| 1st inst 1 | 2nd Inst 5 | 1st inst 3 | 2nd Inst 5 | 1st inst 5 | 2nd Inst 5 | 1st inst 7 | 2nd Inst 5 |
| 1st inst 1 | 2nd Inst 6 | 1st inst 3 | 2nd Inst 6 | 1st inst 5 | 2nd Inst 6 | 1st inst 7 | 2nd Inst 6 |
| 1st inst 1 | 2nd Inst 7 | 1st inst 3 | 2nd Inst 7 | 1st inst 5 | 2nd Inst 7 | 1st inst 7 | 2nd Inst 7 |

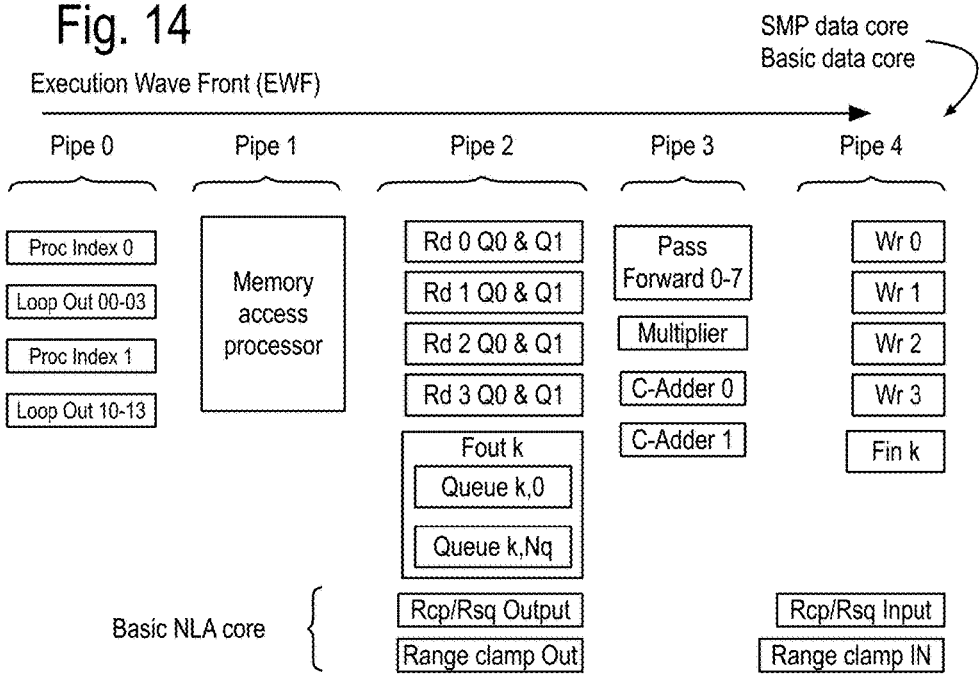
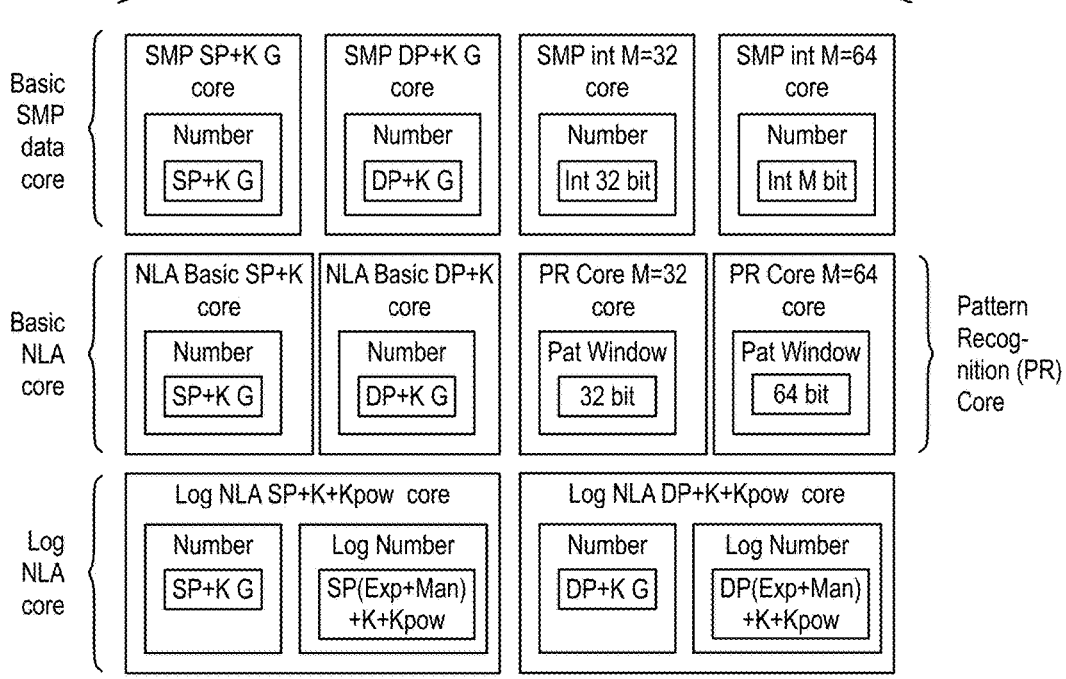

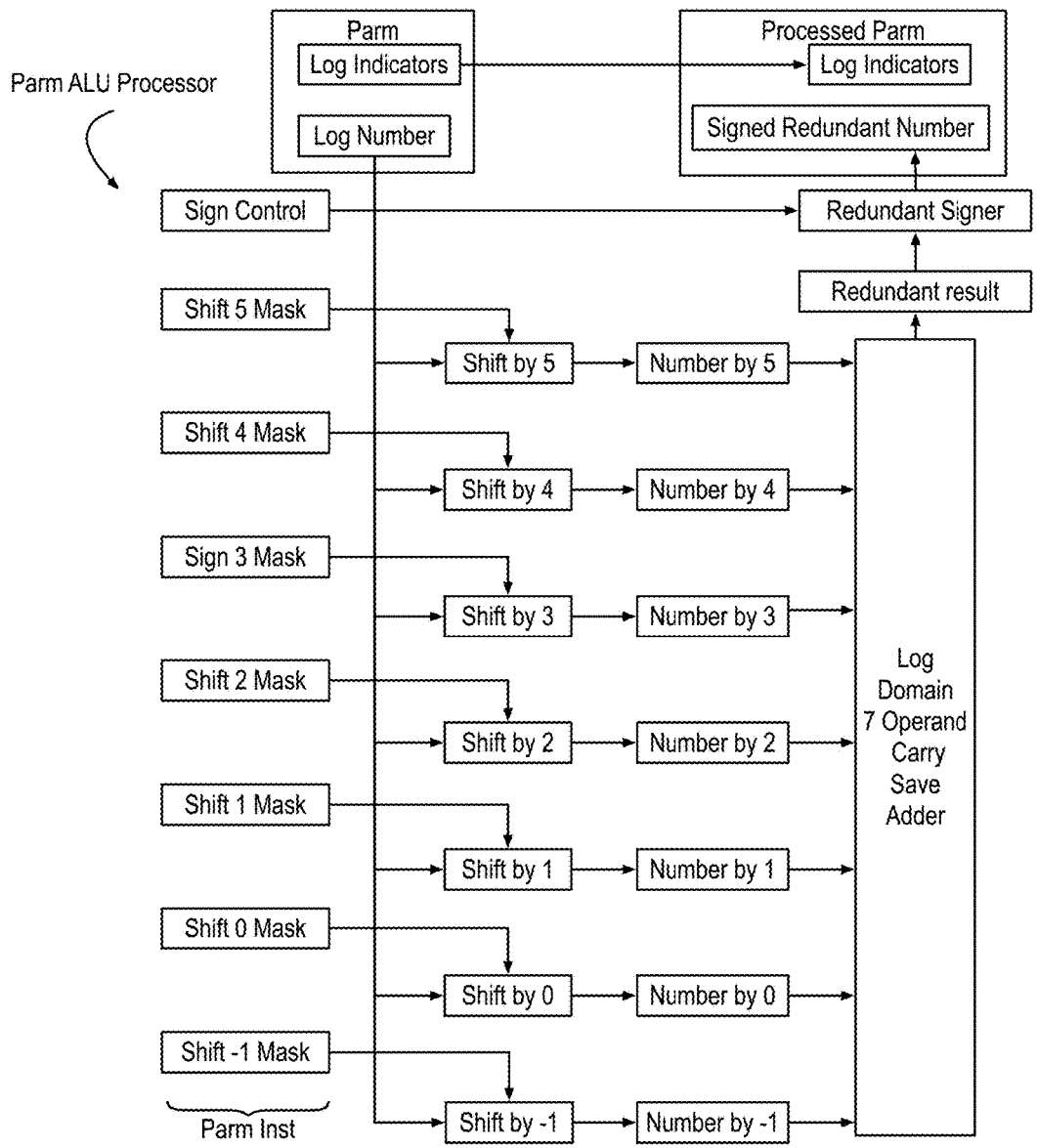
Fig. 35
Fig. 36
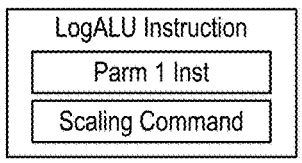
Fig. 37
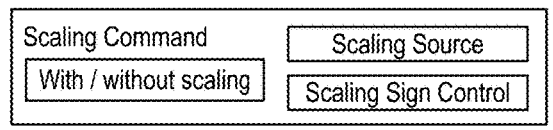
Fig. 38
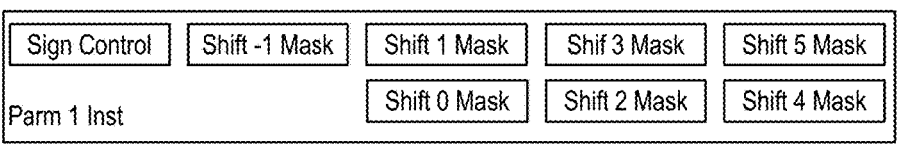

Fig. 74
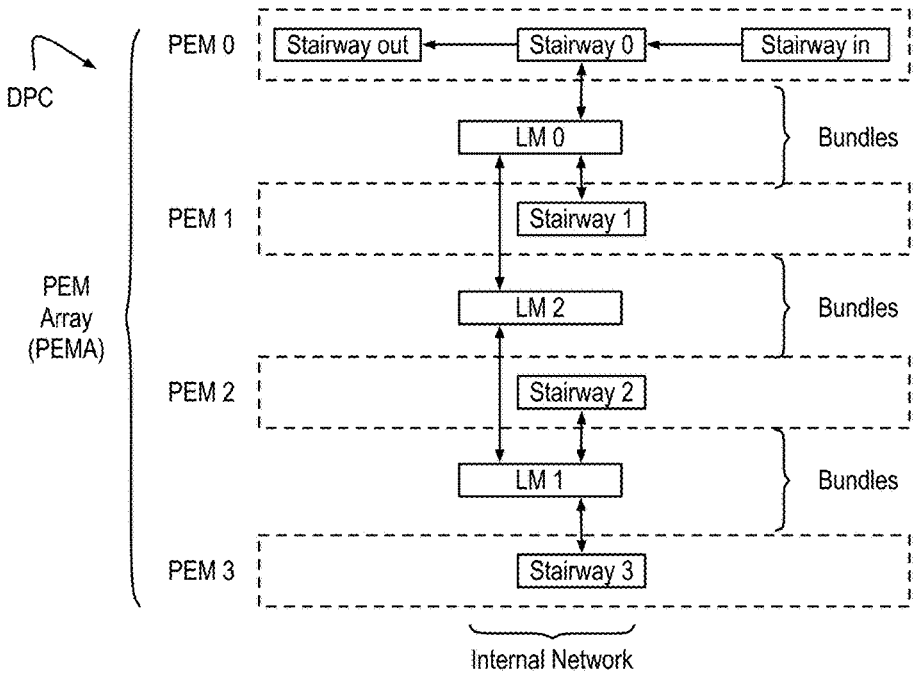
Fig. 75
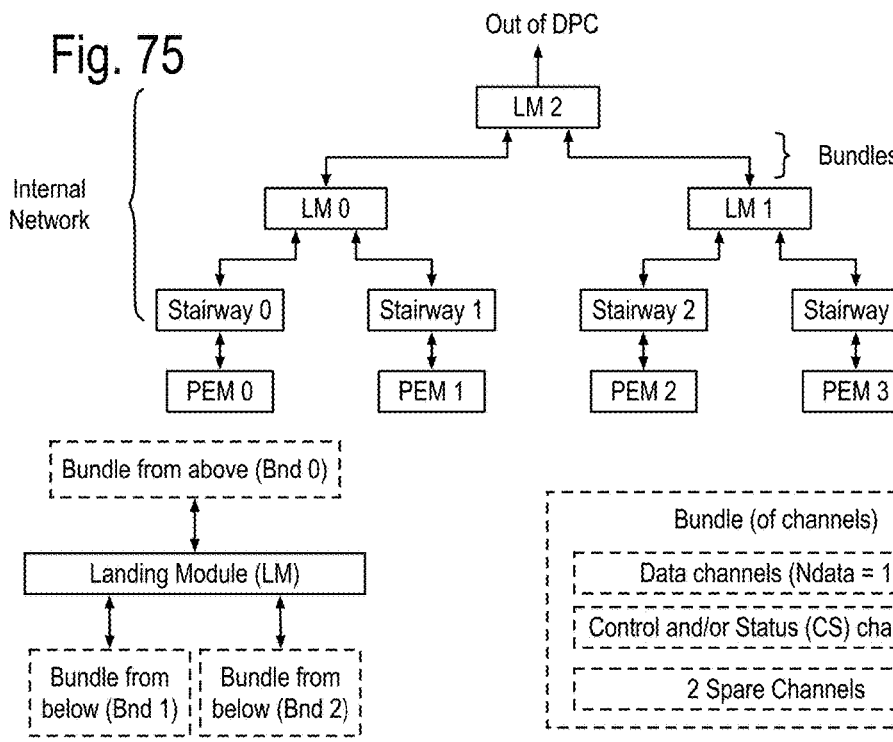
Fig. 76
Fig. 77

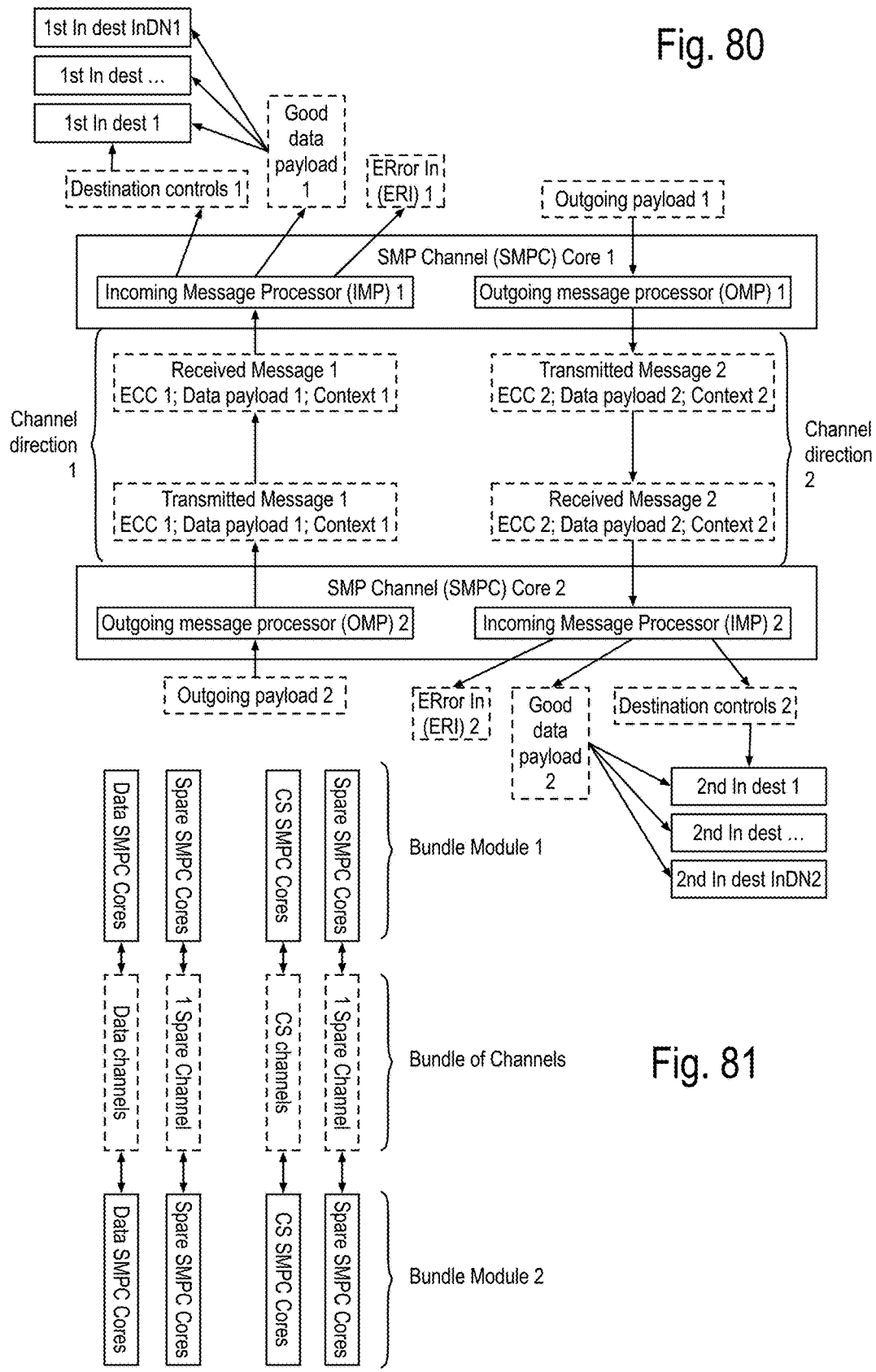

SIMULTANEOUS MULTI-PROCESSOR APPARATUS APPLICABLE TO ACHEIVING EXASCALE PERFORMANCE FOR ALGORITHMS AND PROGRAM SYSTEMS

TECHNICAL FIELD

Apparatus adapted for exascale computers are disclosed. Methods of algorithm and program development, verification and debugging are also disclosed. Collectively, these elements assemble to create a class of supercomputers that obsolete Amdahl's Law, providing cabinets of petaflop performance, and systems that may meet or exceed an exaflop of performance for Block LU Decomposition (Linpack) and other algorithms. Implementations of many of the apparatus components are also useful for Digital Signal Processing (DSP), single chip coprocessors, and/or embedded cores or core modules in System On a Chip (SOC) applications.

BACKGROUND OF THE INVENTION

Since the 1950's until 2012, the world has enjoyed continuous improvement in high performance numerical computing. In the 1990's, it became common to use Linpack, an implementation of Block LU Decomposition with partial pivoting, as a benchmark for supercomputer performance. LU decomposition is a simple algorithm, which achieves a significant computational result. Block LU Decomposition is an extension of LU Decomposition that fit naturally into the parallel processor computers deployed in that time. Partial pivoting is an extension to Block LU Decomposition that insures numerical stability under some straightforward conditions. From here on, Block LU Decomposition will be assumed to incorporate partial pivoting unless otherwise stated.

Performance advances of the world's super computers began to slow starting around 2010 based on the top 500 list, eventually stalling about 2012, and remaining flat since 2013. While computations within an integrated circuit continue to improve, communication across these very large systems is drastically limiting the effect of the on-chip performance improvement and the ability to achieve exascale performance. An exascale computer is required to run a version of Linpack (Block LU Decomposition) for at least 8 hours at an average of an exaflop (a billion billion Floating Point operations per second).

SUMMARY OF THE INVENTION

The apparatus of this invention includes, but is not limited to, a Simultaneous Multi-Processor (SMP) core including a process state calculator and an instruction pipeline of at least two successive instruction pipe stages adapted to execute a state index for each of at least two simultaneous processes, collectively performed by an execution wave front through the successive instruction pipe stages with use of the owned instructed resources determining whether power is supplied to the instructed resource. The used instructed resources respond to the state index of the owning process to generate a local instruction, which directs the instructed resource in the operation(s) to be performed. The process state calculator and instructed resources respond to a local clock signal generating clock cycles referred to as the local clock.

Implementations of the SMP core include, but are not limited to, a SMP core implementing data processing, referred to as a SMP data core. When data processing involves integers, the core may be referred to as a SMP integer core. When the integers range over an N bit field, the core may be referred to as a SMP Int N bit core. When data processing involves Floating Point (FP) numbers, the core may be referred to as a SMP FP core. When the FP numbers are compatible with a floating point standard denoted as single precision (SP), single precision with k guard bits (SP+k), double precision (DP), double precision with k guard bits (DP+k), extended precision (EP) and extended precision with k guard bits (EP+k). For example the core may be referred to as a SMP (DP) core when the floating standard is DP. When the operations of a data core involve multiplications, additions and minimal non-linear calculation support, for example, reciprocal and reciprocal square calculations, such a data core may be referred to as a basic data core. However, other SMP data cores supporting much more extensive non-linear term generation are referred to as Non-Linear Accelerator (NLA) cores.

A module of SMP data cores may include two or more SMP data cores, where the simultaneous processes of each the cores may own instructed resources in the other cores, but only one of the simultaneous processes may own a specific resource at a time. A module of SMP data cores is referred to as a SMP data module. Note, all the cores of the SMP module do not need be the same, for instance, some of them may data process 32 bit integers and some single precision floating point numbers. Also, unless otherwise noted, all cores from herein are SMP cores.

Traditionally, a channel is seen as delivering one to a few bits per local clock cycle. Messages accumulate at receivers for many clock cycles, and then are processed. This model stalls the input port of a data core. To address this problem the following definitions are made: A message refers to a fixed length data payload and an Error Detection and/or Correction (EDC) field. A channel can simultaneously receive and send messages on each local clock cycle. The data payload is adapted to be able to include two numbers or a number and an index list, and possibly more.

A SMP core implementing communication with a single channel, is referred to as a channel core. The channel core includes at least two simultaneous processes, an incoming process and an outgoing process. The execution wave front is composed of two distinct pipe sequences, the incoming pipes and the outgoing pipes. Note that if the incoming pipes or the outgoing pipes are not initiated, their execution wave fronts gate off each of their respective pipes. Availability of an incoming message initiates the incoming process. The incoming pipes include, but are not limited to, a first and second incoming pipe. The first incoming pipe calculates error detection and/or correction from the incoming message to generate a corrected message and a message error flag. The second incoming pipe responds to the message error flag being asserted by sending the incoming message into a damaged message queue. When the message error flag is not asserted, the corrected message is presented as a correct incoming message routed to at least one of at least two incoming destinations. A message data payload ready for transmission initiates the outgoing process. The outgoing pipes include, but are not limited to, a first and a second outgoing pipe. The first outgoing pipe includes an error correcting code generator that responds to the message data payload by generating the EDC field of the outgoing message presented for transmission. The second pipe presents the outgoing message with the message data payload and the EDC field for transmission.

The performance requirements for versions of Linpack running at exaflop performance, as well as the fault resilience, lead to the need for multiple data channels, at least one control and status channel, and spare channels to replace faulty channels. Similar needs may apply in a number of other technical fields, including but not limited to single chip coprocessors, DSP circuits and embedded core and/or core modules.

As used herein, a channel bundle includes Kdata channels for data, Kcontrol channels for control and/or status, and Kspare channels that may be used to replace one or more of the channel(s) for data and/or the channel(s) for control and status. First example, for a single precision DSP implementation, the channel bundle may be specified as follows: The data payload length may be 64 bits. Kdata may be at least 8. Kcontrol may be 1. And Kspare may be at least 2, one dedicated to fault recovery for the data channels and one for the control and status channel. Second example, for a single integrated circuit adapted to provide double precision numeric acceleration to a contemporary microprocessor, the channel bundle may be specified as follows: The payload length may be 128 bits. Kdata may be 1. Kcontrol may be 1. Kspare may be 0. Third example, a Data Processor Chip (DPC) implementing hundreds of double precision floating point data cores, the channel bundle may be specified as follows: The payload length may be 128 bits. Kdata may be at least 8 and preferably at least 16. Kcontrol may be 2. And Kspare may 2, one dedicated to fault recovery for the data channels and one for the control and status channels. The first control and status channel may be related to access request and the second may be related to task control and status messaging.

A SMP module adapted to process the channel bundle, referred to hereafter as a bundle module, may include, but is not limited to, one channel core for each of the data channels, the control and/or status channels and the spare channels. The bundle module may further include a fault recovery SMP core that is adapted to replace one or more of the following a faulty data channel module with the channel module for a spare channel, if available, and/or a faulty control and/or status channel module with the channel module for a second spare channel, if available. Otherwise, the fault recovery SMP core posts a recovery failure. In some implementations, the bundle module may implement the stairway module referred to in previous patent documents.

A communication node, referred to herein as a landing module is adapted to simultaneously communicate with three channels and includes three channel modules, one for each channel. Each of the incoming pipes of the channel modules includes a third pipe generating an output routing vector addressing whether its correct incoming message is to be routed to the kth channel's outgoing pipes, for each of the k=1, 2, or 3, channels. Each of the k channel outgoing pipes further includes an outgoing pending message queue and an outgoing message sorter pipe. The outgoing pending message queue generates a pending outgoing message and a pending message flag. The outgoing message sorter pipe receives the kth component of each of the output routing vectors of the 3 incoming pipes and also receives the pending outgoing message and the pending message flag. If there are no outgoing messages from any of the incoming channels and no pending output message, the outgoing message sorter does not generate a message ready for transmission. If at least one of these sources has a data payload ready for transmission, one of them is selected for transmission and remaining outgoing ready messages are posted to the outgoing pending message queue. If the selected outgoing ready message is from the outgoing pending message queue, it is removed from the queue.

One example, suppose a binary tree network is implemented within a chip using instances of these landing modules and the top node of that tree acts as an external communication interface for the chip. The nodes below the top node may employ an error correcting code generator that only generates a parity bit, allowing errors to be detected, but not corrected within the chip. The top node may employ an error correcting code generator which generates an EDC field supporting single bit correction and double bit detection for at least part of the data payload. In some implementations, the EDC field may support more than single bit correction and more than double bit detection for at least part of the data payload. In some situations, the part of the data payload may be 16, 24, 32, or more bits in length. In some situations, the parts of the data payload may be distinct and/or overlap. In some situations, the EDC may support a turbo coded error detection and/or correction capability. A second communication node, referred to as an integrated landing module, is adapted to simultaneously communicate with three channel bundles and includes a landing module, one for each corresponding channels of the bundles. The above definitions are now used to discuss exascale computer apparatus and methods that can successfully traverse the exascale barrier and beyond.

Today, there is a new understanding that hardware and software must be co-designed to achieve maximum supercomputer performance. However, there are actually four primary disciplines needed for supercomputers to achieve exascale performance. These four disciplines are algorithm development, system analysis, hardware engineering, and software engineering. Collectively referred to as quad-design. All of these disciplines must, and will, be simultaneously considered to solve the current impasse. This quad-design approach is necessary for a system running Linpack (an implementation of Block LU Decomposition) to achieve exascale performance. For example, quad-design reveals a fatal flaw in the existing algorithms for Block LU Decomposition. With quad-design, a new class of systems are provably capable of exascale performance for a new version of the algorithm. Based upon quad-design, several new technical devices and methods are disclosed including, but are not limited to, a new class of provably exascale systems, data processing circuitry and chips, new communication methodologies and apparatus, new memory and communications control circuits that obsolete any form of traditional caches, superscalar instruction processing, multithread controllers and routers in these systems, and a new methodology for developing, testing, and, economically debugging supercomputer programs.

The new class of provable exascale systems include implementations of the data processing, communications, and memory transfer control circuitry that have predictable response latency and throughput response to the stimulus of available data, as well as dynamic runtime reconfiguration of the entire system, based upon the pivot results of running Block LU Decomposition. The dynamic runtime response is applicable to many other algorithms needed in high performance numeric computations. The exascale computer system specified in this manner makes possible insuring that an algorithm meets the desired performance for that system. This cannot be done with today's approach.

The data processor circuitry includes SMP cores, floating point addition circuitry, and possibly NLA circuitry. The SMP cores obsolete concurrent processing, superscalar instruction processing, instruction caching, and multithreading from single cores on up. The obsoleting of super scalar instruction processing and caches leads to at least a Data Processor Chip (DPC) with 576 cores, as opposed to 8 parallel processor cores in contemporary parallel processor chips. These new DPCs may be built with existing manufacturing processes. There is reason to believe that these chips, with roughly ten times as many cores, may consume half as much power as the best manufactured today. The NLA improves non-linear function performance, as well as the system performance of Block LU Decomposition. Improvements in floating point 3 or more operand adders maximize the accuracy of the result at minimal cost, both to manufacture and in power consumption.

Traditional algorithm development focuses on specification of the required arithmetic and control of the flow of operations to achieve the desired result without targeting a specific system. In the case of LU Decomposition, a matrix A is decomposed into two matrix components, L and U. L is a lower triangular matrix with 1's on the diagonal and 0's above the diagonal. U is an upper triangular matrix, whose diagonal is usually not 1's and below diagonal entries are 0's. (Block) LU Decomposition is used herein as algorithm examples.

To reach exascale performance and beyond, algorithm development must account for a basic systems analytic definition of the target computing system. Such a definition has never been available to the mathematical community, but will be needed from hereon. Without this, the algorithm developers are blind to the consequences of their algorithm specifications, leading to the current performance impasse.

Today's communication networks inherit much, if not all, of their structure from wireline or wireless communication networks. This inheritance triggers four problems. These problems may be overcome with the invention's new type of communications network. Here are the legacy problems solved by this new type of communications network:

Standard message passing causes problems. First: The standard, message-based communication protocols stall both transmission and reception of messages, so that transmission and delivery occurs over multiple clock cycles. Second: Standard message formats support variable length data payloads that add a substantial complexity to message transfers and processing. Third: The use of routers to move the messages across standard communications networks do not provide any certainty about the latency to traverse the router from message input to output. Fourth: Communication failures into, within and out of routers are very difficult to handle and almost inevitably engender the intervention of more systems components to roll back to the last point of known good transfers, and in a number of cases, this may not be possible, instead causing large scale crashing of the system. Fifth: Many communication systems grow in complexity faster than the number of clients for that system, causing the communications manufacturing cost, as well as energy consumption to grow more than linearly to the number of data processors in the system.

A specific communication approach focused on numeric supercomputers removes messages stalling when leaving or entering data processors. Numeric computing is about numbers and where those numbers are in one or more large data spaces, such as a two dimensional array, or matrix. The entire message is sent and delivered in one clock cycle, so that upon receipt, all the bits may be processed simultaneously, insuring that the operations such as error detection and correction may be implemented as a fixed number of pipe stages.

Communication networks often require some form of router, access point or base station to link together multiple users (data processors) into their network. For the sake of clarification, all of these approaches will be referred to as routers. A router refers to a communication node with many portals to multiple clients, in this situation, processors. The messages received across its incoming portals are routed to its outgoing portals, or stalled for a time, until an outgoing portal is available. There are several problems with routers in exascale computers: First, routers do not provide any certainty regarding the latency for sending an incoming message onward. Without some form of certainty, no one may predict how long it will take for a message to traverse a node in such networks, much less through multiple nodes. As a consequence, algorithm developers cannot predict how long it will take for the system to transfer data to where it is needed. Second, routers are vulnerable components in large scale systems. Router failures may be considered in terms of a failure in the router, a failure between the router and a source, a failure between the router and a destination. Each of these forms of failure requires different responses from the system to prevent it from crashing. Third, responding to a failure in the router basically requires either rerunning the communications through the router, which may still fail, or running the communications through a second, shadow router, which hopefully is operational. Fourth, responding to a failure between the router and a source is challenging, because the failure may be in the channel connecting the router and the source, the router's interface and/or the source's interface to the channel. Fifth, responding to a failure between the router and the destination is similarly challenging. Once the source of the failure is discovered, additional circuitry and/or physical channels must be employed to replace the failing devices without stalling or crashing the overall system. Sixth, up until now, problems of fault resilience were not the concern of algorithm developers. However, in systems involving millions of chips and enormous amounts of messaging, this single issue may render all accurate performance estimates impossible. Seventh, last but not least, there has been a tendency for communications systems to grow faster in complexity than the data processor components, as the system scales from a single core to multiple cores, from single data processor chips (DPC) to multiple DPCs, and so on.

To achieve exascale performance, all of these systems communication problems must be solved. This requires that the communication nodes, the sources, and the destinations of all the messages in these supercomputers satisfy the following requirements. All messages are in a fixed structural format and are delivered or sent in one local clock cycle, whether at the source, the communication node, or at the destination of the message. All circuitry processing a received message and generating a transmitted message contains locally clocked pipelines, which under normal conditions, provide a fixed response latency. Each message includes sufficient error detection and correction to fix most small bit errors and immediately identify larger errors so that the link where the communication error occurred may be detected at the next node. Each link includes at least one control and status channel and at least two data channels, as well as at least one spare control and status channel and at least one spare data channel. Each source, node and destination includes a channel interface for each of these channels in the link. Each source, node, and destination includes a first in first out (FIFO) queue for each channel interface so that if an error occurs, roll back is automatic and incurs no additional overhead beyond these internal resources. The FIFO is used to remember the messages received, and the messages sent and supports a normal operation queue pointer and a rollback queue pointer. Each node has a small maximum number of links interfacing to it. In the examples that follow, this number will be three unless otherwise stated. Each channel interface of each channel of each link, when used, may, or may not, send an outgoing message, as well as receive, or not receive, an incoming message. Under normal conditions, each node operates each of its channel outputs. Each of the channel outputs selects one of the channel inputs for output. The output of the selected channel input is based upon the FIFO normal pointer of that channel. For each of the input channels, the next state of the input channel takes into account whether that input channel was selected and updates its FIFO normal pointer accordingly.

There is a set of problems related to memories, and where computations are performed, that need to be overcome to achieve provable exascale performance for an algorithm. To understand these problems some terms will be defined and the contemporary manufacturing environment will be discussed. Caches are an accepted element of many computer systems. A useful way to understand a cache is that it possesses, operates and manages a collection of memory pages held in high-speed static ram, and in some situations may also support the collection including individual memory locations. Caches typically communicate across two interfaces. The first interface is to a larger, slower ram and the second is to a faster interface, leading to some form of processor. The cache responds to processor access requests by either accessing one or more pages residing in the relatively high speed static ram, or by requesting that another page be fetched from the larger, slower ram into the cache for access. Pages are accessed to read and/or write their contents. There are a limited number of pages in the cache, and to access new pages from the larger, slower memories often requires that the cache make decisions about which page to retire, the retired page may be flushed back to the larger, slower memories. If the page has been altered, it is written back to the larger, slower memories, which is often called flushing. Once the page has, if needed, been flushed, it is overwritten in the high speed memory. Sometimes pages will be fixed in the cache. An example of this is a page for an interrupt handler that may be fixed or "parked" in the cache to improve interrupt latency.

There are several problems with caches, which after years of work, have yet to be solved. The decision mechanism of caches is based upon heuristic algorithms developed over the last few decades to perform the following: Guess which page may be retired with the least overhead to the system. Predict which pages of the larger, slower memory to fetch. Fetch the needed page from the larger, slower memory when the cache does not possess the needed page. Fetching the needed page may require making room by retiring/flushing another page. These heuristic decision algorithms come at a steep price for supercomputers. They are nearly always on, and nowhere near always right as to what they flush. Caches are both energy consumers and have unpredictable access latency.

It is generally understood that fast memories cannot be big and big memory devices cannot be fast. By way of example, static ram blocks, capable of being accessed once a nanosecond (ns), are generally limited to somewhere around 1 K (1024) words per block. Dynamic rams (DRAMs) storing multiple Gigabits (Gb) typically have row and column access strobes in the time range of 25 to 65 ns, and also require refresh strobes usually in the same time range. DRAMs are often packaged in byte or word packages, often making them system level components.

There are problems in the operation of DRAMs that have been recently diagnosed. DRAM rows, columns and/or pages have a consistent pattern of degrading over time, which once started, leads to subsequent failures. A scheme mapping logical to physical addresses may add reliability. When a page begins to degrade, its data is swapped to a new page at a different physical address and the logical to physical correspondence is changed accordingly. The replacement page may be selected as the least used, rather than least recently used page.

To simplify this discussion and stay in the known reliable domain of chip manufacturing expertise, some simplifying assumptions are made to describe the invention and its various embodiments. The invention includes SMP data cores including small, fast static rams that are fabricated together on single chips. These are referred to as Data Processing Chips (DPC) herein.

To address both the communications and large memory access, a new kind of chip called an Anticipator Chip (AC) is introduced. The anticipator directs access of DRAM arrays in the Data Memory Nodes and in the Memory Nodes. It also configures at least one associated communication node based upon the dynamic updates of the incremental state of data processing of an algorithm. In Block LU Decomposition, the incremental state of the algorithm and its future operations and data transfers is determined by the pivot results. Once known, each of the Anticipators can anticipate data transfers of the rows to swap, by knowing where the data is located, what the rest of the system has. Channel loading is anticipated for various stages of the upcoming calculations, and access can be scheduled before needed to provide the data to the relevant data processing units. None of these functions can be provided by a cache, because caches respond to immediate requests, rather than anticipate requests that are not yet needed. The AC enables algorithm developers to specify, and programmers to implement, algorithms in terms of the operation of the intermediate memories of the system. This enables the algorithm developers to predict how the system will locally and globally respond to access requests required by the algorithm. Without this capability, the programmer cannot stage accessed to anticipate future needs. Also, when resources of the DPC, the AC and/or the DRAMs are not needed, they are automatically reduced in power, so that only the power needed by these operations is consumed. There are no heuristic decision mechanisms, only programmed responses based upon an exact knowledge of the implemented algorithms. To insure the minimum latency between the first level of intermediate memory and the data processor chips, the DPC, AC and local DRAM are implemented as a data memory node (DMN) chip stack that also includes an optoelectronic interface to a node of the communications network. The communications network, outside of these chip stacks, uses optical fiber based communications.

Throughout the history of computing, the state of manufacturing processes has dictated what could be reliably manufactured as computer components. When von Neumann started, relays, drum memories, and vacuum tubes were state of the art. We have much better technologies today, but we face a much larger reliability challenge. While chips may operate at below band gap voltages, such as ¾ of a volt, and semiconductor devices may be manufactured with line widths below 25 nm in those chips, such capabilities have serious consequences for a system needing on the order of ½ to 1 billion cores. Leakage currents in these semiconductor devices become a major source of energy consumption. The signal paths and retained states become more error prone. One school of thought is to take the legacy architectures of our time and accelerate them, often using new manufacturing processes. In the lab, there are regular demonstrations of exciting new opportunities. However, getting one device or chip to work in a laboratory setting does not solve the reliability problems inherent in deploying that technological advance across a system including millions of chips, memory devices, communication links and nodes. Consider the following qualitative model. Assume that in the lab there are a number, N surprises encountered to get the first instances of a new technology to work. Assume that for every 10 binary orders of magnitude deployment, there are another N surprises to overcome to get that deployment to operate reliably.

Consider contemporary fiber optics for a moment. Today, the basic problems of 10 Gbit/sec Ethernet have been solved and deployed in units of a million in at least North America, Europe, and Asia. Implementations of 20 something Gbits and implementations of 100 Gbits are both under way. However, 20 Gbit deployments are limited to somewhere in the range of 10-100K units and 100 Gbit is barely out of the lab. An exascale computer implementing one to two million chip stacks, each using optical communications in each link between these stacks will need to be built from some kind of optical transceivers. Given the above qualitative models for the surprises to overcome, the approach with the least potential surprises is to focus on the 10 Gbit capable transceivers.

The chips, again to minimize surprises, need to be built back from the leading edge of semiconductor manufacturing. For the following discussion, assume that the chips operate at a local 1 ns clock and are using a stable manufacturing process with a well worked out and qualified standard cell library including the 1K static rams. The system needs to be planned with a test bed, say 1/16 of the projected exascale system complexity, to iron out the surprises, before manufacturing the 15/16 or about 90% of the components for the whole system.

Next, there are problems involving cores, their instruction processing and their internal structures that need to be discussed. The algorithm developer needs to know that when the data is available, the operations being specified will be performed with a predictable response time and a predictable performance for the required operations. While this sounds simple enough, modern microprocessors, with superscalar instruction interpretation, often multi-threaded, with instruction caches, cannot provide this. Today's microprocessors also use message handlers that trigger interrupts, which are then processed. All of these traditional computing components are not predictable.

Systems for which algorithm implementations may be proven to have exaflop or more performance require that all of the above problems be solved. Otherwise, the above basic systems analytic performance parameters for the system do not exist, and accurate performance proofs are impossible without them. This is the overall gating technological milepost that must be traversed to achieve exascale systems and beyond. An implementation of the communication network and components is shown to meet exascale requirements, which may be developed without undue experimentation from this disclosure.

BRIEF DESCRIPTION OF THE DRAWINGS

FIG. 1 to FIG. 5 show examples of a system, possibly implementing an exascale system, including at least one cabinet, the cabinet including one or two racks, each rack including one or more shelves, each shelf including one or more row of PCB, each row including one or more instances of a data memory node PCB (PCB 1), one or more instances of a memory node PCB (PCB 2), both coupled through a backplane PCB (PCB3).

FIG. 6 to FIG. 8 show some details of opto-pin sites for the data memory node (DMN) and the memory node (MN), as well as some details of the node-sites for node stacks related to the PCB 1 and PCB 2. These examples show a Data Processor Chip (DPC), an Integrated Landing Module (ILM), an Anticipator chip (AC) and a memory unit array.

FIG. 10 to FIG. 18 show some details, including a comparison adder and a Non-Linear Accelerator (NLA), process state calculators of the SMP data cores and PEM of FIG. 9.

FIG. 19 to FIG. 35 show some details of the NLA.

FIGS. 74 to 89 show some details of the bundles of channels, stairways, and landing modules, in terms of the Simultaneous Multi-Processor Channel (SMPC) cores, and bundle modules of the SMPC cores.

DETAILED DESCRIPTION OF THE DRAWINGS

Figure 9:
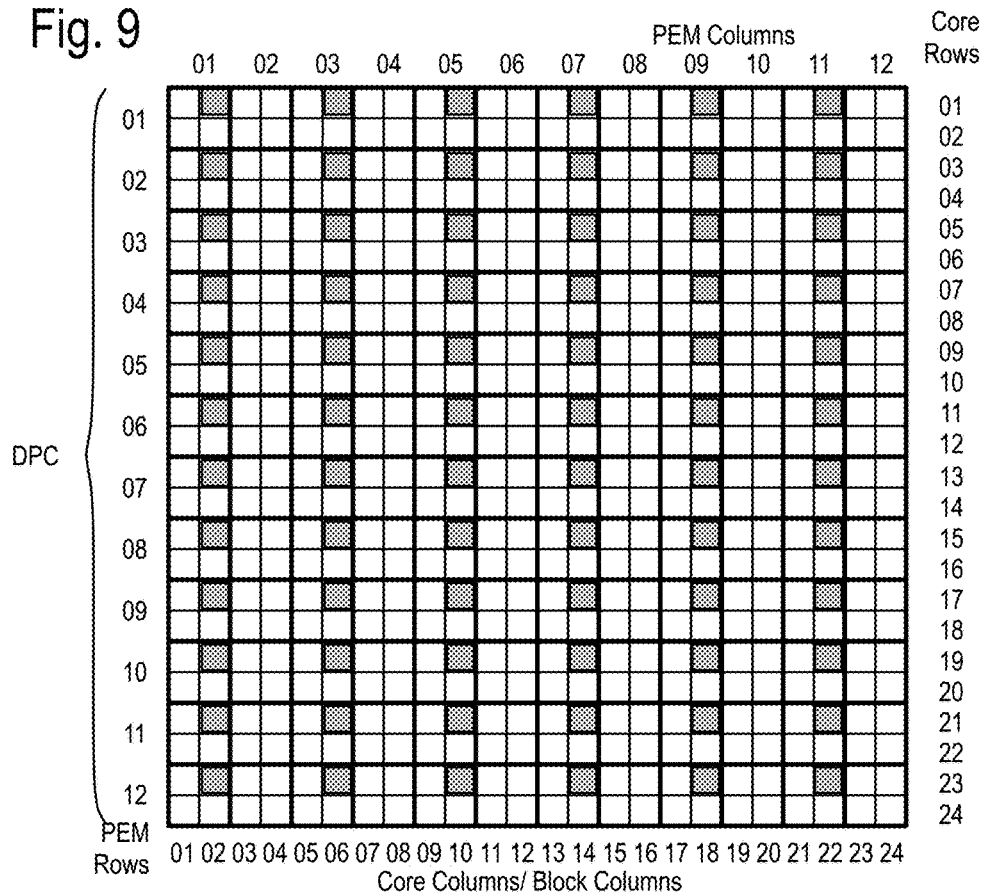
FIG. 9 shows some details of the DPC including an array of Programmable Execution Modules, each including multiple instances, for example, 4 instances of Simultaneous Multi-Processor (SMP) data cores.

Systems for which algorithm implementations may be proven to have exaflop or more performance require that all of the above-summarized problems be solved. Otherwise, the above basic systems analytic performance parameters for the system do not exist, and accurate performance proofs are impossible without them. To do this requires a description of a system that accurately describes the hardware in terms of its systems analytic parameters, with the minimum detail needed by the algorithm developers.

A supercomputing system is a system including sub-systems known as cabinets. Each cabinet includes sub-systems are known as rows of Printed Circuit Boards (PCBs). Each of the rows of PCBs include sub-systems referred to as a backplane PCB, at least one data memory node PCB, and/or at least one communicating memory PCB.

FIG. 1 shows a simplified schematic of a system as an array of cabinets, each of the cabinets having data processing capabilities that may include, but are not limited to Floating Point (FP) multipliers, non-additive term generators, integer multipliers, as well as local data memory capabilities. The inventors have found that many algorithms including, but not limited to, matrix inversion by Gaussian elimination and Block LU Decomposition (often referred to as Linpack).

Unless otherwise noted, multipliers and multiplication refers to floating point multiplication, in particular, double precision floating point multiplication. Non-additive terms generation will refer to the result of some combination of logarithm base 2, logarithmic domain addition, logarithmic multiplication, and exponentiation base two.

FIG. 2 shows the cabinet array including 256 cabinets arranged as a 16 by 16 square cabinet array on a single computer floor. Additional examples include, but are not limited to, cabinet arrays implemented as three-dimensional arrays of cabinets arranged on several computer floors. A computer floor may contain a square, rectangular or other shaped array of cabinets which may number from 1 cabinet on up.

FIG. 3 shows an example of the cabinet including at least one rack, and in this example, including two racks. Each rack includes at least one shelf One of the racks may include 2 of more shelves. In this example, the racks each include four shelves. The shelves of rack i are labeled shelf i,j where i ranges over 1 and 2, denoted 1:2, and j ranges over 1 to 4, denoted 1:4. The depth of the cabinet Dc in this example will be assumed to be about 4 feet or about 120 cm. the height of the cabinet Hc is also assumed to be about 8 feet, or about 240 cm. For simplicity, assume long distance optical transmission of light travels about 1 foot, 30 cm, in about 1 nanosecond (ns).

FIG. 4 shows some details of the rack k, k=1:2, and each of the shelves j, j=1:4, of FIG. 3, incldes rows k,j,h for h=1:4. In other example systems, h may vary across 1 to 2, or 1 to 3. In other example systems h may be 1. In yet other systems h may vary over a range that includes 1:4, but is larger. Each of the cabinets has a width Wc, which for this simplified example will be assumed to be 8 feet, or about 240 centimeters (cm).

The system of FIG. 2 may be about 128 feet or about 38.4 meters (m) on a side as a square. This has been done to simplify the discussion, not limit the scope of the invention. The time to optically travel across the length or width of this system is about 128 ns. The system has synchronized clocking no further than the opto pin-sites and the node sites as first discussed in FIG. 6 and FIG. 7. Also, communication between the opto pin-site and the node-site will be assumed to be optical with the exception of some slow, simple test related signals, such as indication of whether one or more of these sites have received power.

All, or almost all, components are controlled and respond to their local stimuli and control state, implementing simultaneous communications and processing throughout the system. This document discloses and provides the basis for claiming that all exascale systems will include a version of the example system implementing simultaneous communications and processing throughout that example system. While various legacy computers, possibly supporting von Neumann architectures, super scalar instruction processing, whether or not multi-threaded, and possibly supporting caches may be found scattered through such systems, they can not be in the critical path of data processing and communications required for algorithms such as Block LU Decomposition (Linpack) to operate at an exaflop for at least 8 hours of runtime.

FIG. 5 shows an example of the row k,j,h of FIG. 4, including a backplane printed circuit board (PCB) referred to as PCB 3. The row k,j,h may also include at least one instance of a first PCB, referred to as PCB 1, and/or at least one instance of a second PCB, referred to as PCB 2. For purposes of illustration, the height of the row is assumed to be about 2 feet (60 cm) and the depth of the row is about 2 feet, as well. One skilled in the art will recognize that these preliminary assumptions are made to simplify calculations and various implementations may vary over time. Assume, by way of example, that the top side of these PCBs face the front of the row and that the bottom side faces the back of the row as shown in FIG. 5. Further assume, for example, that the top side of both PCB 1 and PCB 2 contain 16 opto-pin sites labeled 1:4,1:4, and that the bottom side of these PCB includes 16 node sites 1:4,1:4. In some embodiments, these assumptions may be inverted, for instance, the top sides of the PCB 1's and the bottom sides of the PCB 2's may include the opto pin-sites. This may be done to facilitate thermal cooling in some implementations.

FIG. 6 shows some examples of module stacks on one side of the PCB 1 and/or the PCB 2. PCB 1's may include only data memory nodes at each opto-pin site. PCB 2's may include memory nodes, or possibly a combination of the data memory nodes and the memory nodes. PCB 1 has its opto-pin sites populated by the data memory nodes (DMN). PCB 2 has its opto-pin sites populated by any of the module stacks of this Fig. Note: An access processor chips (not shown) may or may not be separately implemented to drive the interface to the memory unit array. PCB 1 or PCB 2 are shown having opto-pin sites that may couple to a data memory node (DMN) and/or a Memory Node (MN). Both the DMN and the MN are examples of the module stacks. The DMN may include a communications node, a data processor chip (DPC), an anticipator chip (AC) and a memory unit array, which in at least the near term may include DRAMs. The MN may include the communication node, the MP chip and the memory unit array. Note that the term node, appearing without modifier, will refer to a communication node. FIG. 7 shows a cross section view of both sides of a PCB 1 and/or PCB 2, including on a first side a node module coupled to the node site i,j, and on the other side a module stack such as shown in FIG. 6 coupled to an opto-pin site i,j. FIG. 8 shows one side of the PCB 1 being populated by 16 data memory node (DMN) stacks.

FIG. 6 has introduced the PCB s, the Anticipator chip (AC), the Landing Module (LM), the Data Processor Chip (DPC), and the Memory Unit Array (MUA), which have support the system of FIG. 1 and its cabinet array of FIG. 2, as follows. The system may be adapted to deliver a performance requirement, by including multiple data processor chips (DPC), multiple Landing Module (LM) chips, multiple anticipator chips and multiple memory unit arrays. At least some of the DPC execute the algorithm to determine an incremental state received by at least some of the anticipator chips. The anticipator chips respond to receiving the incremental state by creating an anticipated requirement. The system responds to the anticipated requirement of the anticipator chip to deliver the performance requirement.

The anticipated requirement, may include an anticipated future memory transfer requirement of at least one of the memory unit arrays as an associated large memory to the anticipator chip, an anticipated future transfer requirement of at least one of the LM chip as at least one associated communication node chip to the anticipator chip, and an anticipated internal transfer requirement for at most one of the DPC as an associated DPC to the anticipator chip.

The anticipator may be adapted to respond to the anticipated requirement includes the anticipator configured to perform the anticipator scheduling memory transfers of the associated memory unit array to fulfill the anticipated future memory transfer requirement, the anticipator configuring at least one of the associated communication node chips to fulfill the anticipated future transfer requirement and the anticipator configuring at most one of the associated DPC to respond to the anticipated internal transfer requirement of the associated DPC with any coupled the associated communication node chips so that the performance requirement is met in the average over the sustained runtime.

The DPC collectively create multiple of a computing floor window into a data space of the algorithm. The anticipated future memory transfer requirement may include an anticipated computing floor window input requirement from the associate memory unit array and an anticipated computing floor window output requirement to the associate memory unit array. The anticipated future transfer requirement of the associated communication node chip may include an anticipated future transfer requirements across the computing floor window and an anticipated future transfer requirement for a subsequent computing floor window. The anticipated internal transfer requirement for the associated DPC with the anticipator chip may include an anticipated loading requirement into the DPC of the computing floor window and an anticipated storing requirement from the DPC of the computing floor window. The system performance requirement may include the system performing at least ¼ of billion billion flops (exaflops) for a sustained runtime directed by the algorithm. The system performance requirement includes the system performing at least one of the exaflops for the sustained runtime directed by the algorithm.

The computing floor window may include at least two columns of blocks of r rows and the r columns of the matrix A traversing all of the N rows, where the r is at least 16. The incremental state may include a pivot of a column from a diagonal row to the N of the rows of the matrix A. also, at least one of the memory unit arrays may include at least one Dynamic Ram (DRAM).

From a different perspective, the apparatus of this invention includes an anticipator adapted to respond to a system performance requirement by a system for an algorithm and an incremental state of the algorithm received by the anticipator. The anticipator is adapted to respond to the incremental state by creating an anticipated requirement. The anticipator is adapted to respond to the anticipated requirement by directing the system to achieve the system performance requirement. In many implementations the anticipator may well be a chip, and to simplify this discussion, but not to limit the scope claims, anticipators will be referred to as anticipator chips. The anticipated requirement, may include an anticipated future memory transfer requirement of at least one memory unit arrays as an associated large memory to the anticipator chip, an anticipated future transfer requirement of at least one Landing Module (LM) chip as at least one associated communication node chip to the anticipator chip, and an anticipated internal transfer requirement for at most one Data Processor Chip (DPC) as an associated DPC to the anticipator chip.

The AC adapted to respond to the anticipated requirement includes the anticipator configured to perform the anticipator scheduling memory transfers of the associated memory unit array to fulfill the anticipated future memory transfer requirement, the anticipator configuring at least one of the associated communication node chips to fulfill the anticipated future transfer requirement and the anticipator configuring at most one of the associated DPC to respond to the anticipated internal transfer requirement of the associated DPC with any coupled the associated communication node chips so that the performance requirement is met in the average over the sustained runtime.

The anticipator may further include a state table adapted for configuration to integrate the incremental states of the algorithm to update the state table to account for the anticipated requirement and the anticipator responds to a successor incremental state based upon the state table in order to generate a successor anticipated requirement. The state table may be adapted to integrate the incremental states of the algorithm to update the state table to account for the anticipated requirement, for each of the incremental states. The incremental state may include a pivot decision for one of the columns of the matrix A.

FIG. 9 shows a first schematic view of an example of the DPC of FIG. 6. The DPC is shown with an array of 12 by 12 Programmable Execution Modules (PEM) each including 4 cores, further arranges as a 2 by 2 sub-array. While other implementations of the DPC may include different numbers of cores and PEM, this particular example is the one that will be used frequently in this document. Each core may implement one or more simultaneous processes that may either collectively or individually execute programs such as LU Decomposition, matrix inversion by Gaussian elimination, Fast Fourier Transforms and many other algorithms. One core may implement LU Decomposition for a matrix as large as 128 by 128 double precision numbers, and may carry out these computations without any use of external memory or communication, beyond loading the input matrix and possible transmitting the resulting LU matrix or matrix components.

This capability to encapsulate both the data and the program changes the nature of programming these computers. Assuming for the moment that one core may keep its multiplier and possible non-additive term generator busy at least 90% of the time, and that the other resources of the core may keep up, the core in processing a 128 by 128 LU Decomposition, is busy for a minimum of about 300K clock cycles, during which time, there has been no load on the surrounding resources nor on the external communications network. Also, anything not actively used has been turned off, no longer consuming power whenever it is not being used. Note that if all the resources of the PEM, containing 4 cores are put to the task of calculating the LU Decomposition, the results may be achieved 4 times faster, because there is linear performance improvement, because again, the multiplications and non-additive term generation does not stall and everything else keeps up.

Returning to FIG. 9, each pair of PEM is shown with 8 boxes, one of which is filled. The filled box includes a spare core, which may replace a core found to have one or more faulty components. These pairs of PEM with the spare data core form a second module.

Today's computer architectures stem from the von Neumann architecture, and from three primary devices building on that architecture. The von Neumann architecture implements a central processing unit (CPU) using a program counter to access a location in a memory to fetch an instruction. The CPU responds to the fetched instruction by translating it into some sequence of states, generally referred to as executing the instruction. The program counter may be altered, and the CPU repeats the process of fetching and executing instructions. The three primary devices are the IBM 360 with its use of caching, the VAX-11 with its multi-tasking and virtual memory environment, and the Pentium as representative of superscalar microprocessors. The IBM 360 introduced caches as a way to interface slow, but large, memories to the CPU. The VAX-11 successfully ran a multitude of different programs on the same CPU during a small time interval, where each program could pretend that it ran in a huge memory space. The superscalar microprocessor interprets an intermediate language of a simpler architecture, such as the 80486 or PowerPC, into smaller (pico) instructions. The pico-instructions are scheduled into streams that simultaneously operate data processing resources, such as floating point arithmetic units, at a far higher rate than the intermediate language made apparent. All of these innovations made for better general purpose computers. The extension of multithreading to superscalar microprocessors is discussed later.

These legacy architectural components do not address the needs of high performance computers (HPC), the power requirements for Digital Signal Processing (DSP) circuits, nor the requirements for System On a Chip (SOC) components today. The following research results are applicable to DSP and embedded cores for SOC, but our focus here is on HPC. Each HPC program saturates the resources of its execution engine. Rather than running many programs on one computer at the same time, only one program is running on the many computers in the HPC system at the same time.

Figure 10:
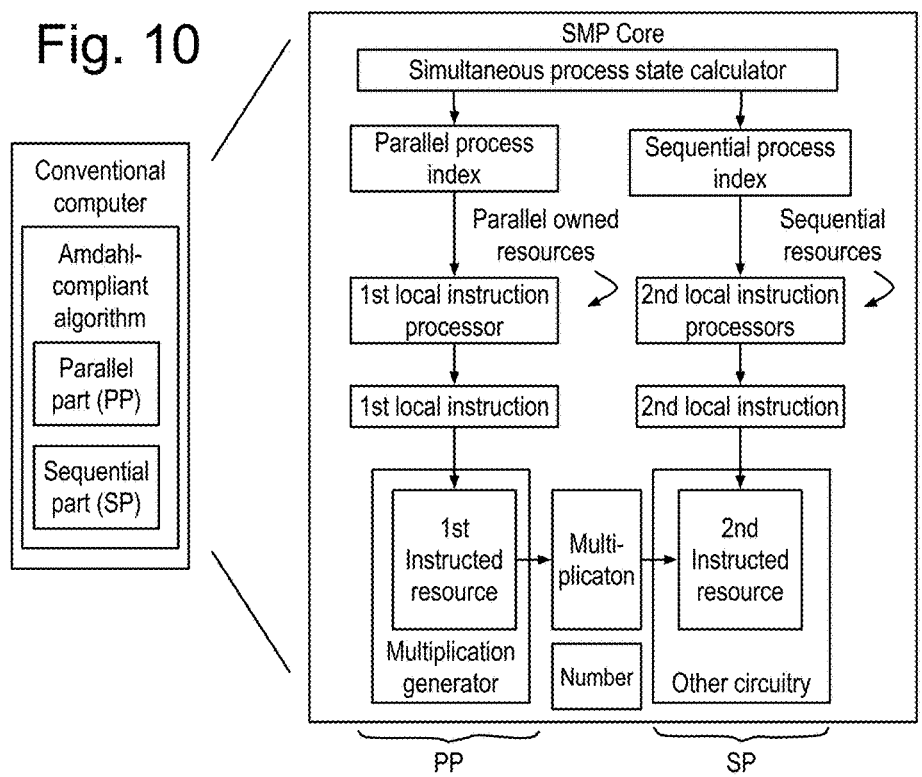

FIG. 10 shows a von Neumann computer executing a sequential part (SP) and a parallel part (PP) of a program on the left, and on the right, the Simultaneous Multi-Processor (SMP) core, including a simultaneous process state calculator, issuing two process state indexes for executing two simultaneous processes on each clock cycle.

In the SMP core, each simultaneous process separately owns instructed resources of the core. These owned resources, combined with the owning process state calculator component the state index, form the processor embodying the process. Each owned instructed resource includes its own local instruction processor that simultaneously responds to the process state of its owning process to generate a local instruction that instructs the instructed resource as part of the owning process. The instruction processing is local to each data processor resource. These data processing resources, such as a data memory port, an adder, and so on, are called instructed resources. Instruction processing is local to each data processor resource. These data processing resources, such as a data memory port, an adder, and so on, are called instructed resources. Each process owns separate instructed resources so that the Parallel Part (PP) and the Sequential Part (SP) need not stall each other. Owning a resource means that one, and only one, process within a task stimulates its instruction processing with its process state. A program defines the resources owned by the specific simultaneous processes of a task. A process state calculator issues a process index for each of the simultaneous processes. Local resources performing data processing, memory access, I/O and feedback are each owned by specific instruction processors, or are not used at all by that task. Ownership may vary for different tasks, but within one task is fixed. Each simultaneous process may own some of the instructed resources, which it exclusively uses and controls. For each of the simultaneous processes, the local instruction processor uses the process index for these owned resources to create a local instruction for the resource. This local instruction directs the execution of the simultaneous process through this resource.

These basic decisions bring substantial benefits: The SMP core simultaneously performs both processes PP and SP as shown in FIG. 11, compared to the conventional computer that may only execute, at most, one of the processes at a time. Assume that the PP and SP processes each have a range of 8 instructions. The core is driven by separately accessible, process-owned local instructions, shown in FIG. 12. VLIW instruction memory supporting these same independent operations requires a much larger VLIW memory of 64 instructions, as shown in FIG. 13. The simultaneous processes, and the local instructions for their owned instructed resources, remove this otherwise required large VLIW memory, as well as the need for instruction caching. Starting from the core, the sequential part and parallel parts of the conventional computer become the simultaneous processes, and incorporate the advantages of three new features. First, all feedback is external to the floating point (FP) adders, with the operation of accumulating feedback triggered by the state of the feedback queues. This feedback scheme supports FP multiply-accumulate operations running at the speed of the multiplier, without concern for how the adders are implemented. Second, the adders are extended to support comparisons with the winning input operand, and its index, sent as the adder output. Winning may be the maximum or the minimum as specified by the program. Third, communication between the parallel part and the sequential part is through feedback with the queue status triggering actions in the receiving process.

FIG. 14 shows an example SMP core, also referred to as a basic data core including a multiplier and an instruction pipeline of possibly five instruction pipe stages. The execution wave front passes through successive instruction pipe stages in a fixed sequence. Each instruction pipe includes one or more clocked pipe stages. The process state calculator is in pipe 0. Each process operates based upon a process index, and possibly loop output(s). Each instructed resource of a process generates an instruction performed during the execution wave front as it passes through that resource. Feedback paths do not go through the arithmetic. Instead, feedback is in separate hardware with a consistent status structure used to trigger process state changes based upon data availability. This allows for a simple, consistent software notation. The software generates the process state calculator configuration, the loop generation controls, and the local instruction configurations that collectively control all computing actions based upon when the data is available. It does not matter whether the data is from a local resource or from across a computer floor of several hundred cabinets.

The SMP core is shown executing two simultaneous processes by generating two process indexes that each drive instruction processing for the instructed resources owned by one of these processes. Each instructed resource is instructed by a local instruction generated in response to the process index of the owning simultaneous process. Both the parallelizable and sequential parts may be implemented as simultaneous processes that do not stall each other to execute.

Locally generated instructions selected from multiple process indexes insure operational diversity in controlling the resources, while minimizing instruction redundancy. Matrix inversion by Gaussian elimination requires less than 24 local instructions.

This combination of the process state calculators and the execution wave front renders both large external VLIW memories and instruction caches obsolete. Also, the typical first level data cache containing 32 K bytes is replaced by four instances of high speed static rams, each containing 1 K (1,024) double precision floating point numbers, which is now completely under the control of the program. All of this greatly improves energy efficiency.

The execution waves are generated on each clock cycle by continuously calculating the process indexes in the instruction pipe 0 to support a simple flat time execution model. This not only simplifies the programming, but also optimizes task switching. The data entering the instruction pipe with the execution wave front generates the data results coming out of the instruction pipe. Further simplicity results from requiring the inputs of each instruction pipe to come from the outputs of the previous instruction pipe. The execution wave front as implemented in arithmetic units, such as floating point adders, forbids feedback paths internal to these units.

The SMP core may be adapted to respond to a clock signal oscillating through successive clock cycles at approximately a clock period. The process state calculator is adapted to calculate the state indexes of the simultaneous processes on every clock cycle. The instruction pipe stages each include at least one, and often more than one instructed resource, which is owned by no more than one of the simultaneous processes. The process state calculator also generates a usage vector for each of the simultaneous processes, which designates which of the instructed resources are used in the execution wave front to perform the operations of the process. The process state calculator also generates a use vector summarizing what instructed resources are used for the execution wave front for all the simultaneous processes.

As the execution wave front approaches the next instruction pipe stage, the use vector component for each of the instructed resources of the next stage is used to gate the power to the instructed resource, generating the gated power to that instructed resource. As a consequence, if no instructed resources are used in the execution wave front, the instructed resources are essentially turned off during the execution wave front's traversal of the instruction pipe stages.

For example, a floating point adder operating at 200 MHz is unlikely to have the same pipe stages as one operating at 1 GHz. Instead of internal feedback, each feedback path is made external to the arithmetic units and partitioned into separate instructed resources. One receives input, Fin, and the others provide output ports, Fout, for feedback path queues. Simultaneous processes, like the parallelizable and sequential processes of matrix inversion, may now communicate through the separately owned input and output ports of the feedback paths in a core. Data memory is shown as including 4 RAM blocks, each with a read port with two output queues (RD 0 Q0 and Q1, for instance) and a write port (WR 0).

The execution wave replaces a traditional buss and provides substantial benefits. The output of each feedback path is organized as multiple queues that stimulate the calculation of process indexes and/or the local instruction processing as the data becomes available for use within the owning process. Multiple queues in a single feedback output port enable a hierarchical response to data availability, allowing a single adder to act like a cascading adder network for accumulation in Finite Impulse Response (FIR) filters and dot products, as well as pivot entry calculation in matrix inversion and LU decomposition. All of these algorithms, as well as matrix algorithms and vector products, may now be implemented so that the multiplications do not stall, and the other core circuitry keeps up with the multiplications, providing maximum performance at the least energy cost for the required operations. This is independent of core clock frequency, or the number of pipe stages in the arithmetic circuits.

As used herein, the SMP core of FIG. 10 may implement data processing of numbers and be known as a SMP data core as shown in FIG. 14. Various examples of SMP data cores are shown in FIG. 15:

When data processing involves integers, the core may be referred to as a SMP integer core. When the integers range over an N bit field, the core may be referred to as a SMP Int N bit core. For example, N may be 32, 48, 64, and/or 128 bits, and/or other bit lengths. The use of and/or in the previous sentence is an acknowledgement that multiple integer lengths may be efficiently performed using the execution wave front through the resources of the SMP integer core. One skilled in the art will recognize that integers may be used in arithmetic as signed and or unsigned numbers, possibly representing fixed point numbers. Addition may also be supplemented by logic operations on corresponding bits of integer operands, possibly after one or more of those operands have been shifted.

When data processing involves Floating Point (FP) numbers, the core may be referred to as a SMP FP core. The FP numbers are compatible with a floating point standard denoted as single precision (SP) with k Guard bits (SP+k G), double precision (DP) with k guard bits (DP+k G) or extended precision (EP) with k guard bits (EP+k G). For example the core may be referred to as a SMP (DP) core when the floating standard is DP. By way of example, the k may be an integer such as 0 to 6 in some implementations. In other implementations K may be larger. The number of guard bits k will be assumed to be one unless otherwise stated.

Basic data cores refer to SMP data cores involving numbers operated upon by multiplication and/or addition, and possibly also logic operations such as Boolean operations, table lookups, and various shift-based operations.

In several situations, some basic non-linear operations, such as reciprocal and/or reciprocal square root may be required. For the moment, to simplify the discussion, consider these operations to be provided for floating point numbers, for example, single precision (SP) numbers or double precision (DP) numbers. These operations can be provided by basic Non-Linear Accelerators (NLA), first shown in FIG. 14, which for example may compatible for one of these floating point formats with some number of guard bits (k=0:6). Such basic NLA's are sufficient for system applications involving matrix calculations such as matrix inversion by Gaussian elimination or LU decomposition. The basic NLA may also include a range clamp that can be configured to respond to a received FP number by generating a small integer output and a range limited (or clamped) fractional number, whose absolute value is less than or equal to 1.0. The small integer output can be used to direct a simultaneous process to calculate a range limited approximation of a non-linear function such as sine or cosine, logarithm or exponential, to name some examples.

The Basic NLA core may in some implementations, have no inherent processes associated with it, acting instead as instructed resources arranged in the instruction pipes as shown and owned by one or more simultaneous processes associated with a SMP data core.

There is however a problem with the basic NLA. Polynomial approximations can often times require twice as many multiplications as non-additive terms actually used in the polynomial calculation. The inventors have developed a log based NLA cores specific to single precision floating point and to double precision as shown first in FIG. 14B. Each of these NLA cores is adapted to respond to a number (say X) of a given format (SP or DP) with a specific number of k guard bits, to generate results in that floating point format that are accurate for calculations of up to $X^{Kpow}$. These NLA cores generate and operate on a log number containing a fixed point number whose integer part corresponds to the exponent (exp) part of the floating point format and whose fractional part addresses the mantissa, k guard bits. For single precision Kpow is 24. For double precision, Kpow is 64. In this discussion, k is assumed to be 1.

There is a second problem, Consider for the moment an SMP core that can accumulate a condition vector of operational conditions resulting from a succession of comparison operations of a c-adder or a range clamp into a bit vector of length 64 to 128 bits in length. Such a condition vector may summarize answers to a collection of questions about database entries, such as a person's age, weight, time of birth and so on as a first step in data mining a database of such information. What is also needed is a mechanism to simultaneously match the condition vector against multiple patterns looking for outliers and/or how many of the vectors match a given pattern. The Pattern Recognizer (PR) core serves that purpose, and is adapted to receive the condition vector and simultaneously match the condition vector to a collection of pattern templates to generate and/or update a collection of tallies or generate flags to outlier comparison vectors, as an execution wave front. In FIG. 15, two examples of the PR cores are shown, one with a 32 bit pattern (pat) window (win) length and the second with a 64 bit pattern window length. In some embodiments, this pattern window length may be related to a single execution wave front's matching window length to simultaneously match the patterns recognized by at least part of the PR core.

Figure 16:
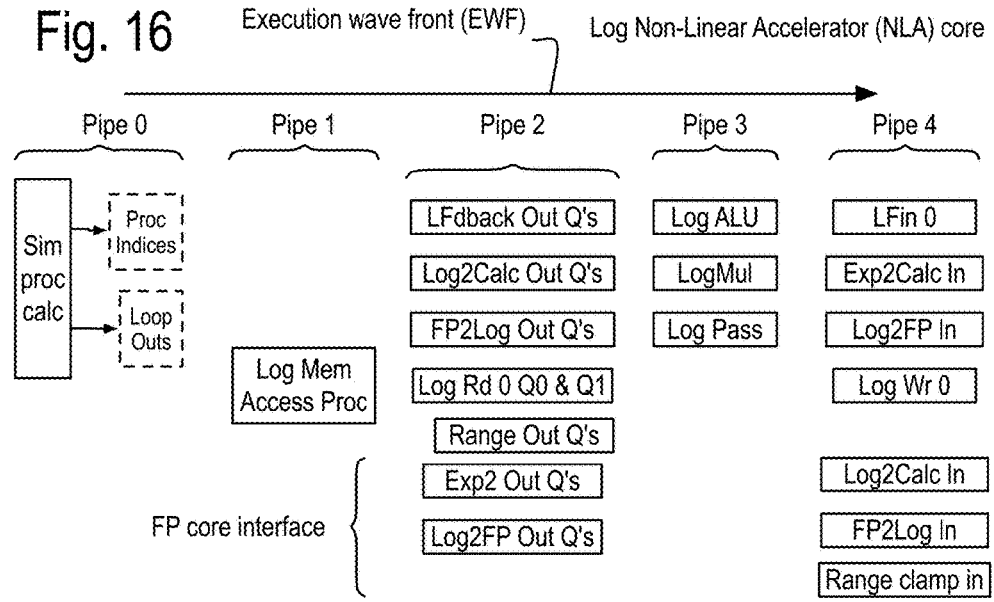

FIG. 16 shows some features of the NLA cores using these log numbers and organized into five instruction pipes traversed by an execution wave front initiated on each local clock cycle. Each of these cores is assumed to have at least two processes, each having a process state and possibly one or more loop outputs, generated by one or more process state calculators in instruction pipe 0. Instruction pipe 1 includes a log memory processor that resolves references to a log domain memory with read ports and queues in instruction pipe 1 and a write port in instruction pipe 4. The instructions pipes shown in this drawing are assumed to interface correctly with the components of FIG. 14. While the structures that implement the log 2 calculations and the exp2 calculations are also new, their discussion is postponed in order to more fully focus on overall instruction processing, which leads to a discussion of nearby local communications, followed by communications that can address the problems of many to one and one to many communications such as required for calculating pivots in matrix inversion by Gaussian elimination and LU decomposition.

Figure 17:
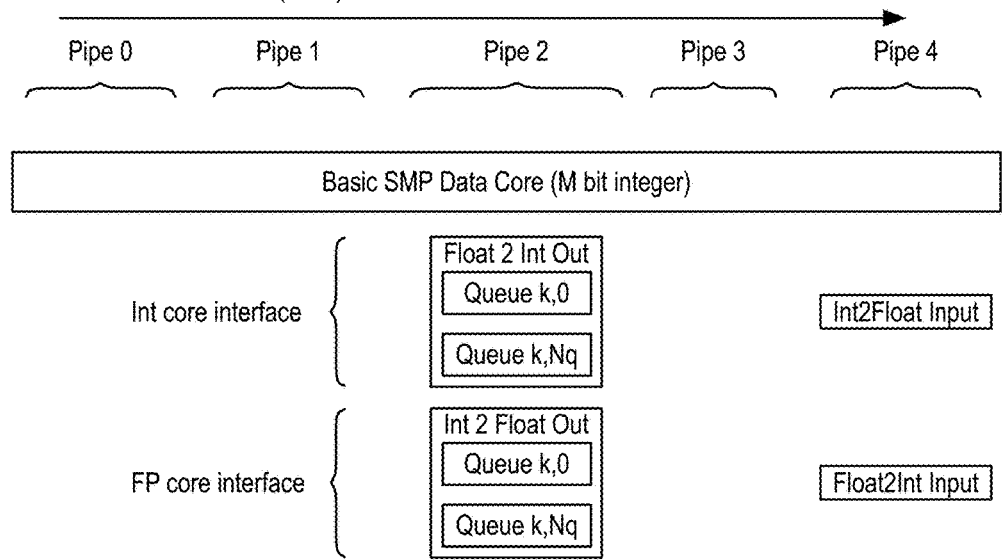

FIG. 17 shows some features of the basic integer data core of FIG. 15. Components such as the multiplier and adders operate on integers, and comparison adders perform integer comparisons, with the winners being output with their corresponding index list in a fashion similar to the comparison adder, which will be discussed in further detail later.

A very interesting simplifying assumption can be implemented in some embodiments. Assume that no simultaneous process owns resources involving more than one type of numbers, so that an integer SMP core's processes only own instructed resources in one or more integer SMP cores, and a FP SMP core processes only own instructed resources in one or more FP SMP cores. In some situations, a SP core's processes may not own instructed resources in a DP core.

Figure 18:
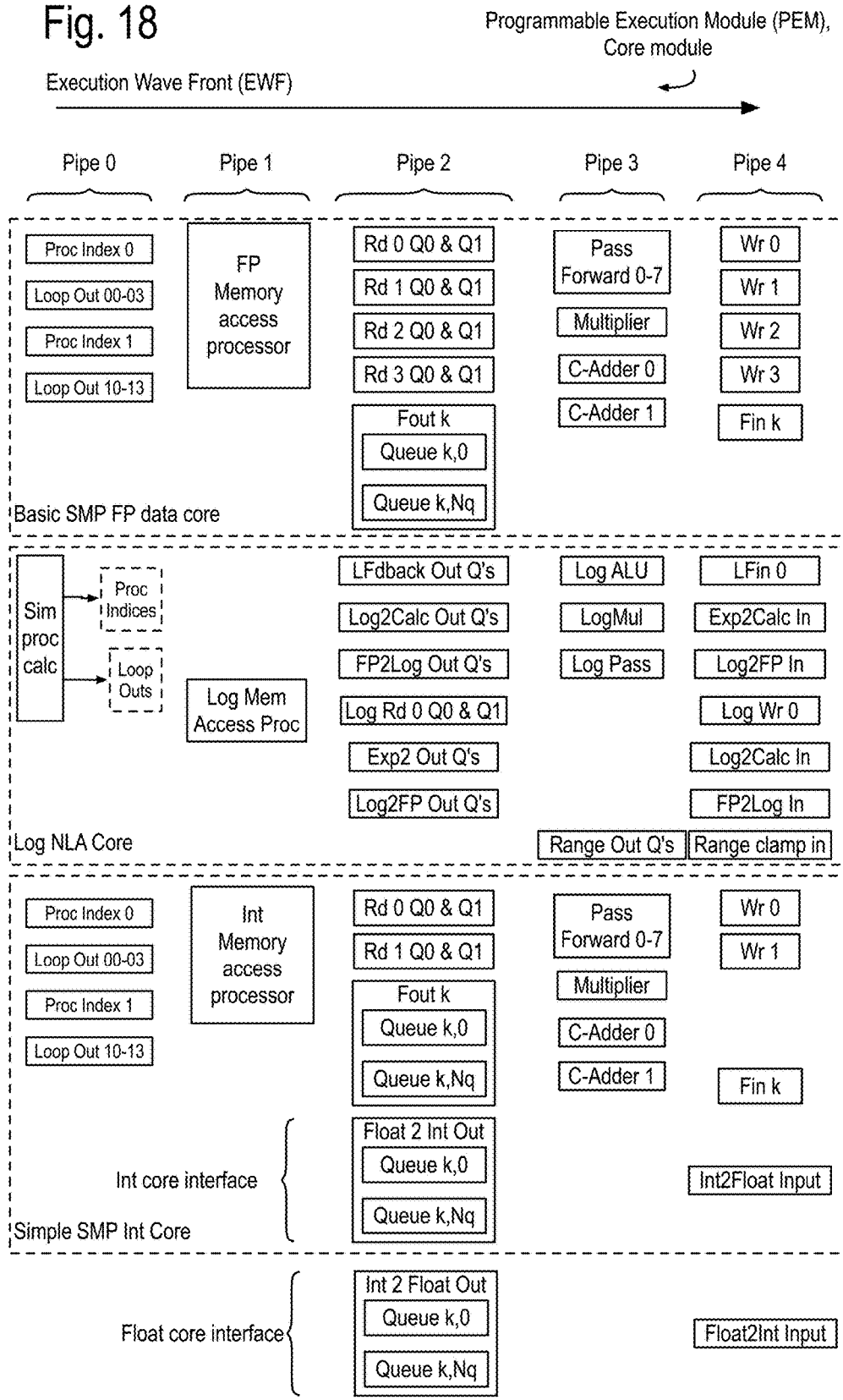

Two circuit provide interfaces between the integer and floating point SMP cores. The float to int circuit converts a floating point number into an integer and the int to float circuit converts an integer to a floating point number. These circuit straddle the two cores in terms of process ownership, the int core interface components may be owned by one of the int SMP core processes, while the FP core interface components may be owned by one of the FP SMP core processes. This is shown in the example of FIG. 18. FIG. 18 shows some features of an example Programmable Execution Module (PEM) or core module including a basic SMP data core as shown in FIG. 14 and a log NLA core as shown in FIG. 16. Return for a moment to FIG. 9. Each of the PEM may include four cores, or core modules, which may each be programmable execution modules including a basic SMP data core, possibly a NLA core and/or integer SMP core, as shown and possibly a pattern recognition core (not shown). The programmer, through their program, determines what instruction resources are owned by which process.

Summarizing, the apparatus may include a Simultaneous Multi-Processor (SMP) core including a process state calculator adapted to generate a state index for each of at least two simultaneous processes; and an instruction pipeline of at least two successive instruction pipe stages adapted to execute the state index for each of the simultaneous processes, collectively performed by an execution wave front through the successive instruction pipe stages with use of an owned instructed resource by one of the simultaneous process determining whether power is supplied to the instructed resource.

Further, in some embodiments, a core module as shown in FIG. 18 may be arranged so that the basic SMP FP data core is located between the log NLA core and the Simple SMP integer core. Also, a PEM of multiple instance of the core module of FIG. 18 may include merging the corresponding cores, such as the Basic simple SMP FP cores to share among their processes only the instructed resources of all the SMP FP cores. Similar organizing may be performed during design, layout and manufacture, so that the simultaneous processes of the log NLA cores and of the SMP integer cores may also be exclusively be shared with just those simultaneous processes.

Figure 19:
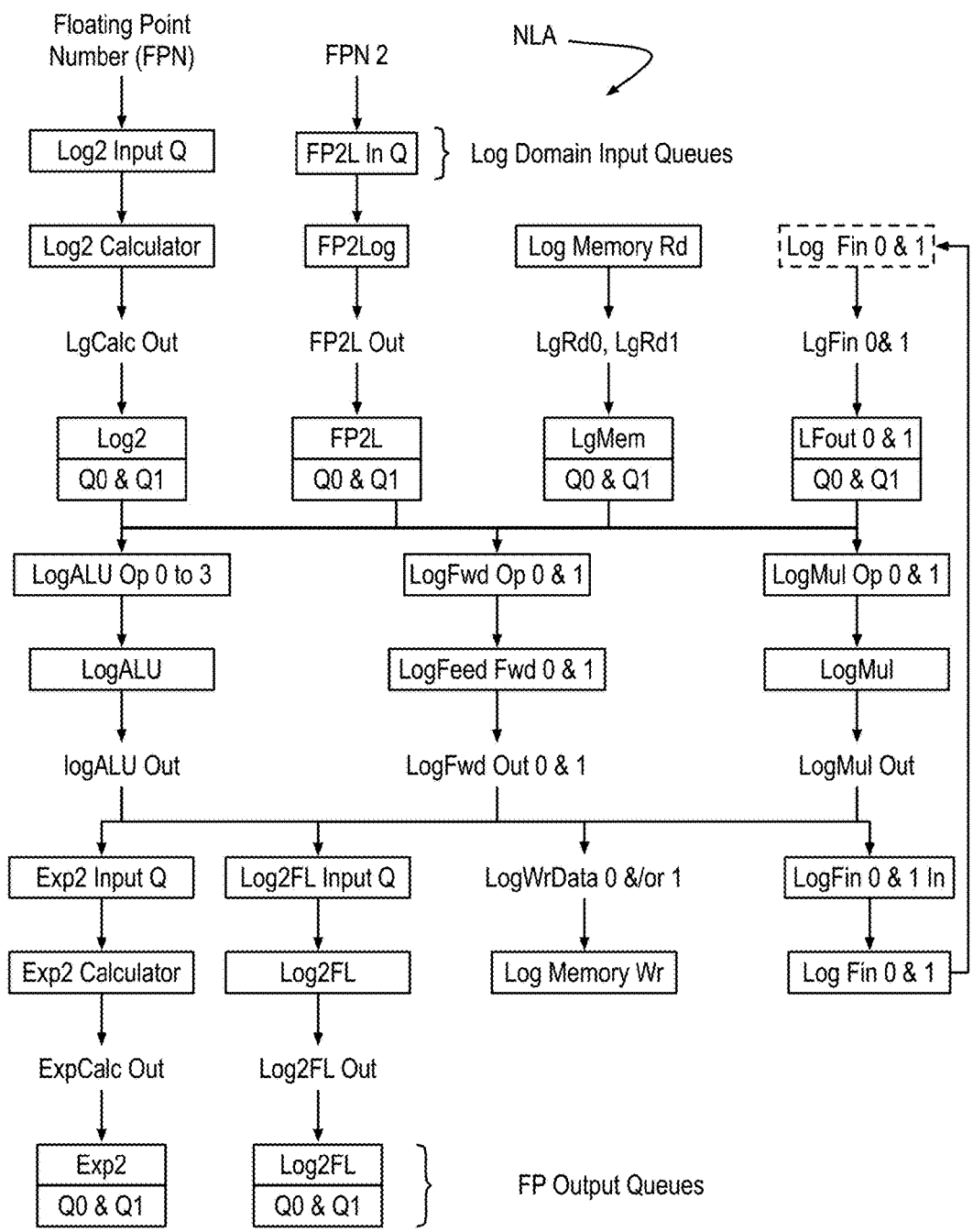

FIG. 19 shows an extended QSigma core including and implementing not only floating point arithmetic, but also log domain arithmetic in the NLA core. In some implementations there may, or may not, be floating point multipliers included in the core and/or a core module including the core, as the log domain arithmetic can provide the multiplications. The reason the multiplier may be included, is that in some embodiments, use of the log domain arithmetic circuitry may consume greater power than the multiplier if all that is needed is a simple product of two numbers. In the top left, floating point numbers labeled FPN and FPN 2 are received by log domain input queues. FPN is received by the Log 2 Input Queue. FPN 2 is received by the FP2L input queue.

FP2L refers to the Floating Point to Log format converter.

Figure 20:
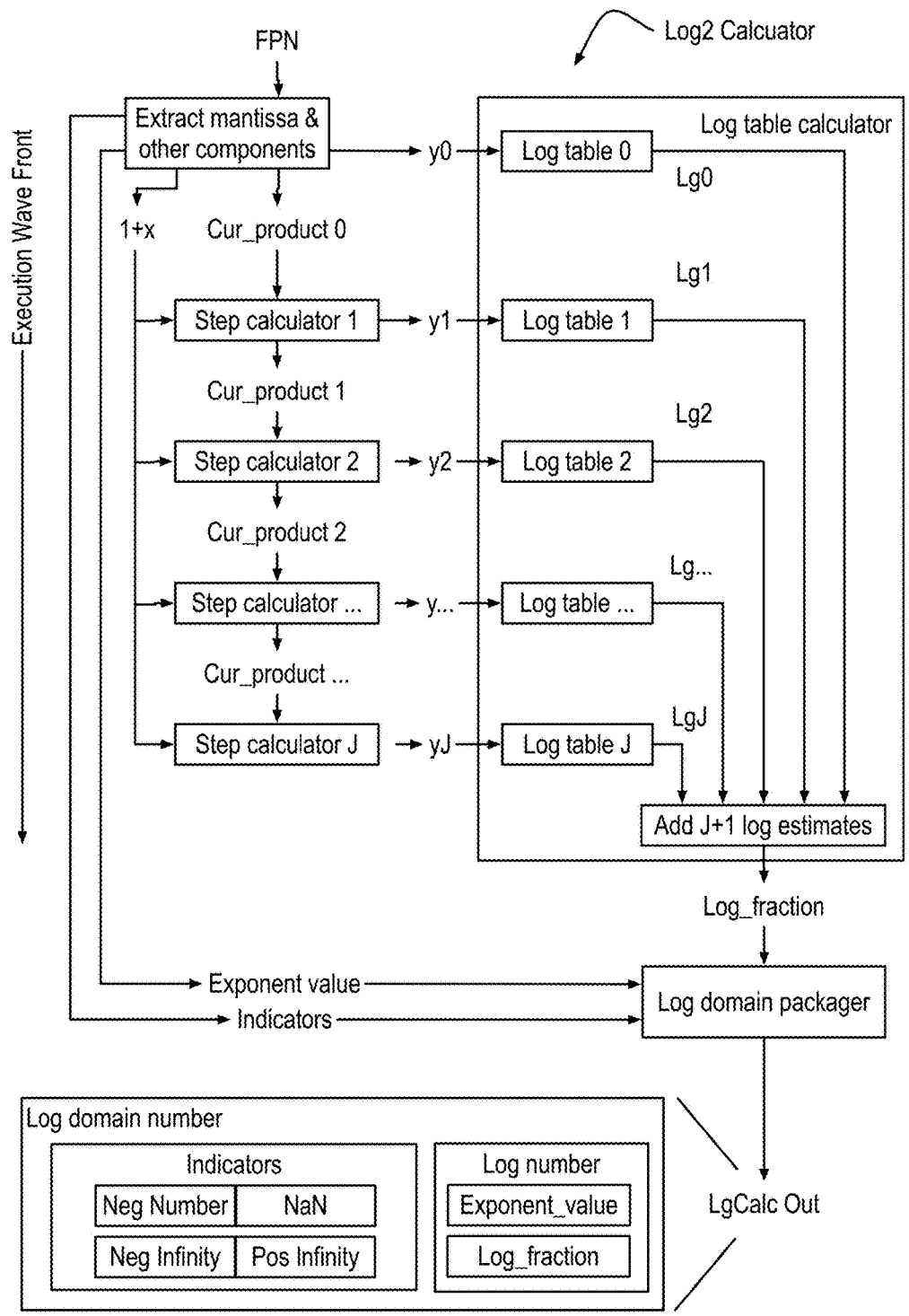

The Log 2 input queue feeds the Log 2 calculator, which responds to the availability of data in the log 2 input queue by generating the LgCalc Output (Out), which is a log domain formatted number, shown in some detail in FIG. 20. The LgCalc Out is then fed into the log 2 output queues 0 and 1 (Q0 & Q1). Various implementations may use a different number of queues for each of the components shown in FIG. 19. There may be no queues for some of the components. The FP2L input queue feeds the FP2 Log format converter, whose output, FP2L Out, stimulates FP2L output queues, FP2L Q0 and FP2L Q1. In the top right of the log domain input queues, one or more log memory read ports are operated to generate two log domain numbers, LgRd0 and LgRd1 retrieved from the log memory. These log numbers feed the log memory output queues, LgMem Q0 and LgMem Q1. The LgRd0 and LgRd1 may include the log number and also an index list of 64 bits. In the top right of FIG. 19, the input portals for two log domain format feedback paths are shown as Log Fin 0 and Log Fin 1. These portals receive Lg Fin 0 and Lg Fin 1, which feed into Log Feedback Output queues LFout0 queue 0 and 1, as well as, LFout1 queue 0 and 1. The middle of FIG. 19 shows two log domain calculation circuits, Log ALU and Log Mul, plus feed forward circuitry, Log Feed Forward (Log Fwd) 0 and 1. Each of these circuits can receive input(s) from any combination of the output queues of the log 2 calculator, the FP2L, the LgMem and/or the LFouts.

The log ALU is shown receiving log domain inputs to feed 4 input queues that generate the log domain numbers used inside the log ALU. These log numbers are added as fixed point numbers with indicators which may include, but are not limited to, Neg(ative) Number, Not-a-Number (NaN), Neg Infinity (NegInf) and Pos Infinity. NegInf results from taking the log 2 of the FP number 0.0. In the Log ALU, adding a log number with NegInf asserted results in a log result with NegInf asserted. The exp2 of a log number of NegInf asserted is FP 0.0. This insures the $0*x=0$, for all normal and denorm FP numbers x.

The FP2L, the Log 2FP and the Log Mul circuits are well enough understood that implementations of these circuits compatible with double precision floating point do not represent any substantial feasibility problems. This leaves the log 2 calculator, exp2 calculator and the log ALU, which will now be considered in turn.

For the NLA to be feasible and testable, it is necessary to derive and analyze the log 2 circuit. Several implementations of the log 2 calculators shown in FIG. 2-3-2 and FIG. 2-3-3 are considered. These log 2 calculators derive a unique factorization of the mantissa plus guard bit extracted from the FPN. The factorization uses a collection of sets of factors, with the non-unit members of each successive set smaller than the preceding set. With the factorization completed, the logarithm is formed as the sum of the logarithms of the factors, each logarithm of the non-unit members of one set is stored in a table.

FIG. 20 shows a version of the log 2 calculator receiving a Floating Point Number (FPN) of FIG. 19 where a circuit extracts an exponent value and indicators and generates a first estimate y0, a first current product (cur_product0), as well as 1+x representing the mantissa. The circuit that extracts the mantissa and other components from the FPN performs the following operations: For a normal FPN, the mantissa of the FPN, with its implicit 1, becomes 1+x. For a denormal FPN, 1+x is formed from the most significant non-zero bit and lower significant bits of the mantissa are shifted up so that the most significant non-zero bit is in the implicit 1 position. And so on.

Once 1+x is generated, an initial selection y0 as the most significant bits of x is made. Assume for the moment that y0 ranges from 0 to 7, the top 3 most significant bits of x. The Cur_product 0 is generated as 1+y0/8. The indicators may include, but are not limited to, Neg(ative) Number, Not-a-Number (NaN), Neg Infinity and Pos Infinity. Something to note, if FPN=0.0 NegInfinity is asserted, otherwise NegInfinity is not asserted. If FPN=$-\infty$ Neg Number is asserted and Pos Infinity is asserted. The exponent value may be calculated based upon the double precision format as defined by "IEEE 754 Standard for Binary Floating-Point Arithmetic" (ANSPIEEE, 1985) and/or subsequent standards. In this and the following version of the log 2 calculator, the step calculators and possibly the log table calculator may have the execution wave front gated off when the indicators indicate that the mantissa is not needed to generate lgCalc Out. The execution wave front may also be gated off when the log 2 calculated is not needed.

Figure 21:
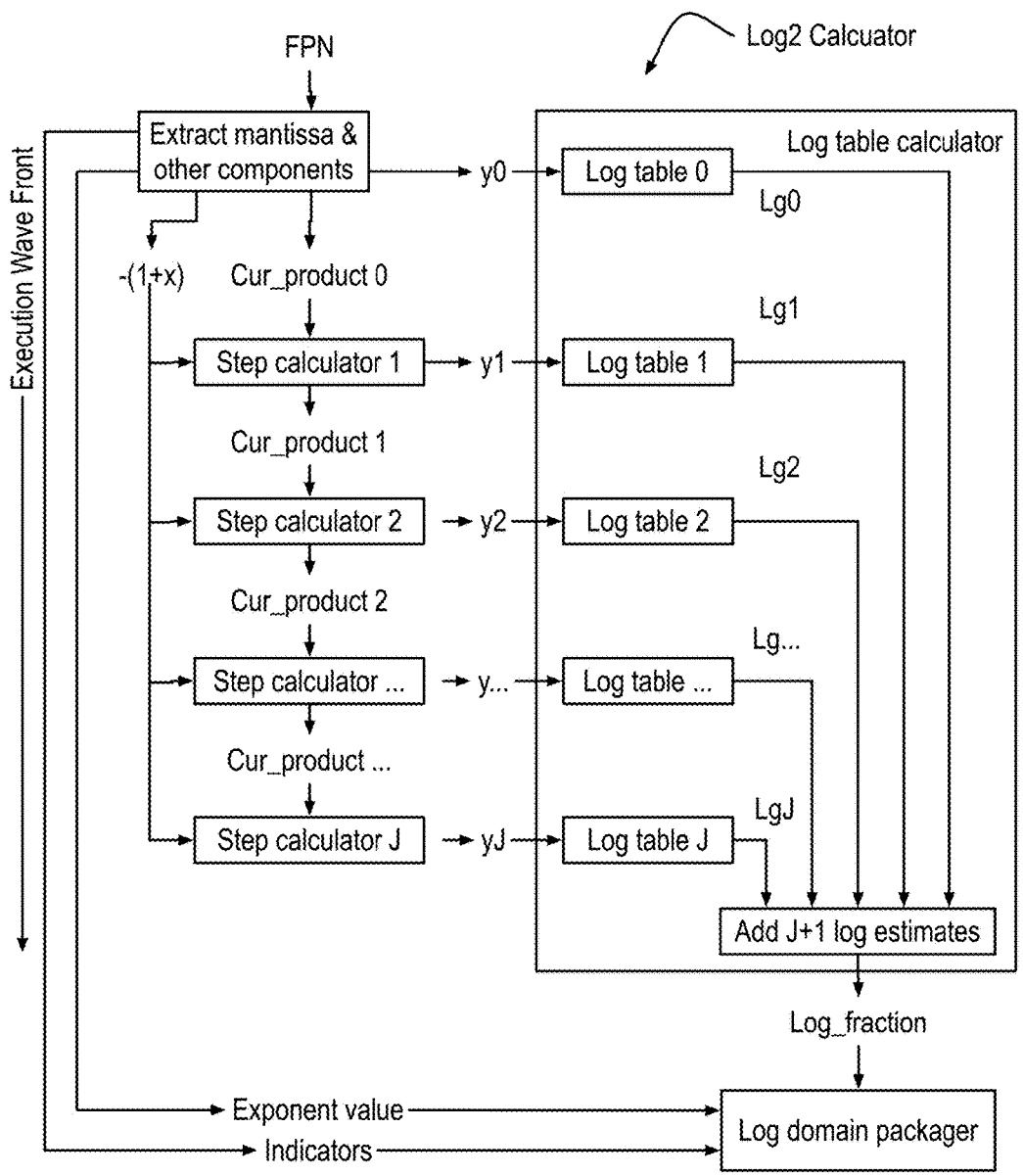

FIG. 21 shows a second version of the log 2 calculator where the circuit that extracts the mantissa and other components generates (1+x), rather than 1+x. The step calculators of FIG. 20 are similar but differ from the step calculators of FIG. 2-3-4B. Both step calculators j of the FIG. 20 and FIG. 21 implement one of the steps that derive the member of the factor set j. Each of them receives the cur_product j−1 and some form of 1+x. The step calculator j generates yj and cur_product j as outputs.

In both Figures, the yj stimulates a log table j to generate Lg j. The cur_product j stimulates the next step calculator j+1, until step calculator J, which does not generate cur_product J+1 nor stimulate a subsequent step calculator. The critical path for the step calculators may be seen as the path to generate the next cur_product and in the last step calculator, the path to generate yJ.

In both Figures, the log table calculator receives the y0 to yJ indexes, which in many implementations are 3 bit numbers, used to access corresponding tables of fixed point numbers to generate Lg 0 to Lg J. The 0 indexed entry represents zero and the other entries are non-zero in at least some of their bits.

Simplistically, in log table 0, the non-zero entries are filled across all the bits. However subsequent log table entries have their top 3 bits zeroed. So log table 1 has its top 3 bits zeroed. The log table 2 has its top 6 bits zeroed. The log table 3 has its top 9 bits zeroed. And so on. Also note that in both Figures, the log table calculator may not be pipe stage aligned with the step calculators.

Formal Verification of the Log 2 Calculator:

Assume that the mantissa of the floating point input is correctly generated with regard to zero, denormals, Not-A-Number (NAN), and infinities. One note, negative infinity in the log domain corresponds to zero in the floating point domain, and adding a log number with negative infinity asserted to another log number generates in a log result with negative infinity set to insure that $0*x=0$ is true in the corresponding floating point operations. Two definitions are used in what follows. First, in performing additions of two binary integers, the result requires the bit level carry propagation to traverse every bit cell formed to calculate the result for corresponding bits of the two numbers. This carry propagation is expensive in circuitry and in propagation time. Second, an alternative known as a carry save adder, invented by von Neumann, generates a local sum and a local carry output in each of the bit cells. Corresponding bits of three integers can be summed with the basic circuit cell. Define these bits as a,b,c and define $$\text{Local\_sum} = a \otimes b \otimes c$$
$$= (a \,\&\, \overline{b} \,\&\, \overline{c}) \cup (\overline{a} \,\&\, b \,\&\, \overline{c}) \cup$$
$$(\overline{a} \,\&\, \overline{b} \,\&\, c) \cup (a \,\&\, b \,\&\, c)$$

$$\text{Local\_carry} = (a \,\&\, b) \cup (a \,\&\, c) \cup (b \,\&\, c)$$

The local_sum is 1 when only one of a, b, and c is one or when all three of them are 1. The local_carry is 1 when two or more of a, b, and c are 1, assuming a bit notation of 1 and 0. Every logic technology used to build computers is likely to have circuit cells capable of implementing this, or some variant of this, circuitry. Assume that the input X has an exponent Xe and a mantissa $1+x=1+\Sigma_{j=1}^{J=18} x_j 8^{-j}$, which includes the guard bit. The mantissa is factored into the following product:

$$1+x=1+\Sigma_{j=1}^{J=18} x_j 8^{-j} = \Pi_{j=1}^{J+1}(1+y_j 8^{-j}) \pm 2^{-56}$$

Because the error is less than ¼ of the guard bit, this factorization is accurate enough to represent the mantissa. Consider $\log_2(\Pi_{j=1}^{J}(1+y_j 8^{-j}))$. Since the logarithm of a product is the sum of the logarithms of the product's terms:

$$\log_2(\Pi_{j=1}^{J+1}(1+y_j 8^{-j})) = \Sigma_{j=1}^{J+1} \log_2(1+y_j 8^{-j})$$

So putting these pieces together: $\log\_fraction = \log_2(1+x) = \Sigma_{j=1}^{J+1} \log_2(1+y_j 8^{-j})$ This is a sum of an entry from each of J+1=19 tables, each table having 7 non-zero entries. The table entries are fixed point and as accurate as needed to insure the log_fraction is as accurate as required. The problem to be solved is that, given $1+x=1+\Sigma_{j=1}^{J} x_j 8^{-j}$, we need to find the best fit of $1+\Sigma_{j=1}^{J} x_j 8^{-j} = \Pi_{j=1}^{J+1}(1+y_j 8^{-j})$. By best fit, we mean that each product term $(1+y_j 8^{-j})$ has a non-negative remainder that is the smallest positive remainder of the choices for the factors $(1+y_j 8^{-j})$, with $y_j$ ranging from 0 to 7. Once found $\log\_2\_calc = \Sigma_{j=1}^{J+1} \log\_2\_table(1+y_j 8^{-j})$. Steps to the solution include initialization, preparing for a subsequent factoring step, performing the factoring step and calculating the logarithm after the last factoring step.

Initialization: Assume we have already calculated log_2_table as having 19 by 8 entries, with the log_2_table (j,0)=0, for each j from 1 to 19. Further assume these table entries are accurate to M fixed point bits and whatever additions are performed in a M+1 bit unsigned integer adder structure, so that overflow is the top most bit.

We are about to calculate a vector $[y_1 y_2 \ldots y_{19}]$ representing the best fit product terms $1+\Sigma_{j=1}^{J} x_j 8^{-j} \approx \Pi_{j=1}^{J+1}(1+y_j 8^{-j})$. Let $y_1 = x_1$. The remainder is $$(1+x)-(1+y_1 8^{-1}) = (1+1\Sigma_{j=1}^{J} x_j 8^{-j}) - (1+x_1 8^{-1}) =$$
$$\Sigma_{j=2}^{J} x_j 8^{-j}$$

which is non-negative. Observe that this is the best fit for the first product term. Consider choosing a different value Y for $y_1$.

If $Y>x_1$ then it is not a valid choice since the remainder would be negative.

If $x_1>0$ and $Y<x_1$, then the remainder $(Y-x_1)8^{-1}+\Sigma_{j=2}^{J} x_j 8^{-j}$ is greater than $\Sigma_{j=2}^{J} x_j 8^{-j}$.

If $x_1=0$, then there is no smaller acceptable Y.

Preparing for each subsequent factoring step: Initialization uses an implicit term, a ScalingFactor=$8^{-1}$. Assume that the previous step had an existing value for the ScalingFactor. Update the ScalingFactor=ScalingFactor*$8^{-1}$.

In many implementations, there is some counter j whose value is incremented. After initialization, j=2.

For subsequent factoring steps j=j+1. Initialization generates a first best fit product, which is $1+x_1 8^{-1}$.

Assume for subsequent steps that the best fit product is denoted as Prev_Product. Subsequent factorization steps calculate a vector Cur_product$_k$=Prev_product*(1+k*ScalingFactor) for k=1, ..., 7. Calculate a second vector Remainder$_k$=(1+x)−Cur_product$_k$ again, for k=1, ..., 7. If Remainder$_1$>0 then select y$_j$=max{k such that Remainder$_k$≥0} Otherwise, y$_j$=0.

Hypothesis: y$_j$ is the best fit with a non-negative remainder.

Proof: if y$_j$=0 then there was no non-negative remainder Remainder$_{k=1, \ldots, 7}$ from the Cur_product$_{k=1, \ldots, 7}$ vector.

Otherwise, since the Remainder$_{k=1, \ldots, 7}$ vector declines for each successive k, picking the largest k with a non-negative Remainder$_k$ insures that this choice has the smallest non-negative remainder. After the last factorization step, the vector $[y_1 y_2 \ldots y_{19}]$ has been calculated.

The one remaining concern is the difference of remainders for the last step, denoted here as Diff$_{19}$. Now, if y$_{19}$>0 then Diff$_{19}$=Cur_product$_1$−Prev_product which can be calculated as $$\text{Diff}_{19} = \text{Cur\_product}_{19} - \text{Prev\_product} <$$
$$(1 + 1/8^{19})\text{Prev\_product}-\text{Prev\_product}$$
$$= 2^{-3*19}\text{Prev\_product} \leq 2^{-3*19}(1+x) < 2^{-3*19}(2) = 2^{-56}$$

$$\text{And } \left|\left(1 + \sum_{j=1}^{J} x_j 8^{-j}\right) - \prod_{j=1}^{J+1}(1+y_j 8^{-j})\right| < \text{Diff}_{19} < 2^{-56} = \frac{1}{4}\text{Guardbit}$$

Otherwise $y_{19} =$ $$0 \text{ and } \left|\left(1 + \sum_{j=1}^{J} x_j 8^{-j}\right) - \prod_{j=1}^{J+1}(1+y_j 8^{-j})\right| < \text{Diff}_{19} < 2^{-56} = \frac{1}{4}\text{Guardbit}$$

The generated product satisfies $|(1+x)-\Pi_{j=1}^{J+1}(1+y_j 8^{-j})|<2*2^{-19*3}=2^{-56}$ which is within ¼ of the guard bit. Recall that $1 \leq 1+x < 2$. Note that $|(1+x)-\Pi_{j=1}^{J}(1+y_j 8^{-j})|<2*2^{-18*3}=2^{-53}$, which is twice the guard bit, indicating that the loop terminates at or before J+1.

Figure 22:
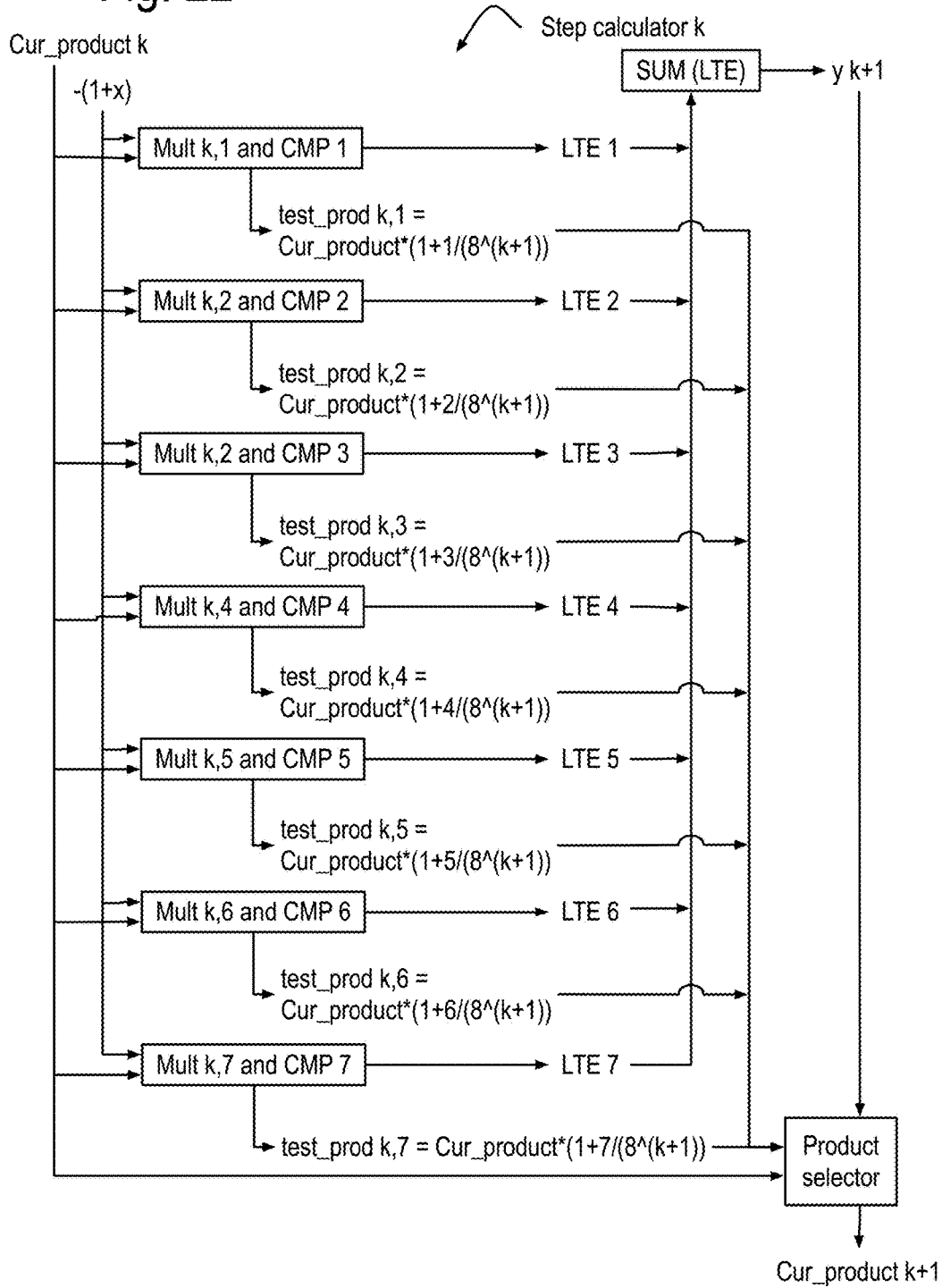

FIG. 22 shows an example of the step calculator k compatible with the log 2 calculator shown in FIG. 21, which uses a SUM(LTE) circuit to generate y k+1. ### By way of explanation, the LTE bits can be counted or summed to form exactly the same y k+1 as the MAX circuit. However, the MAX circuit is closer to the thinking of the formal verification. Another note, if one of the LTE bits is 0 when a higher LTE bit is 1, this may indicate a flaw in the logic of the step, which can be captured to indicate a hardware failure.

Implementation of the Log 2 Calculator:

FIG. 23 through FIG. 26 show an example using 1+x distributed to each of the step calculators as shown in FIG. 22. FIG. 2-3-8A to FIG. 2-3-8G show bock diagrams of the Mult k,j and CMP j circuits implemented using the distributed 1+x and propagating a non-redundant test product k,j for j=1 to 7 in the step calculator k circuits. This approach requires one carry propagate adder to calculate the test product, and uses an unsigned integer comparator made from logic cell blocks in FPGA's or standard cells in an ASIC or a custom integrated circuit.

Figure 23:
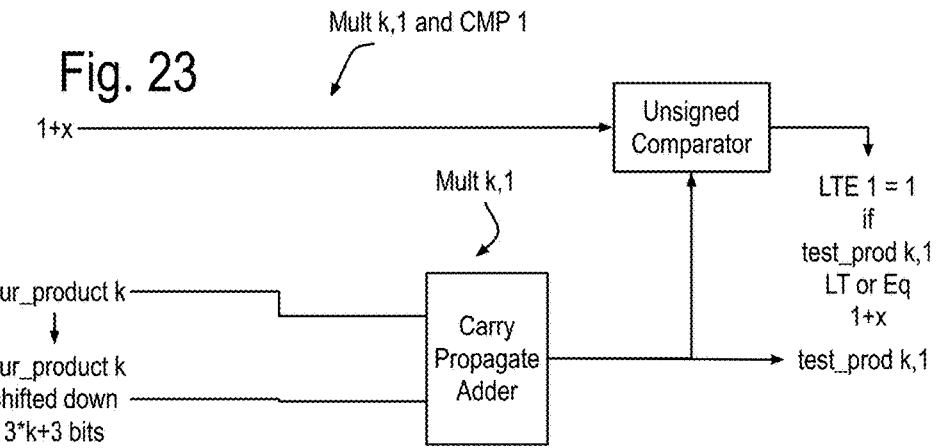
Figure 24:
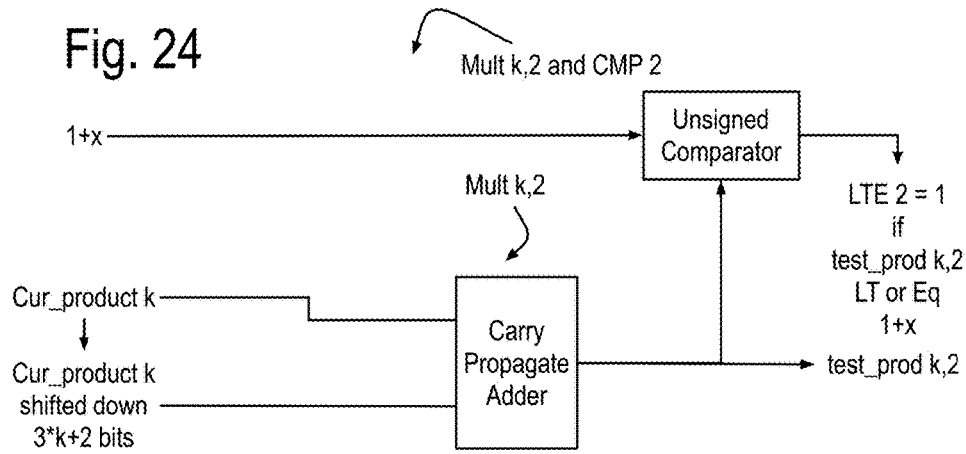
Figure 25:
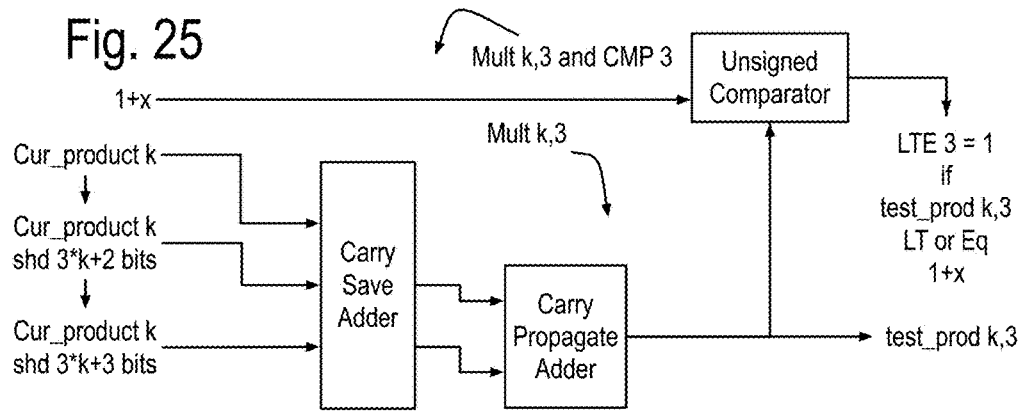
Figure 26:
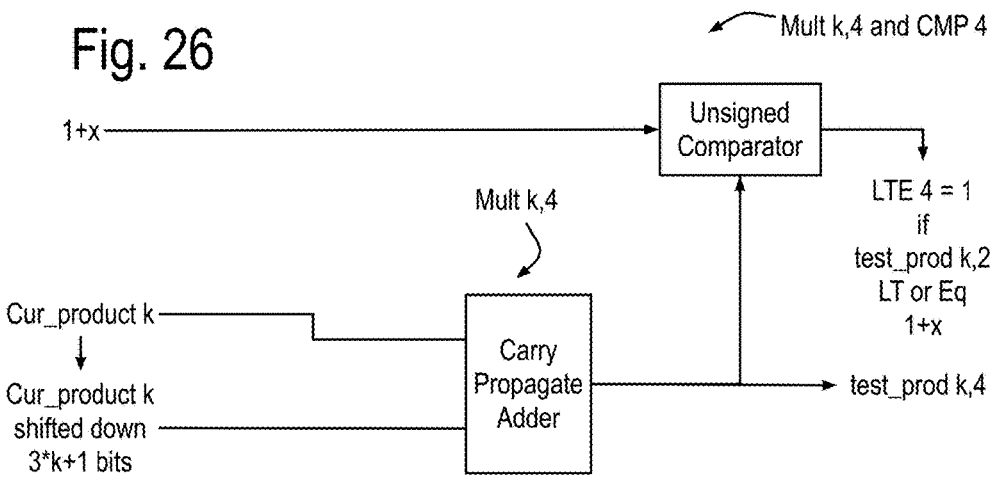
Figure 27:
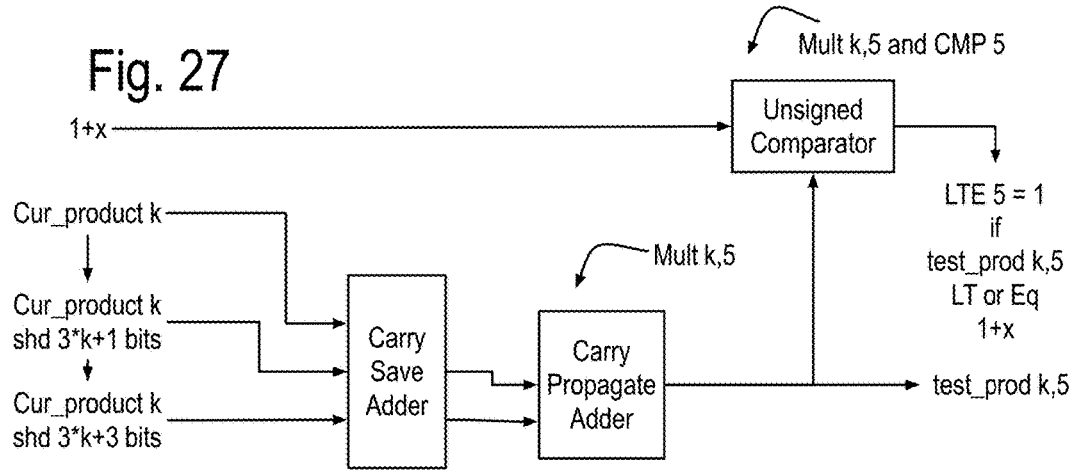
Figure 28:
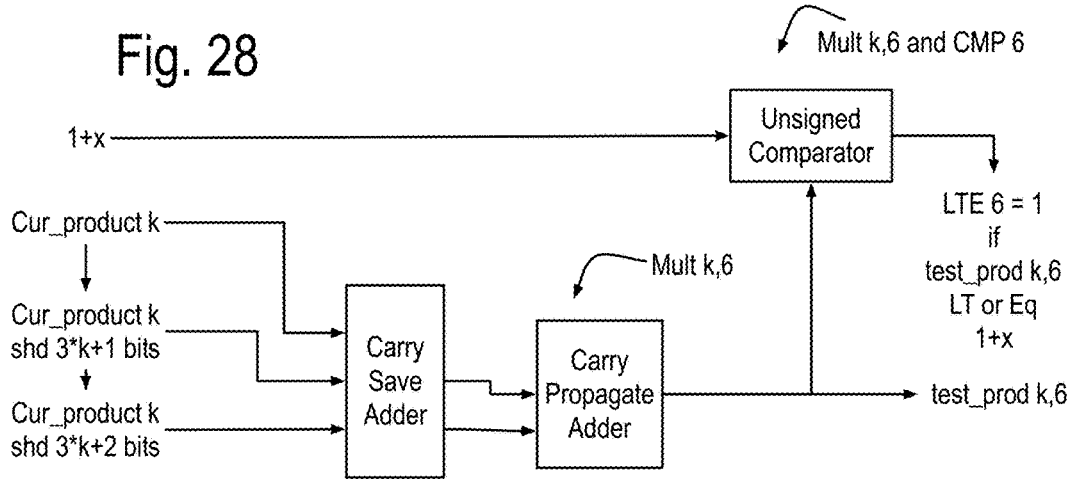
Figure 29:
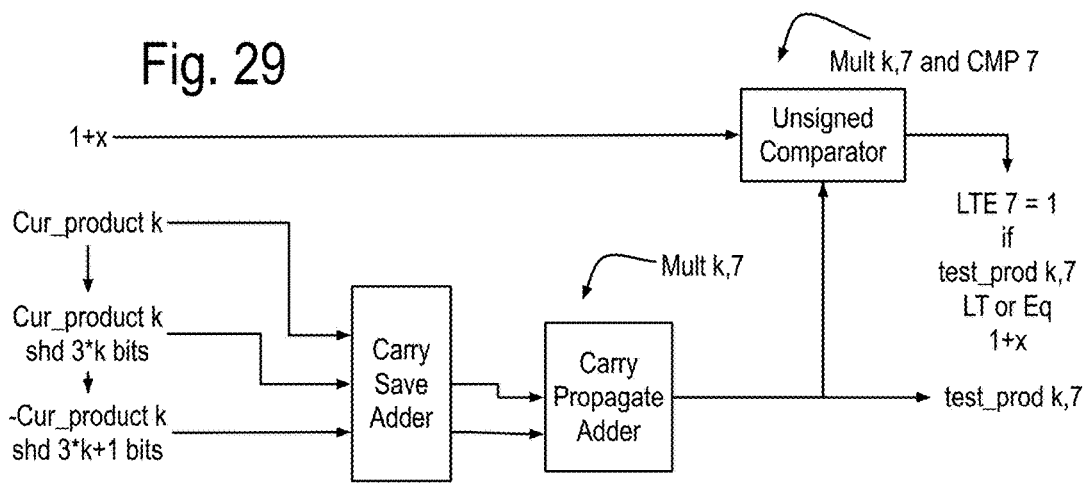

FIG. 23 shows an implementation of Mult k,1 and CMP 1 using the distributed 1+x and propagating a non-redundant test product k,j for j=1 to 7 in the step calculator k circuits. Mult k,1 implements test_prod k,1=Cur_product k+Cur_product k*$2^{-3K-3}$, which is Cur_product k*$(1+\frac{1}{8}^{k+1})$. The test_prod k,1 result and 1+x are presented to a comparator to generate LTE 1. FIG. 24 shows an implementation of Mult k,2 and CMP 2 using the distributed 1+x and propagating a non-redundant test product k,j for j=1 to 7 in the step calculator k circuits. Mult k,2 implements test_prod k,2=Cur_product k+Cur_product k*$2^{-3K-2}$, which is Cur_product k*$(1+\frac{2}{8}^{k+1})$. The test_prod k,2 result and 1+x are presented to a comparator to generate LTE 2. FIG. 25 shows an implementation of Mult k,3 and CMP 3 using the distributed 1+x and propagating a non-redundant test product k,j for j=1 to 7 in the step calculator k circuits. Mult k,3 implements test_prod k,3=Cur_product k+Cur_product k*$2^{-3K-3}$+Cur_product k*$2^{-3K-2}$, which is Cur_product k*$(1+\frac{3}{8}^{k+1})$. The test_prod k,3 result and 1+x are presented to a comparator to generate LTE 3. FIG. 26 shows an implementation of Mult k,4 and CMP 4 using the distributed 1+x and propagating a non-redundant test product k,j for j=1 to 7 in the step calculator k circuits. Mult k,4 implements test_prod k,4=Cur_product k+Cur_product k*$2^{-3K-1}$, which is Cur_product k*$(1+\frac{4}{8}^{k+1})$. The test_prod k,4 result and 1+x are presented to a comparator to generate LTE 4. FIG. 27 shows an implementation of Mult k,5 and CMP 5 using the distributed 1+x and propagating a non-redundant test product k,j for j=1 to 7 in the step calculator k circuits. Mult k,5 implements test_prod k,5=Cur_product k+Cur_product k*$2^{-3K-3}$+Cur_product k*$2^{-3K-1}$, which is Cur_product k*$(1+\frac{5}{8}^{k+1})$. The test_prod k,5 result and 1+x are presented to a comparator to generate LTE 5. FIG. 28 shows an implementation of Mult k,6 and CMP 6 using the distributed 1+x and propagating a redundant test product k,j for j=1 to 7 in the step calculator k circuits. Mult k,6 implements test_prod k,6=Cur_product k+Cur_product k*$2^{-3K-2}$+Cur_product k*$2^{-3K-1}$, which is Cur_product k*$(1+\frac{6}{8}^{1+1})$. The test_prod k,6 result and 1+x are presented to a comparator to generate LTE 6. FIG. 29 shows an implementation of Mult k,7 and CMP 7 using the distributed 1+x and propagating a non-redundant test product k,j for j=1 to 7 in the step calculator k circuits. Mult k,7 implements test_prod k,7=Cur_product k+Cur_product k*$2^{-3K-3}$+Cur_product k*$2^{-3K-2}$+Cur_product k*$2^{-3K-1}$, which is Cur_product k*$(1+\frac{7}{8}^{1+1})$. The test_prod k,7 result and 1+x are presented to a comparator to generate LTE 7.

Calculating the logarithm as the sum of product terms: For the moment, consider 1+x to be exact as this product. Calculating $\log_2(1+\Sigma_{j=1}^{J}x_j 8^{-j})=\log_2(\Pi_{j=1}^{J+1}(1+y_j 8^{-j}))=\Sigma_{j=1}^{J+1}\log_2(1+y_1 8^{-j})$ can be done as accurately as the product term table is calculated, since the accumulation of rounding errors can be controlled by using accurate enough estimates in the log 2 table. The sum of 19 numbers with ½ LSB errors, has a rounding error estimate of Rounding_error=$\log_2(19)\approx 4.25$ bits, so if a log domain calculator is to be accurate to ½ the guard bit in calculating $X^{64}$ then the table entries need to be accurate to 54+6+4.25 bits, or 64¼ bits. Note that the circuitry being described can just as readily implement log 2 calculators for single or quad floating point precision. What changes is the number of step calculators and the precision of the arithmetic being performed in those calculators and the amount of precision (and number of tables) in the Log Tables, as well as the number of Lg0 to LgJ log estimates, the precision of the log_fraction and the specifics of the log domain packager. At this time, the focus of scientific and engineering calculations projected to run on exascale computers and high performance computers is double precision. Also note, the initialization step may use any number of bits to calculate y0, from 1 to N<55. However, table sizes favor N<12 and preferably N<=10, given contemporary memory technologies. The future could well be different and preferences for N may change. The above discussion used N=3 to simplify the derivation, not limit it to just that value of N.

Summarizing, the apparatus may include a log 2 calculator adapted to receive a floating point operand and to generate a log domain operand corresponding to the floating point operand with a floating point standard, comprising a component extractor adapted to respond to the floating point operand by generating an exponent, an indicator collection, a mantissa representing 1+x, where x is greater than or equal to 0 and x is less than 1, an initial product estimate Cur_product 0, and an initial factor estimate y[0]. The log 2 calculator may include at least one step calculator adapted to determine a subsequent product estimate Cur_product j+1, a subsequent factor estimate y[j+1] in response to receiving the mantissa 1+x, the Cur_Product j, for j ranging from 0 up to J−1, wherein the J is at least 7; a log table calculator adapted to respond to receiving the y[0], to y[J] by generating a log fraction as the sum of log 2 table entries accessed by y[k], for k ranging from 0 to the J; and a domain packager responding to the exponent, the indicator collection, and the log fraction to generate the log domain operand. The log 2 calculator may include from one to 19 instances of the step calculator. The initial factor estimate may include at least the top L bits of x, wherein the L is a member of the group consisting of 1, 2, 3, 4, 5, 6, 7, 8, 9, 10, 11 and 12.

Figure 30:
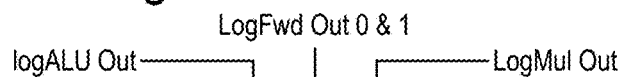
Figure 31:
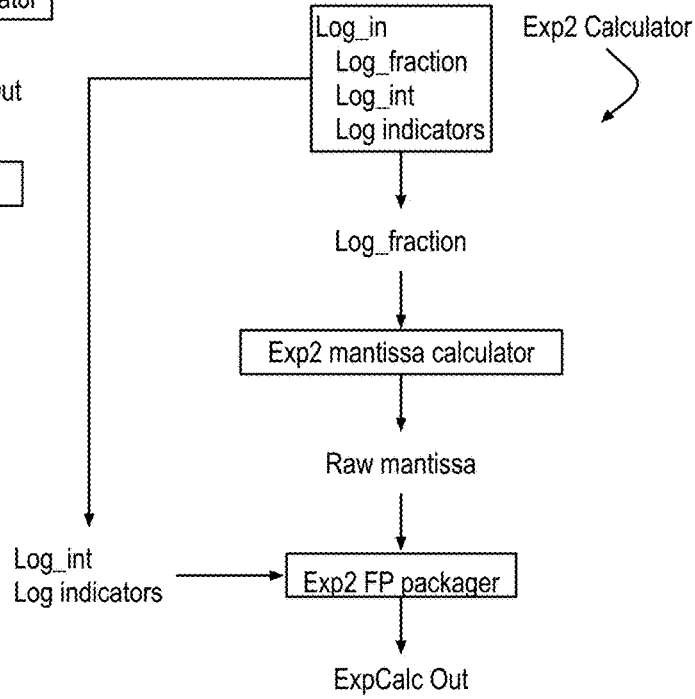

An Exp2 Circuit Implementation: FIG. 30 shows a block diagram of the exp2 calculator shown in Fig. Q2-Q3-2 and FIG. 19. The log ALU out(put), Log Fwd (forward) Out(put 0 and 1, and log Mul Out(put) stimulate the Exp2 input selector (an instructed resource) which responds to a non-null instruction by selecting one of these log domain inputs to generate ExpCalc In, a log domain number. The ExpCalc In stimulates the Exp2 Input Queue, which drives the Exp2 Calculator. When the Exp Input Queue presents the ExpCalc In, the Exp2 calculator responds to the ExpCalc In by generating ExpCalc Out, which is presented to output queues of the exp2 circuit as floating point numbers. These floating point outputs are double precision, but other implementations can support other floating point formats such as single or quad precision floating point. FIG. 31 shows the exp2 calculator of FIG. 30 configured to receive a log domain input (log_in) including a log fraction, a log int and log indicators. The log int and log fraction are combined in the log domain arithmetic units log ALU and Log Mul to act as a fixed point number. However, in this circuit they are separately used to form the ExpCalc Out(put) of FIG. 19. An Exp2 mantissa calculator implementation; The log_fraction (denoted as .f1f2f3f4f5f6) of FIG. 30 is sent to an exp2 mantissa calculator to create a raw mantissa. The raw mantissa embodies $2^{\Sigma_{j=1}^{6}f_j 2^{-9j}}=\Pi_{j=1}^{6}2^{f_j 2^{-9j}}$ where Log_fraction=$\Sigma_{j=1}^{6}f_j 2^{-9j}$.

Figure 32:
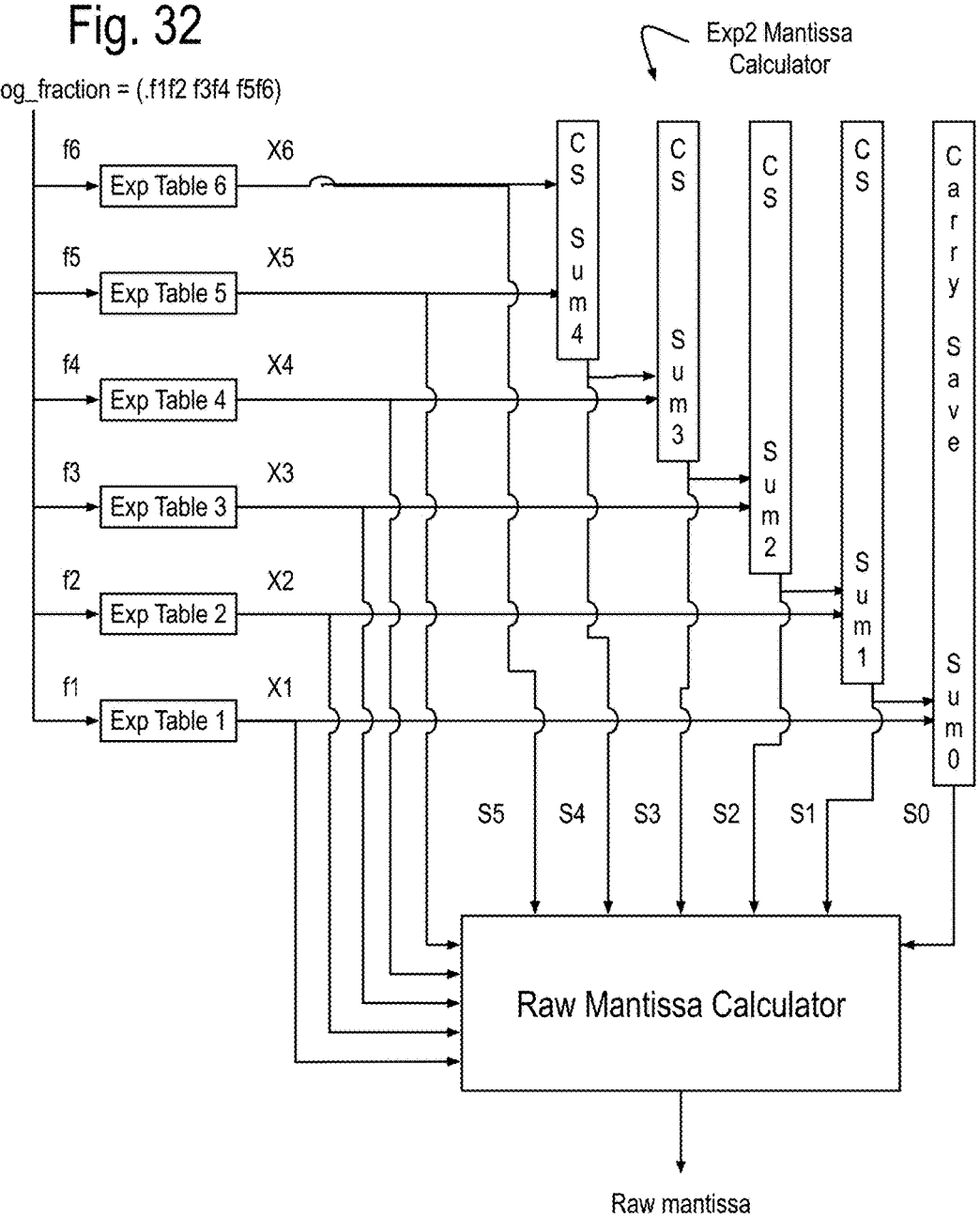

Define 6 numbers, $X_k=2^{X_k 2^{-9k}}-1$ for each of the fractional part of outputs Xk of these 6 tables. So RawMantissa=$\Pi_{k=1}^{6}(1+X_k)=(1+X_1)(1+X_2)(1+X_3)(1+X_4)(1+X_5)(1+X_6)$ First, let's make the following definitions $S_0=\Sigma_{k=1}^{6}X_k$ $S_1=\Sigma_{k=2}^{6}X_k$ ... $S_j=\Sigma_{k=j+1}^{6}X_k$ and $S_6=0$ FIG. 32 shows Exp2 mantissa calculator decomposed based upon these definitions as follows: The Raw mantissa calculator receives X1 to X6 as well as S0 to S4 and uses these numbers to generate the raw mantissa. Now decompose the RawMantissa product by collecting the sums wherever possible, which gives the following $$RawMantissa = (1 + X_1)(1 + X_2)(1 + X_3)(1 + X_4)$$
$$(1 + X_5)(1 + X_6)$$
$$= 1 + S_0 + X_1 * S_1 + X_2 * S_2 + X_3 * S_3 +$$
$$X_4 * S_4 + X_5 * S_5 + X_6 * S_6 + X_1 *$$
$$(X_2 * S_2 + X_3 * S_3 + X_4 * S_4 + X_5 * S_5 + X_6 * S_6) +$$
$$X_2 * (X_3 * S_3 + X_4 * S_4 + X_5 * S_5 + X_6 * S_6) +$$
$$X_3 * (X_4 * S_4 + X_5 * S_5 + X_6 * S_6) +$$
$$X_4 * (X_5 * S_5 + X_6 * S_6) + X_5 * X_6 * S_6 +$$
$$X_1 * X_2 * (X_3 * S_3 + X_4 * S_4 + X_5 * S_5 + X_6 * S_6) +$$
$$X_2 * X_3 * (X_4 * S_4 + X_5 * S_5 + X_6 * S_6) +$$
$$X_3 * X_4 * (X_5 * S_5 + X_6 * S_6) + X_4 * X_5 * (X_6 * S_6) +$$
$$X_1 * X_2 * X_3 * (X_4 * S_4 + X_5 * S_5 + X_6 * S_6) +$$
$$X_2 * X_3 * X_4 * (X_5 * S_5 + X_6 * S_6) + X_3 * X_4 * X_5 *$$
$$X_6 * S_6 + X_1 * X_2 * X_3 * X_4 * (X_5 * S_5 + X_6 * S_6) +$$
$$X_2 * X_3 * X_4 * X_5 * X_6 * S_6 +$$
$$X_1 * X_2 * X_3 * X_4 * X_5 * X_6 * S_6$$

Now to resolve how to calculate the raw mantissa with the least logic in a formally verifiable manner, because the input space cannot be exhaustive examined, verified or tested. This implementation is derived from the above formula and analysis of the facts below. The maximum table entries for the six tables were calculated using Wolfram Alpha and Mathematica as a starting point for analysis of the required circuitry.

| k | No of bits | Max bit from top | Max X | Max Value (hex) | Max $S_k$ | Remarks |
|---|---|---|---|---|---|---|
| 1 | 59 | 0 | $<2^0$ | f f4ea ca43 91b5 da.33 | $<2^{-8}$ | Largest very close to 1.0 |
| 2 | 50 | 9 | $<2^{-9}$ | 5 89c0 1bd1 29f8.da | $<2^{-17}$ | |
| 3 | 41 | 18 | $<2^{-18}$ | 2 c465 b8f1 67.05 | $<2^{-26}$ | |
| 4 | 32 | 27 | $<2^{-27}$ | 1 6232 bde6. fc | $<2^{-35}$ | |
| 5 | 23 | 36 | $<2^{-36}$ | b 1195e.eb | $<2^{-44}$ | |
| 6 | 14 | 45 | $<2^{-45}$ | 588c.af | 0 | Largest entry in smallest magnitude table |

Observe table row 6, any product involving $S_6=0$ has no effect on the RawMantissa. This simplifies the above formula as follows $$RawMantissa = (1 + X_1)(1 + X_2)(1 + X_3)(1 + X_4)(1 + X_5)(1 + X_6)$$
$$= 1 + S_0 + X_1 * S_1 + X_2 * S_2 + X_3 * S_3 +$$
$$X_4 * S_4 + X_5 * S_5 +$$
$$X_1 * (X_2 * S_2 + X_3 * S_3 + X_4 * S_4 + X_5 * S_5) +$$
$$X_2 * (X_3 * S_3 + X_4 * S_4 + X_5 * S_5) +$$
$$X_3 * (X_4 * S_4 + X_5 * S_5) + X_4 * (X_5 * S_5) +$$
$$X_1 * X_2 * (X_3 * S_3 + X_4 * S_4 + X_5 * S_5) +$$
$$X_2 * X_3 * (X_4 * S_4 + X_5 * S_5) +$$
$$X_3 * X_4 * X_5 * S_5 +$$
$$X_1 * X_2 * X_3 * (X_4 * S_4 + X_5 * S_5) +$$
$$X_2 * X_3 * X_4 * X_5 * S_5 +$$
$$X_1 * X_2 * X_3 * X_4 * X_5 * S_5$$

Collecting the terms involving $X_5*S_5$ from the RawMantissa formula we have following multiplied by $X_5*S_5$:

$$1 + X_1 + X_2 + X_3 + X_4 + X_1 * X_2 + X_2 * X_3 +$$
$$X_3 * X_4 + X_1 * X_2 * X_3 + X_2 * X_3 * X_4 + X_1 * X_2 * X_3 * X_4$$

Observe the table row 5, $X_6 = S_5 < 2^{-44}$ and $Max(X_5 S_5) < 2^{-36} 2^{-44} = 2^{-80}$. Recall that $0 \leq X_j \leq max(X_j) < 1$ for j=1:4. So that if we count up all terms multiplied by $X_5*S_5$, the above sum is less than 11, which means that these terms have no significance on the total for the RawMantissa. This simplifies the above formula as follows:

$$RawMantissa = (1 + X_1)(1 + X_2)(1 + X_3)(1 + X_4)(1 + X_5)(1 + X_6)$$
$$= 1 + S_0 + X_1 * S_1 + X_2 * S_2 + X_3 * S_3 + X_4 * S_4 +$$
$$X_1 * (X_2 * S_2 + X_3 * S_3 + X_4 * S_4) +$$
$$X_2 * (X_3 * S_3 + X_4 * S_4) + X_3 * X_4 * S_4$$
$$X_1 * X_2 * (X_3 * S_3 + X_4 * S_4) +$$
$$X_2 * X_3 * X_4 * S_4 + X_1 * X_2 * X_3 * X_4 * S_4$$

Collecting the terms involving $X_4*S_4$ from the RawMantissa formula we have following multiplied by $X_4*S_4$: $1+X_1+X_2+X_3+X_1*X_2+X_2*X_3+X_1*X_2*X_3$ Observe row 4, $Max(X_4 S_4) < 2^{-27} 2^{-35} = 2^{-62}$. Again applying the insight that we have 7 terms, each of which is less than 1, this sum of terms can have no effect because $7*2^{-62} < 2^{-62+3} = 2^{-59}$ which makes the sum of these product terms less than numbers 5 bits below the guard bit of the RawMantissa. Based upon this insight the formula becomes $$RawMantissa = (1 + X_1)(1 + X_2)(1 + X_3)(1 + X_4)(1 + X_5)(1 + X_6)$$

-continued $$= 1 + S_0 + X_1 * S_1 + X_2 * S_2 + X_3 * S_3 +$$
$$X_1 * (X_2 * S_2 + X_3 * S_3) +$$
$$X_2 * (X_3 * S_3) + X_1 * X_2 * (X_3 * S_3)$$

Collecting the terms involving $X_3 * S_3$ from the RawMantissa formula we have following multiplied by $X_3 * S_3$: $1 + X_1 + X_2 + X_1 * X_2$. Observe row 3, $Max(X_3 S_3) < 2^{-18} 2^{-26} = 2^{-44}$. The sum of these terms can affect the raw mantissa. However, it overlaps with the other terms only in the bottom 10 bits of the raw mantissa, leaving aside the issues of carry propagation, which are performed in the exp carry propagate adder. Observe row 2, $Max(X_2 S_2) < 2^{-9} 2^{-17} = 2^{-26}$. This means that all the product terms involving $X_2 S_2$ affect the raw mantissa. However, they overlap with the other terms only in the bottom 28 bits with the raw mantissa. Observe row 1, $Max(X_1 S_1) < 2^0 2^{-8} = 2^{-8}$. This means that all the product terms involving $X_1 S_1$ affect the raw mantissa. However, they overlap with the other terms only in the bottom 46 bits with the raw mantissa.

Figure 33:
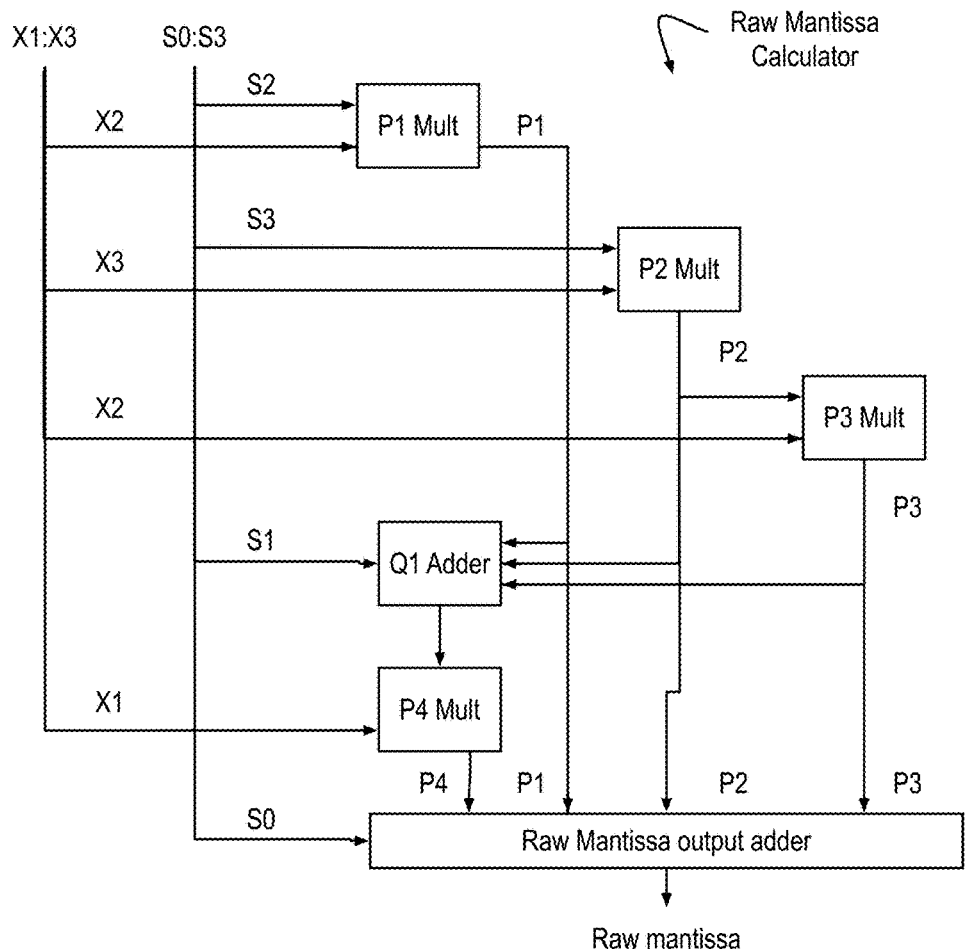

FIG. 33 shows an implementation of the raw mantissa calculator based upon implement the following formulas efficiently as a sequence of stages $$RawMantissa = 1 + S_0 + X_2 * S_2 + X_3 * S_3 +$$
$$X_1 * (S_1 + X_2 * S_2 + X_3 * S_3 + X_2 * (X_3 * S_3)) +$$
$$X_2 * (X_3 * S_3)$$

$$P1 = X_2 * S_2$$
$$P2 = X_3 * S_3$$
$$P3 = X_2 * (X_3 * S_3) = X_2 * P2$$
$$Q1 = S_1 + X_2 * S_2 + X_3 * S_3 + X_2 * (X_3 * S_3)$$
$$S_1 + P1 + P2 + P3$$
$$P4 = X_1 * (S_1 + X_2 * S_2 + X_3 * S_3 + X_2 * (X_3 * S_3))$$
$$X_1 * Q1$$
$$RawMantissa = 1 + S_0 + P1 + P2 + P4 + P3$$

Summarizing, the apparatus may include an exp2 calculator adapted to receive at least one of the log domain operand and the log ALU result as an exp2 input and generate an exp2 approximation accurately in the floating point standard. The exp2 input includes a log fraction part represented as a sum of fp*$2^{(-9*p)}$, with p ranging from 1 to 6. The exp2 approximation may include a mantissa calculation as including at least part of the product of exp2($f_p/2^{9*p}$) where p ranges from 1 to 6. The exp2 approximation may be an accurate representation of the multiplication of two floating point operands in a matrix multiplication used in Block LU Decomposition of a matrix also known as Linpack.

Figure 34:
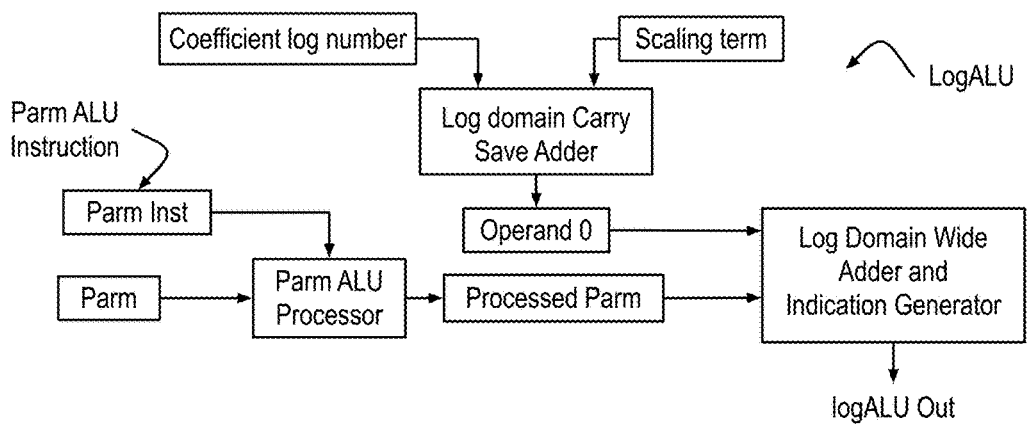

FIG. 34 shows a block diagram showing some details of the log ALU of FIG. 19 that may use a scaling log term, a log coefficient, a parameter, and a parameter instruction (inst) to generate a log ALU output (out) as a log domain number. The parameter, scaling log term and the log coefficient may all be log domain numbers in some preferred embodiments. The parameter instruction and the parameter may stimulate a parameter (parm) ALU processor, which may respond by generating a processed parameter (parm), which may also be a log domain number, possibly with a redundant numeric representation as shown in FIG. 35. The coefficient log number and the scaling term stimulate a log domain carry save adder to generate operand 0. The log domain carry save adder may include a carry save adder as well as an indication generator. The carry save adder responds to the fixed point numeric parts of the coefficient log number and the scaling term to generate the fixed point log number part of the operand 0. The indication generator responds to the log domain indicator parts of the coefficient log number and the scaling number to generate log domain indicators for the operand 0. The log ALU may includes a log domain wide adder and indication generator that receive the operand 0 and the processed parameter 1. The log domain adder and indication generator may respond to these received log domain numbers by generating log ALU out.

FIG. 36 to FIG. 38 show examples of the log ALU instruction and its principle components. FIG. 36 shows the log ALU instruction including a parameter and a scaling command. FIG. 37 shows the scaling command of FIG. 36. The scaling command is used by a scaling term generator operating the scaling term queue to receive a raw scaling term and generate the scaling term. The scaling command has four fields, with-or-without scaling, scaling source, once/every coefficient and scaling sign control. The with-or-without scaling is a one bit field that indicates calculating the log ALU result with the scaling log term, or without the scaling log term. The scaling source is a one bit field indicating the scaling log term is generated by the log ALU or by the Log Mul circuit and may possibly be the top of a queue associated with these log domain arithmetic units. Scaling sign control, if asserted, negates the sign of the log domain number in the scaling term. FIG. 38 shows the parm 1 instruction, which is the same format used for the parm 2 instruction to parm 8 instruction.

FIG. 35 shows an example of the parameter (parm) ALU processor of FIG. 34 adapted to receive the parameter and the parameter instruction. The parameter includes a log domain number (log number) that is distributed to multiple fixed point shift circuits denoted as "shift by k", where k ranges over −1:5. For each k in the range −1:5, the shift by k circuit is also adapted to receive a shift k mask from the parameter (parm) instruction. The shift by k circuit respond to receiving the log number and the shift k mask by generating the number shifted by k bits, which is denoted as number by k in the FIG. 35. The parm ALU also includes a log domain 7 operand carry save adder that responds to receiving the number by k, where k ranges over −1:5, to generate a redundant result presented to a redundant signer. The parm instruction also includes a sign control presented to the redundant signer. Together, the parm and the sign control stimulate the redundant signer to generate the signed redundant number as part of the processed parameter. In some embodiments, the log domain indicators may be essentially copied to create log indicators in the processed parm. The processed parm may be used as shown in FIG. 34 to stimulate the log domain wide adder and indication generator to generate the log ALU output (out). In other implementations, multiple parameters may stimulate a different embodiment of the log ALU of FIG. 19. These multiple parameters may each have a corresponding parameter instruction. Each parameter may have a separate parm ALU processor responding to that parameter and its corresponding parameter instruction. The format of the parameter instructions may or may not be the same as those discussed below, however there will be a tendency to include a sign control and at least one shift by some number mask, that controls a shift by some number shifter in the parm ALU processor.

Summarizing the apparatus of the invention may include a log ALU adapted to respond to the log domain operand to generate a log domain parameter based upon a parameter instruction. The log domain operand includes a log number. And the parameter instruction directs generating the log domain parameter as a log domain sum including the log number shifted by at least one bit position. The parameter instruction directs further generating the log domain parameter as a log domain sum further including the log number shifted by a second bit position. The log ALU may be further adapted to respond to receiving a second log domain operand by log-adding the log domain parameter to the second log domain number to generate a log ALU result.

Figure 39:
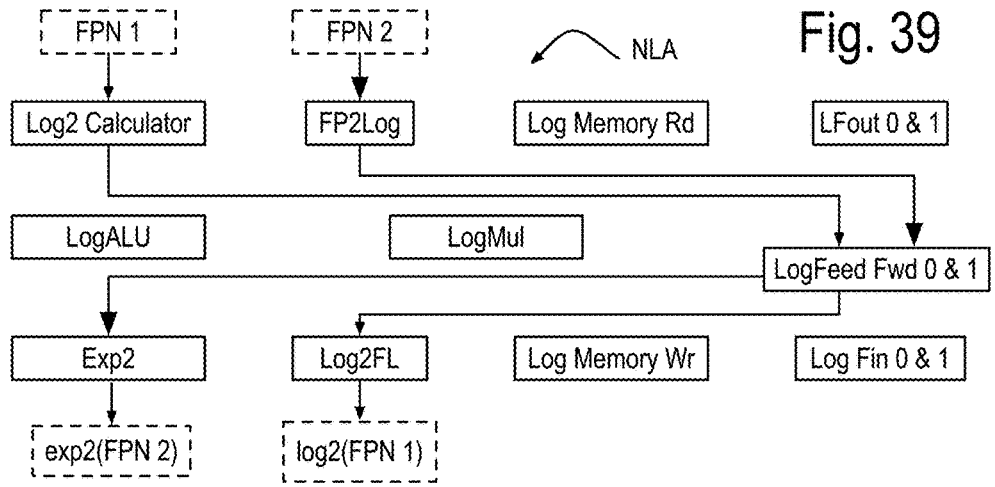
Figure 40:
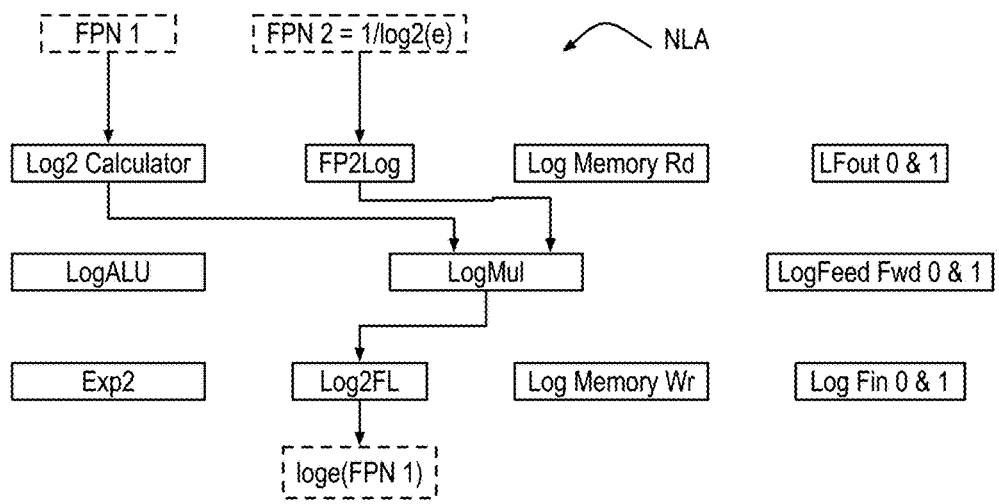

FIG. 39 to FIG. 45 show examples of some basic scalar non-linear functions that are expressed as basically one non-additive term. FIG. 39 shows the NLA operated to calculate log 2(FPN 1), and also shows the NLA operated to calculate exp2(FPN 2). FIG. 40 shows the NLA operated to calculate $\log_e$(FPN1). Note that $\log_e$ (x)=y implies $x=e^y=(2^{log_2(e)})^y=2^{y\ log_2(e)}$. Taking the $\log_2$ of each side of this identity yields $\log_2$ (x)=y $\log_2$(e) so that y=$\log_2$(x)/$\log_2$ (e). Setting x to FPN 1, and FPN 2 to 1/log 2(e), leads to the operations of this figure generating y=$\log_e$(x). FIG. 39D shows the NLA operated to calculate exp(FPN 2) (base e). Similarly, $y=e^x=(2^{log_2(e)})^x=2^{x\ log_2(e)}$. Setting FPN 1 to e and FPN 2 to x leads to operating the NLA to generate $e^x$=exp(x) base e as shown in the figure.

Figure 42:
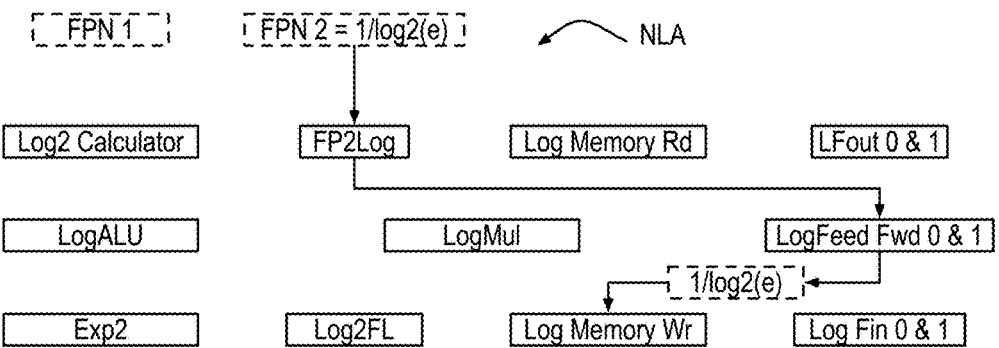
Figure 43:
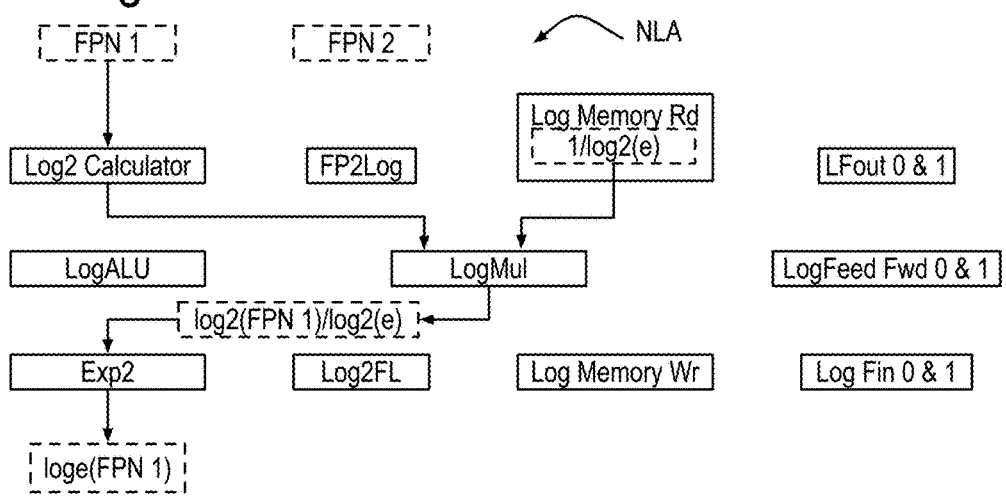

FIG. 42 and FIG. 43 shows the NLA operating to perform $\log_e$(FPN 1) based upon similar reasoning to that discussed for FIG. 40. FIG. 42 shows the execution wave front receiving 1/Log 2(e) to the FP21 Log converter feeding its result forward to the log Memory circuit to create the memory content of 1/Log 2(e) shown in FIG. 43. FIG. 43 shows the execution wave front presenting FPN 1 to the log 2 calculator and accessing the log memory content 1/log 2(e) to stimulate the log Mul circuit to generate log 2(FPN 1)/Log 2(e), which stimulates the exp2 calculator to generate log e(FPN 1).

Figure 41:
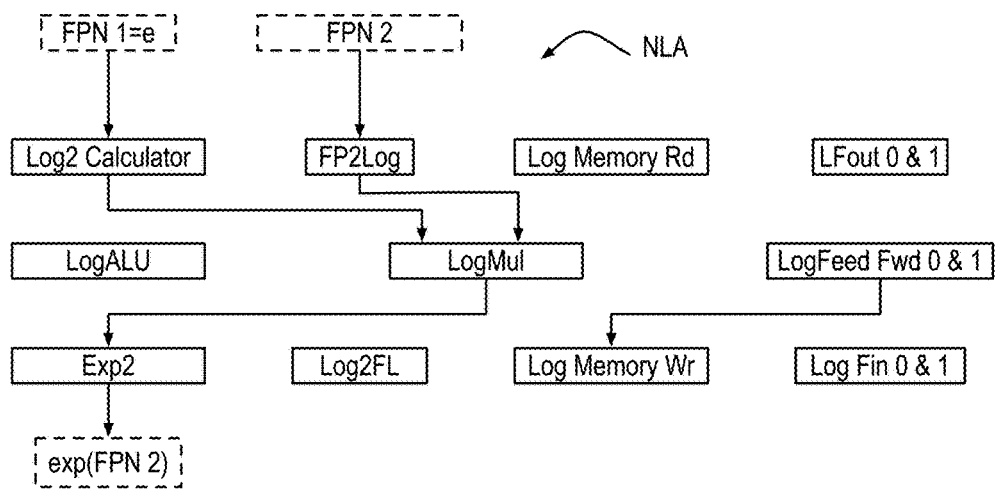
Figure 44:
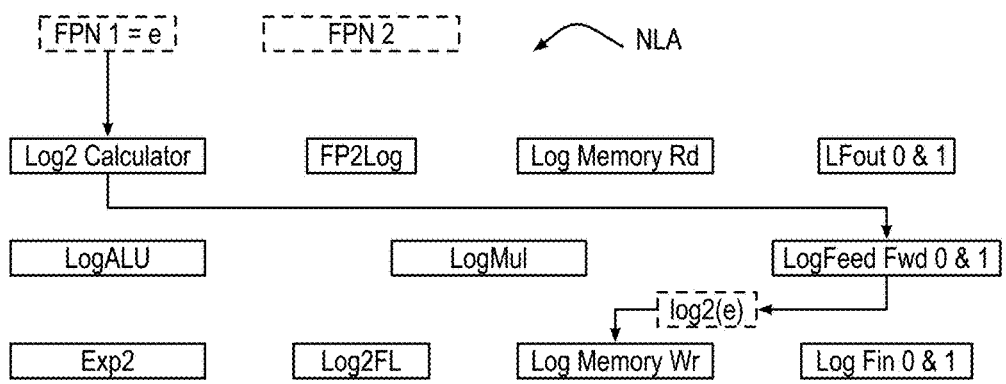
Figure 45:
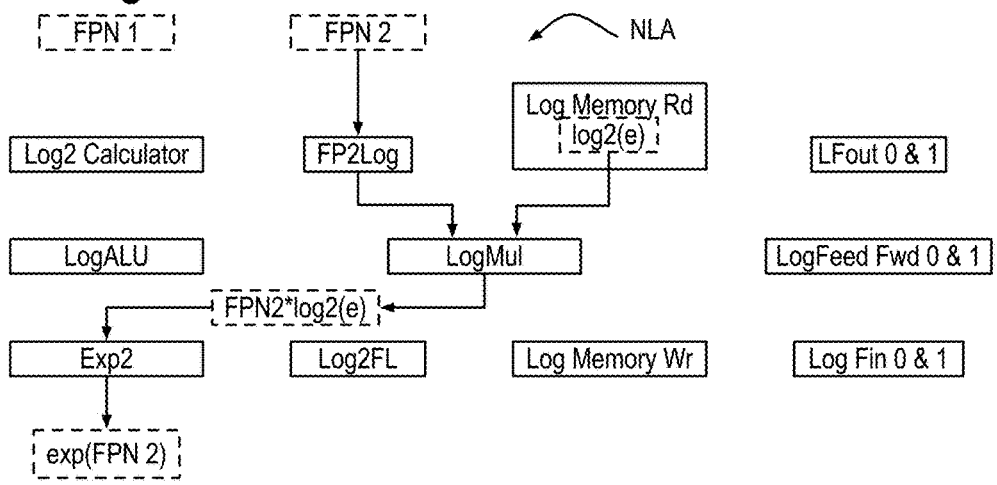

FIG. 44 and FIG. 45 shows the NLA operating to perform exp(FPN 1) based upon similar reasoning to that discussed for FIG. 41. FIG. 44 shows the execution wave front presenting FPN 1=e to the log 2 calculator, whose output is fed forward through one of the log feed circuits to present log 2(e) to the log memory write circuit, which generates the log memory content of log 2(e) in the log memory shown in FIG. 45. FIG. 45 shows the execution wave front of FPN 1 stimulating the log 2 calculator and log 2e being fetched from the log memory read port. The output of the log 2 calculator and the log memory read port stimulate the log Mul circuit to generate FPN2*log 2(e), which stimulates the exp2 calculator to generate $e^{FPN2}$.

One skilled in the art of non-linear function evaluation will recognize that the log ALU can be extended not only to process multiple parameters on each execution wave front, but also to generate a succession of log ALU outputs to form the non-additive components of a non-linear function, which may either be further processed in the log domain or transferred into the FP domain through operation of the log 2FP converter and/or the exp2 calculator to the FP domain. The Nla, or more specifically the Log ALU may further signal any combination of the following: identify which non-linear function is being calculated, the start of function evaluation, the term count of the log ALU result and the end of the function evaluation. All of the discussed extensions are within the scope of the invention and may be claimed now or in subsequent patent application, possibly as a divisional of this patent application.

There are several demands regarding a high performance numerical computer, in particular, exascale computing and data mining may require runtime condition vector generation. Efficient runtime testing is now required. Determining the differences in a vector from some standard is essential for efficient testing of cores to insure that every component capable of performing a calculation gives exactly the same answer. Any difference points to a problem that needs to be solved. Since a package includes 128 bits of data, up to 128 element vectors can be loaded and then analyzed into one package, where everything that matches is set to a one hot code or a one cold code. Something needs to build this package bit vector. Additionally, data mining of a database may require assembling a collection of test results for a database entry to determine the entry's embodiment as an example of one or more patterns.

Addressing these requirements may be done by extending the C-adders to include a condition accumulator operating on a small bit window, possibly of no more than 8 bits although possibly as large as 64 to 128 bits. When each condition accumulation is completed, the small bit window is sent to one or more of the following. The process state calculator may be configured to use as a condition state to further direct the process state calculations based upon a parameter location and/or a next state location in the simulation node. A package accumulator associated with the C-adder to append the small bit window. Once the package accumulator has enough data, the accumulated package is sent out of the core to report the runtime test state.

Figure 46:
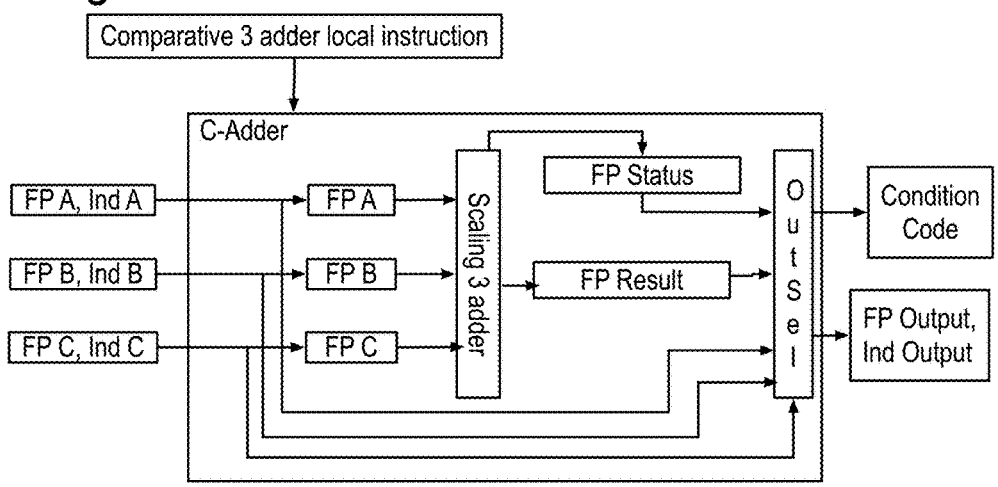
FIG. 46 to FIG. 50 show some details of the comparison adder and its use with the NLA to create improved accuracy non-linear results.

FIG. 46 shows an example block diagram of the C-adder of previous drawings. Three floating point operand packages are shown presented to the C-adder. The first operand package is FP A, Ind A. The second operand package is FP B, Ind B. And the third operand package is FP C, Ind C. The C-adder also receives a comparative 3-adder local instruction and includes a three operand adder and an output selector that collectively respond to the comparative 3-adder local instruction and the operand packages to generate a condition code and a floating point output package FP Out and Ind Out. The floating point operands, FP A, FP B, and FP C are presented to a scaling three operand adder, which generates the FP Status and the FP result, which are presented to the output selector. The three index lists, IndA, Ind B, and Ind C, as well as FP A, FP B and FP C, are provided to the output selector. The output selector responds to the provided inputs and relevant components of the comparative 3-adder local instruction by generating the condition code and the FP output package.

Figure 47:
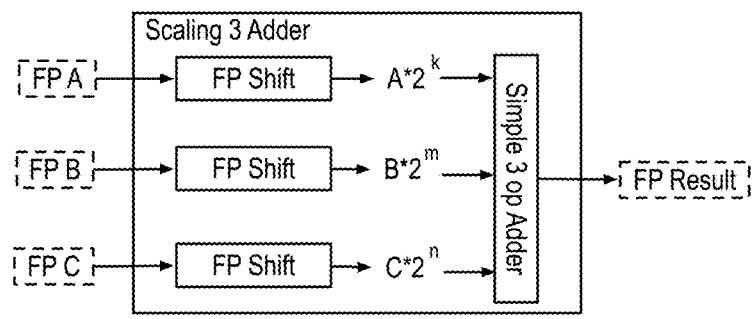

FIG. 47 shows a block diagram of an example three operand scaling adder used in FIG. 46 that receives three floating point operands FP A, FP B, and FP C. The three operand scaling adder includes three instances of a floating point shifter, each instance adapted to respond to one of the floating operands to generate an internal operand adapted for presentation to a simple 3-operand floating point adder. For example, the first instance receives FP A and generates $A*2^k$. The second instance receives FP B and generates $B*2^l$. And the third instance receives FP C and generates $C*2^m$. Here, k, l and m represent small integers, often in a small integer range such as the integers between −8 and +7, or in other situations, between −16 and +15.

Figure 48:
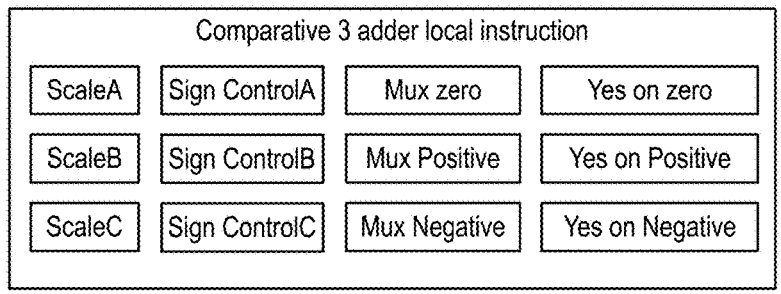

FIG. 48 shows an example implementation of the comparative 3-adder local instruction of FIG. 46. The components of the local instruction affecting the FP A are Scale A and Sign Control A. Scale A directs the first instance of the FP Shifter of FIG. 47 to scale FP A to generate $A*2^k$. Sign control A has one of four effects: the sign of FP A may be unaffected, reversed, forced to be positive or forced to be negative either as it enters or leaves the first instance of the FP shifter. The components of the local instruction affecting the FP B are Scale B and Sign Control B. Scale B directs the second instance of the FP Shifter of FIG. 47 to scale FP B to generate $B*2^1$. Sign control B has one of four effects: the sign of FP B may be unaffected, reversed, forced to be positive or forced to be negative either as it enters or leaves the second instance of the FP shifter. The components of the local instruction affecting the FP C are Scale C and Sign Control C. Scale C directs the third instance of the FP Shifter of FIG. 47 to scale FP C to generate $C*2^m$. Sign control C has one of four effects: the sign of FP C may be unaffected, reversed, forced to be positive or forced to be negative either as it enters or leaves the third instance of the FP shifter. The components of the local instruction affecting the output selector of FIG. 47 include components for generating the FP output and condition code, and components affecting the Ind (Index List) Output. The output selector of FIG. 47 responds to the FP Status and Mux zero, Mux Positive and Mux Negative from the comparative 3-adder local instruction of FIG. 48. The output selector of FIG. 47 responds to the FP Status and Mux zero, Mux Positive and Mux Negative from the comparative 3-adder local instruction of FIG. 48.

There is a persistent problem with floating point addition of three numbers. Suppose there are three floating point numbers A, B and C, with $A=-B*(1-2^{-20})$ and $C=B*2^{-50}$. If A and C are added first, after rounding, only the top 3-4 bits of C have an effect on the sum. Whereas is A and B are added first the result is $B*2^{-20}$. Then adding that result to C shows the effect of C much more thoroughly. A straightforward implementation of a three operand floating point adder aligns to two smaller mantissas simultaneously to the largest, adds these aligned mantissa to the largest magnitude mantissa and then rounds and finalizes the result. Given the example A, B and C, most of the significance of C is lost, even though it should be part of the result. To address this weakness of floating point addition requires improving the addition circuitry. This improvement is about the same size/complexity as the straightforward implementation.

Figure 49:
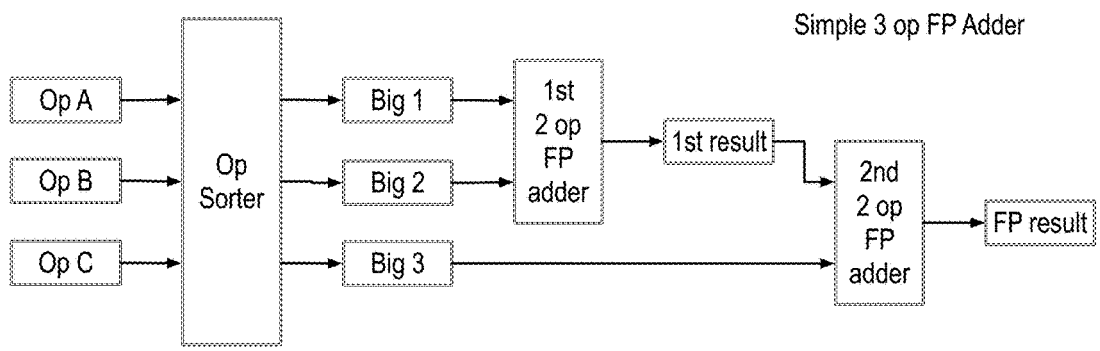

FIG. 49 shows an improved floating point adder operates upon normal floating point numbers x, y, and z as follows. The input operands are sorted into the two largest operand A and second largest B and a third operand C that is not larger in magnitude than operands A and B. The mantissa of B is aligned to the A operand's mantissa through the use of their exponents. If the exponents are the same, then there is no need for shifting. However, if the B exponent is smaller, the B mantissa is shifted down by the difference between the A and B exponent to generate the aligned B mantissa. The A mantissa is added to the aligned B mantissa to generate a first sum mantissa. The first sum mantissa may overflow into the next most significant bit, indicating that the resulting exponent field is incremented by 1 and the resulting sum of the first addition is to be shifted down by 1 bit. Alternatively, as in the example given at the start of this discussion, one or more of the most significant bits may be cancelled, in which case the resulting exponent is decreased by the number of most significant bits that cancelled and the resulting mantissa is shifted "up" by the number of canceled most significant bits to complete the calculation of the resulting mantissa and the resulting exponent. The resulting exponent and the C exponent are compared. If the C exponent is less than the resulting exponent, the C mantissa is shifted down by the difference in the resulting exponent and C exponent. If the C exponent is larger than the resulting exponent, the resulting mantissa is shifter down by the difference in these exponents. Otherwise, both the C mantissa and the resulting mantissa are used without either being shifted. In any case, the C mantissa and the resulting mantissa are added. If there is an overflow result from adding the C mantissa and the resulting mantissa, the final exponent is the maximum of the C exponent and the resulting exponent, with 1 added to that maximum. The final mantissa is shifted down by one bit. If there is cancellation of one or more of the most significant bits, the final exponent is decremented by the number of cancelled most significant bits and the final mantissa is shifted up by that same number of bits. Once these conditions have been accounted for the final exponent and the final mantissa are presented to be packaged as a floating point number for output.

Tests reveal that it may be advantageous to automate accumulation of additive results for vectors whose lengths may vary in run-time. For example, FIR calculations may change the number of taps whose corresponding products need to be accumulated, and matrix inversion by Guassian elimination involves finding the maximum magnitude of the next column starting from the diagonal to determine the next pivot element, which varies from N to 2 entries as the algorithm progresses. A finite state machine, referred to as an accumulation manager can automate accumulating varying numbers of FP operands and/or packages for a simultaneous process. The accumulation manager may be configured to manage several queues, and a C-adder to complete the varying sums and/or comparisons requiring accumulation for the owning simultaneous process. Preferably in many implementations, the number of pipe stages in the adders cannot affect the ordering of the operands, nor adder operations. Further delineation of the structure and functions of the accumulation manager are enabled for one of ordinary skill in computer logic design from this document's disclosure. Certain implementations of the SMP data cores may include one or more instances of the accumulation manager.

Figure 50:
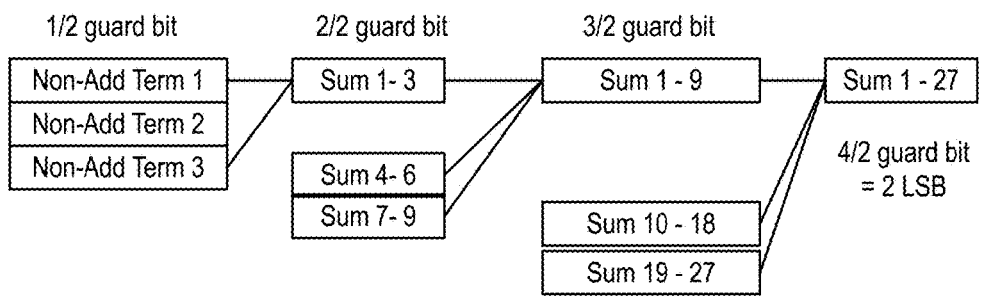

FIG. 50 shows the use of the Log ALU to generate 27 non-additive terms of the polynomial, each with ½ the guard bit of accuracy. These non-additive terms are summed as triples by the three operand floating point adders through three layers of additions to form the result. Given that all these operations are occurring in the guard bit preserving domain, each layer of additions only adds ½ the guard bit to the error, for a total error of 2 LSB. By way of comparison, using a standard configuration of microprocessor multipliers and adders has a ½ LSB error for each multiply-accumulate operation performed, which for a $26^{th}$ degree polynomial results in a rounding error of about 13 LSB.

Summarizing: the apparatus may include a floating point adder adapted to receive an operand collection and generate a floating point add result from the operand collection, where the operand collection includes a first operand, a second operand and a third operand, comprising: an operand comparator adapted to compare exponents of the operand collection to determine a magnitude ordering of the operand collection, wherein the magnitude ordering determines a largest operand, a second largest operand and at least one smaller operand; a first adder phase adapted to perform a mantissa aligned addition of the largest operand and the second largest operand to generate a resulting operand including a resulting exponent and a resulting mantissa; and a second adder phase adapted to perform a second mantissa aligned addition of the resulting operand and the smaller operand to at least partly generate the floating point add result. Each of the operand collection represents at least one member of the group consisting of half precision floating point numbers, half precision floating point numbers with at least one guard bit, single precision floating point numbers, single precision floating point numbers with at least one guard bit, double precision floating point numbers, double precision floating point numbers with at least one guard bit, extended precision floating point numbers, and extended precision floating point numbers with at least one guard bit.

The apparatus may include, but is not limited to, an accumulation management circuit adapted to respond to at least two feedback output ports and a desired accumulation count. The accumulation management circuit to adapted control a floating point adder to generate a floating point add result. The accumulation management circuit comprising an accumulation status indicator. And the accumulation management circuit adapted to respond to the desired accumulation count and the accumulation status by operating the feedback output ports and the floating point adder to generate the floating point add result implementing the desired accumulator count of floating point operands.

Any or all of the DPC, AC, LM, in particular, the accumulation management circuit and/or the floating point adder is implemented with at least one of a Field Programmable Gate Array (FPGA), a semiconductor standard cell library, and a molecular gate network. The semiconductor standard cell library may implement a semiconductor process including at least one semiconductor device. The device may include at least one of a transistor, a memristor, and a photonic switch.

The accumulation manager circuit may be adapted to control a comparison circuit including the floating point adder to further generate a floating point comparison result. And the accumulation manager circuit is adapted to respond to the desired accumulation count and the accumulation status by operating the feedback output ports and the floating point adder to generate the floating point comparison result implementing the desired accumulator count of the floating point operands.

Figure 51:
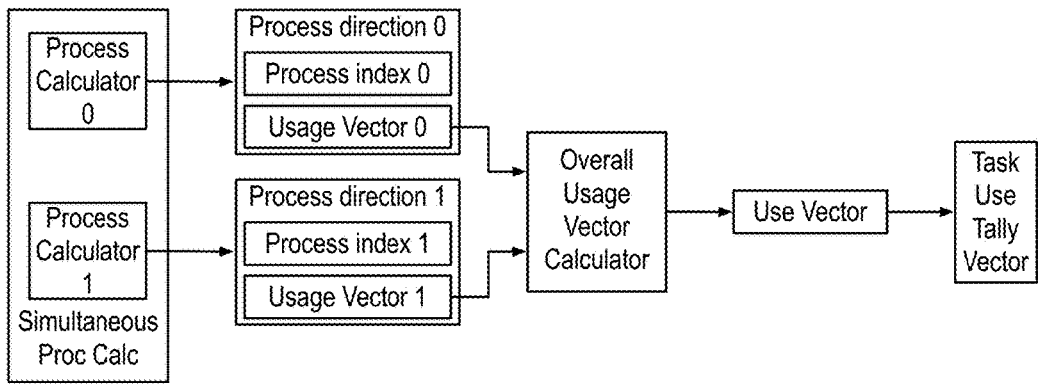
FIG. 51 to FIG. 53 show some details of power management applicable to the SMP cores and the PEM as well as to the SMP Channel (SMPC) cores, stairways and landing modules (LM).
Figure 52:
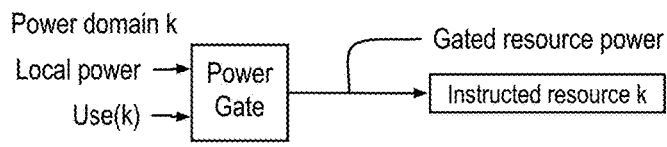
Figure 53:
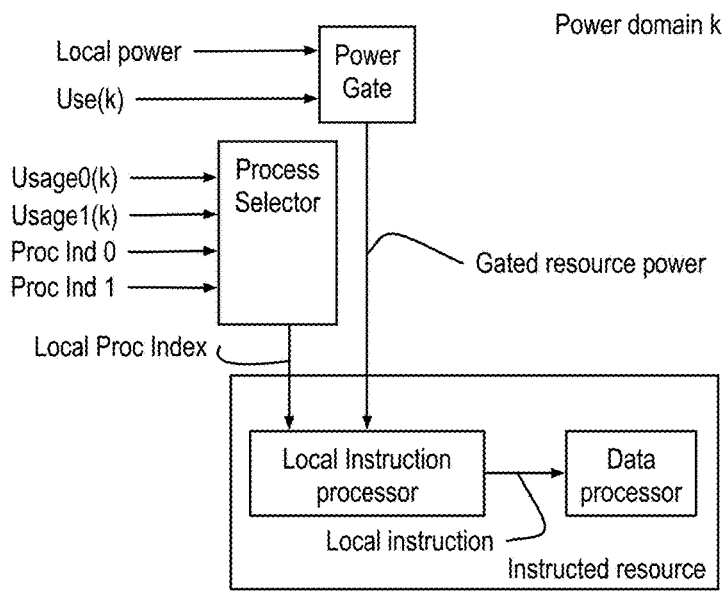

Energy Management in the SMP Cores and PEM:

Each of these PEM, and each of their SMP cores, is guaranteed to use minimal energy by the usage vectors. FIG. 51 shows the process state calculator generating a usage vector for each of two processes that indicates which instructed resources are owned and used by a process on this execution wave front. The usage vectors are combined (logical OR) to generate a use vector, summarizing the instructed resources used by the execution wave front. The use vector is tallied to form a task use tally vector, accurately monitoring the resources used on a task-by-task basis over time. The task use tally vectors are accumulated across multiple cores to form an overall task use vector for a module of cores, chips, and system components including those chips. FIG. 52 assumes the power domain k of an instructed resource is CMOS-like logic and power technology. One component of the use vector, use(k) is shown driving a power gate to control the local power by generating the gated resource power to be used by the instructed resource k. If no operations are to be performed, all the power for the next execution wave front is gated off. In FIG. 53, the power domain k is shown including a process selector driven by the usage vectors of the simultaneous processes. For the moment, assume a one hot usage vector scheme, where no more than one of the kth bit usage0 and usage1 may be "hot", or 1. For example, Usage0(k) hot selects process index 0 to create the local process index. Usage1(k) hot selects process index 1 as the local process index. The gated resource power is provided to the local instruction processor and the data processor included in the instructed resource. The local process index stimulates the local instruction processor to generate the local instruction. The local instruction directs operation of the data processor.

The SMP data core typically contains two adders, one may be owned by the parallel part, and the other owned by the sequential part. The parallel part may also own the multiplier as in FIR, dot products, FFTs and matrix inversion. To simplify programming, both adders can perform the same operations. These include an inline comparison that may be chained, without branching, to calculate the pivot for matrix inversion, or the maximum, or minimum, of a vector or matrix. These inline comparisons do not require flushing the arithmetic pipes before branching can be determined, which significantly reduces energy consumption. Other components shown include but are not limited to a reciprocal and reciprocal square root calculator, which constitutes an introduction to the basic data cores.

The core architecture presented here does not require energy inefficient caches. Instruction caches are replaced by a simultaneous process mechanism providing huge virtual VLIW instruction spaces at each instruction pipe. The core also supports optimal resource sequencing and use, which replaces superscalar instruction interpreters. In one sense, a multithreaded processor can be seen as simultaneously executing the parallel part PP and the sequential part SP, as shown in FIG. 10, similar to the simultaneous multi-processor core. However, there is a huge difference in infrastructure required to achieve this. Also, the multithread controllers and their slaved superscalar instruction interpreters must always be on.

A process state calculator, adapted to generate one state index and the associated loop outputs, can be implemented in about 10K gates, which is discussed next. Many core implementations may include three or four process state calculators, completely replacing the instruction caches, superscalar instruction interpreter, and multithread controller of a contemporary parallel processor core. These complex legacy mechanisms are no longer needed where one program dominates all the resources. This architecture's co-design utilizes software to take over what was previously done with hardware. At compile time, dependency analysis determines what needs to be done in the presence of available data. This compile time analysis directs code generation to create the process ownership, the process state calculator's configuration, loop controls, and the local instruction memory contents for the SMP core. In SMP cores, only the resources actually performing the computations, consume power. A data processor chip that includes between 500 and 600 of these cores is feasible to manufacture with existing technologies. While much remains to be done, this points the way to a new class of data processing cores that can meet the challenge of exascale and beyond.

Figure 54:
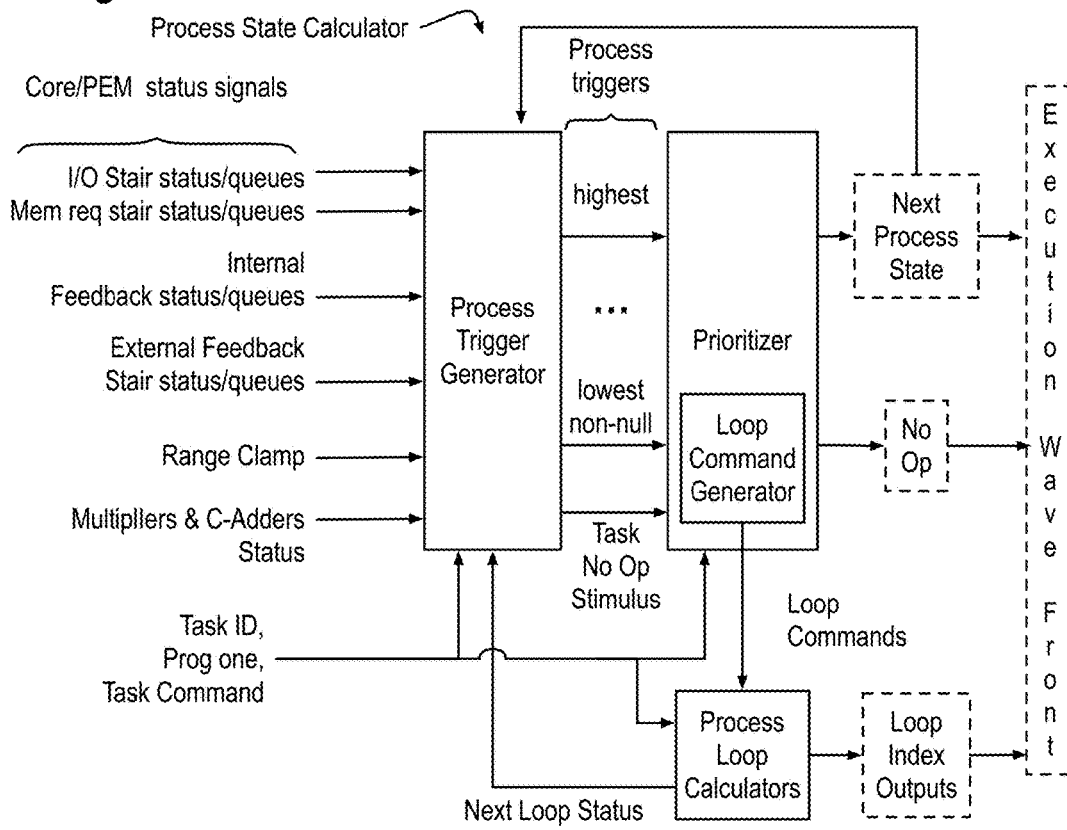
FIG. 54 to FIG. 65 show some details of the process state calculator applicable to the SMP cores, the PEM, the Stairways, and the LM.

FIG. 54 shows an example of a Process State Calculator for a core, or a PEM, that includes a process trigger generator, a process loop calculator block, and a prioritizer. The process state calculator must configure the following components: the process trigger generator, the process loop calculators, and a loop command generator within the prioritizer. The loop calculators may not be shared between processes. Each process owns its loop calculators. In other implementations, sharing loop calculators may be supported.

The process trigger generator receives the next process state, the core/PEM status signals, and the next loop state, from which the highest to lowest non-null process triggers are generated. In the initial implementations, these process trigger signals will probably be one-hot, although they could also be one-cold. Initially, the process states may be 6 bits and there are $63=2^6-1$ process trigger signals. In an implementation with process states of 8 bits, there are $255=2^8-1$ process trigger signals.

The prioritizer responds to the process triggers by generating the next process state, the no operation signal, and the loop commands. The next process state is the number of the highest priority process trigger that is hot. The no operation signal is hot when all of the process trigger signals are cold. In the initial implementation, if the highest process trigger is hot, then the next process state is 63. If only the lowest non-null process trigger is hot, then the next process state is 1. If none of the process triggers are hot, the next process state is 0 and the no operation signal is hot.

The loop commands may be generated as follows: The highest priority process trigger that is hot selects the state loop command for that priority signal to generate the loop commands. If no process trigger is hot, the loop commands are straight zeros, indicating no loop operation is performed by any of the loop calculators in the process.

The loop calculator block responds to the loop command by performing its next state calculation. This calculation generates the next loop state and the loop index outputs. The next loop state vector is sent to the process trigger generator for use in generating the process triggers. The loop index outputs are sent to the execution wave front for use in memory addressing and other integer related operations.

Figure 55:
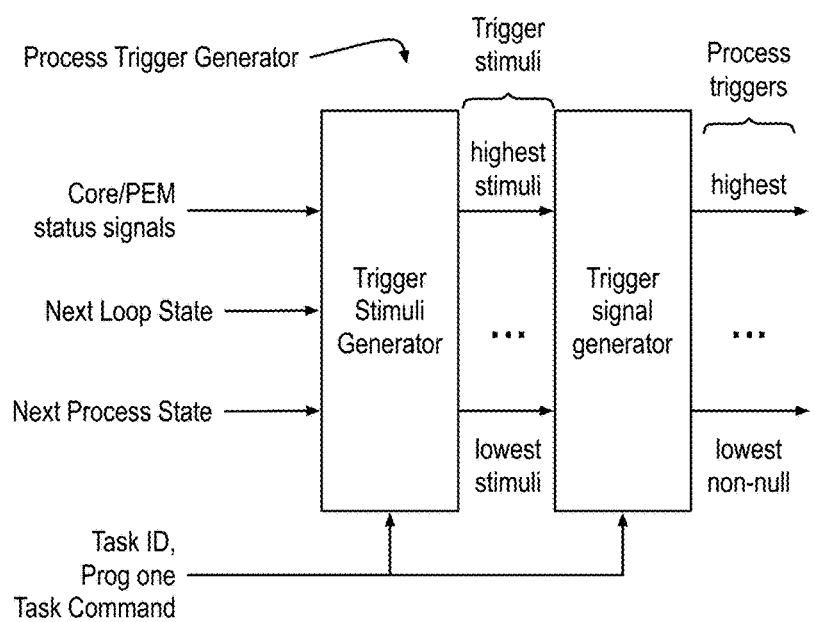

FIG. 55 shows an example of the process trigger generator of FIG. 54. The process trigger generator includes a trigger stimuli generator and a trigger signal generator. The trigger stimuli generator receives the core/PEM status signals, the next loop state vector and the next process state, and based upon its configuration, generates the trigger stimuli signals for each of the process trigger signals. The trigger stimuli generator responds to the task ID, program zone and task command to generate the trigger stimuli signal pairs selected from the core/PEM status signal pairs, the next loop state pairs, and the next process state, which is expressed as a collection of signal pairs. The trigger signal generator receives the trigger stimuli signal pairs and responds to the task ID, the program zone and the task command to generate the process triggers. In some implementations, the trigger stimuli generator and the trigger signal generator may respond to part of the task ID, program zone and/or the task command.

Figure 56:
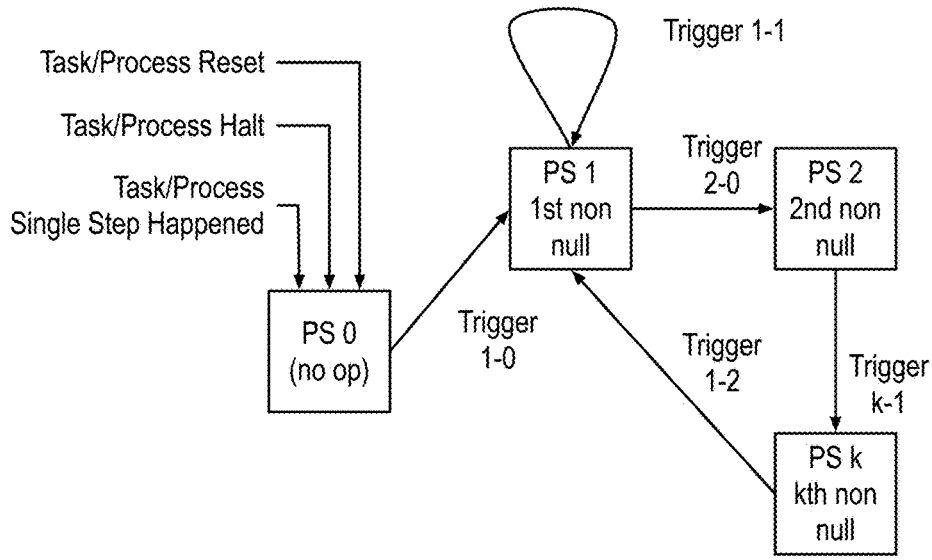

FIG. 56 shows a simple process state diagram showing the process states and the triggers in a simultaneous process. Each of the triggers may become one of the process triggers of FIG. 54.

Figure 57:
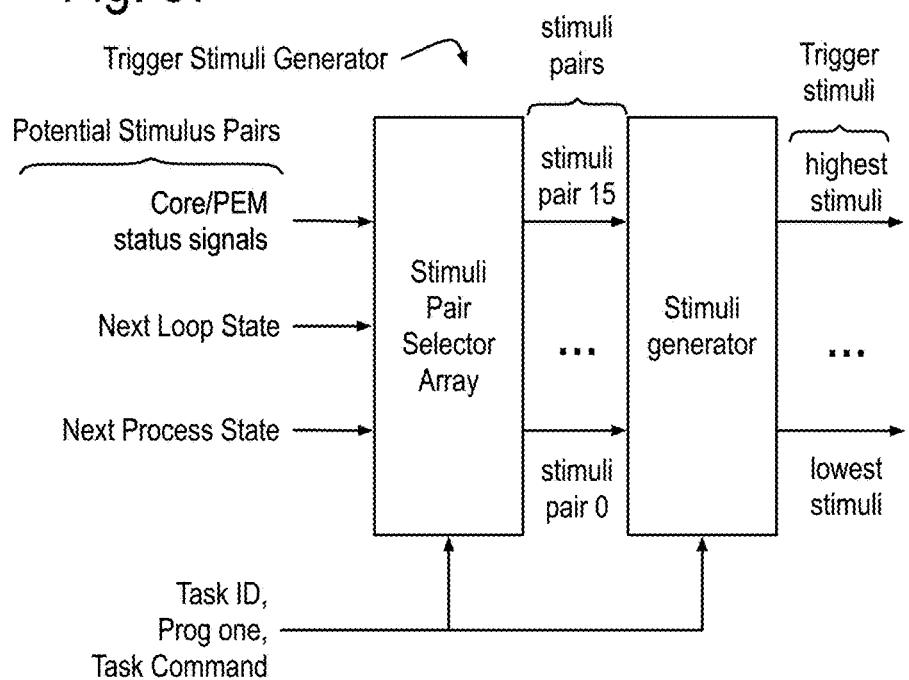
Figure 58:
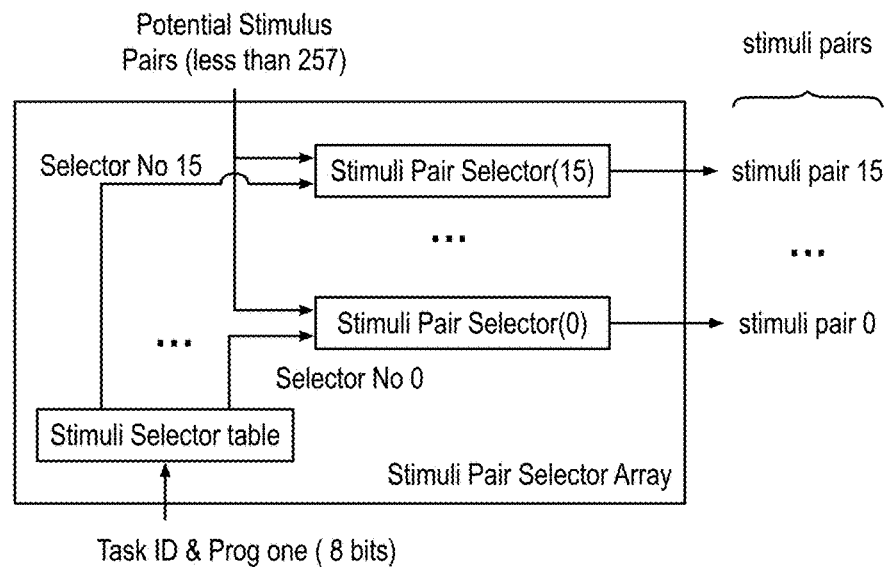
Figure 59:
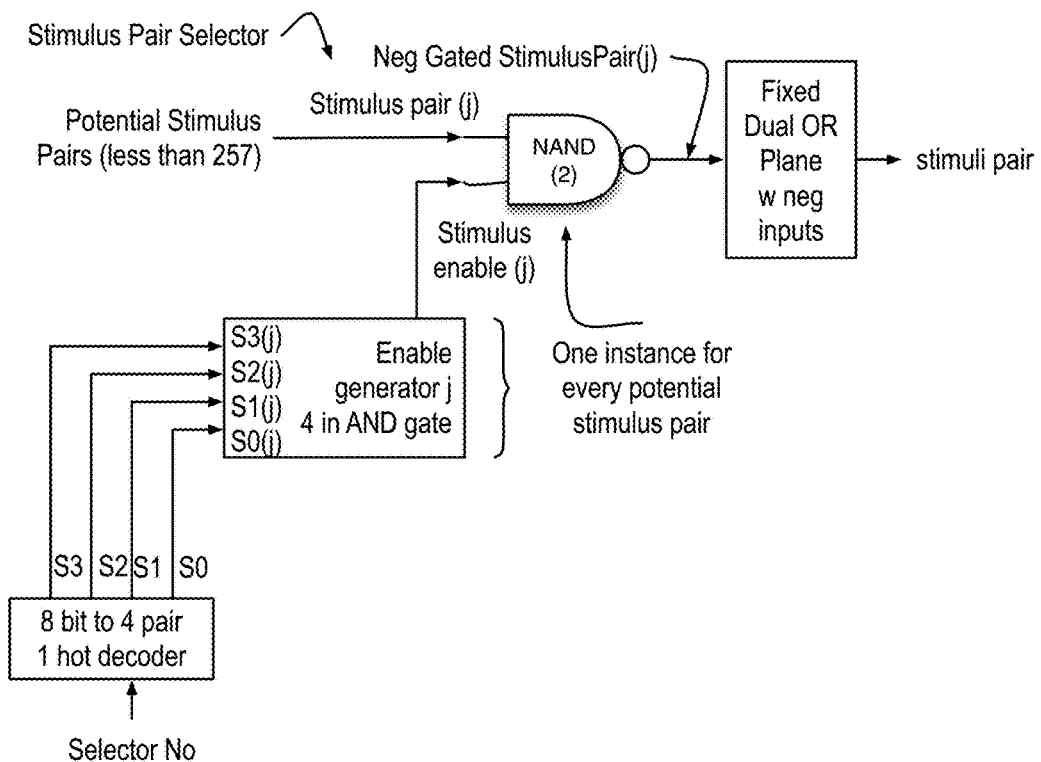

FIG. 57 shows an example of the trigger stimuli generator of FIG. 55. The trigger stimuli generator may include a stimuli pair selector array responding to the task ID, the program zone and/or the task command to configure the selection of some of the process stimulus pairs as the stimuli pairs. In this example, 16 stimuli pairs are selected, named stimuli pair 0 to stimuli pair 15. The stimuli generator responds to the task ID, the program zone and/or the task command to configure generation of the trigger stimuli from the stimuli pairs. FIG. 58 shows an example implementation of the stimuli pair selector array of FIG. 57 including 16 instances of a stimuli pair selector. FIG. 59 shows an example implementation of an instance of the stimuli pair selector of FIG. 58.

Figure 60:
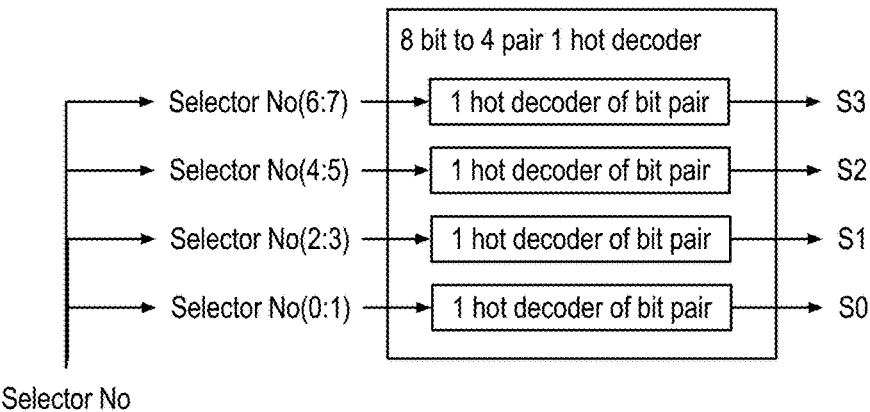

The stimulus enable signal j is the logical product of the appropriate combination of the signals S3, S2, S1, S0, each consisting of four 1-hot signals decoding the corresponding bit pair of the selector number. Two nand gates are shown receiving the stimulus enable j and the stimulus pair j to generate the negatively gated stimulus pair j. These negatively gated stimulus pairs are presented to the fixed dual OR plane with negative inputs to generate the stimuli pair. In some cases, the negative gates and negative OR planes may be implemented with positive and positive input OR planes. FIG. 60 shows an example implementation of the 8 bit to 4 pair 1 hot decoder of FIG. 59 including four instances of a 1 hot decoder of a bit pair. The 1 hot decoder of a bit pair has the following truth table and may be implemented in any semiconductor technology supporting Boolean logic:

| Bit pair | S(0) | S(1) | S(2) | S(3) | |
|---|---|---|---|---|---|
| 00 | Hot | Cold | Cold | Cold | 0 |
| 01 | Cold | Hot | Cold | Cold | 1 |
| 10 | Cold | Cold | Hot | Cold | 2 |
| 11 | Cold | Cold | Cold | Hot | 3 |

The above table shows logic values in terms of hot and cold, which may vary from one implementation to another. Here are two interpretations of hot and cold that may be used: First: Hot=1, Cold=0; Second: Hot=0, Cold=1

Figure 61:
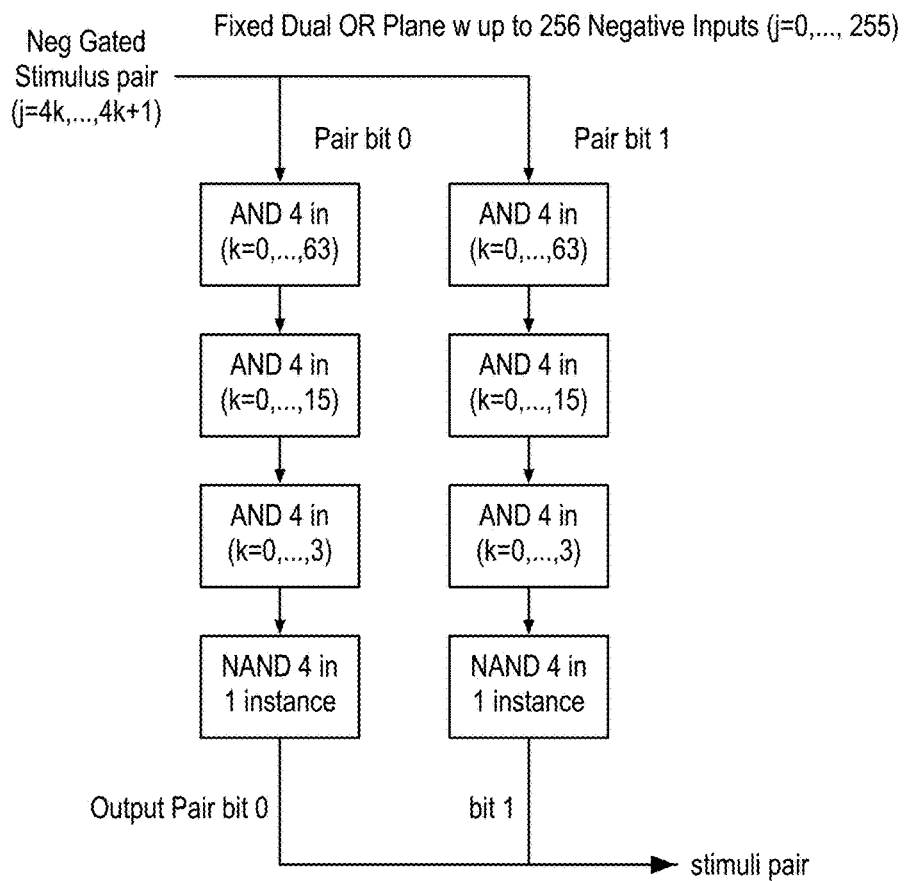

FIG. 61 shows an example implementation of the fixed dual OR plane with negative inputs of FIG. 59. The derivation of this circuit is:

$$\overline{(\&_{j=0}^{N<256}\overline{Gated\_pair(j)})} = Or_{j=0}^N$$
$$\overline{\overline{Gated\_pair(j)}} = Or_{j=0}^N Gated\_pair(j)$$

Figure 62:
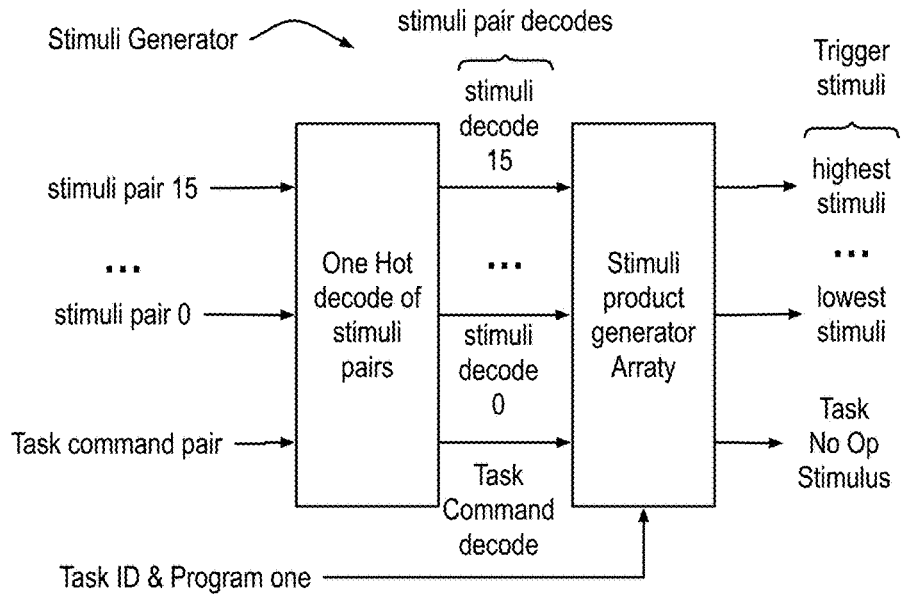
Figure 63:
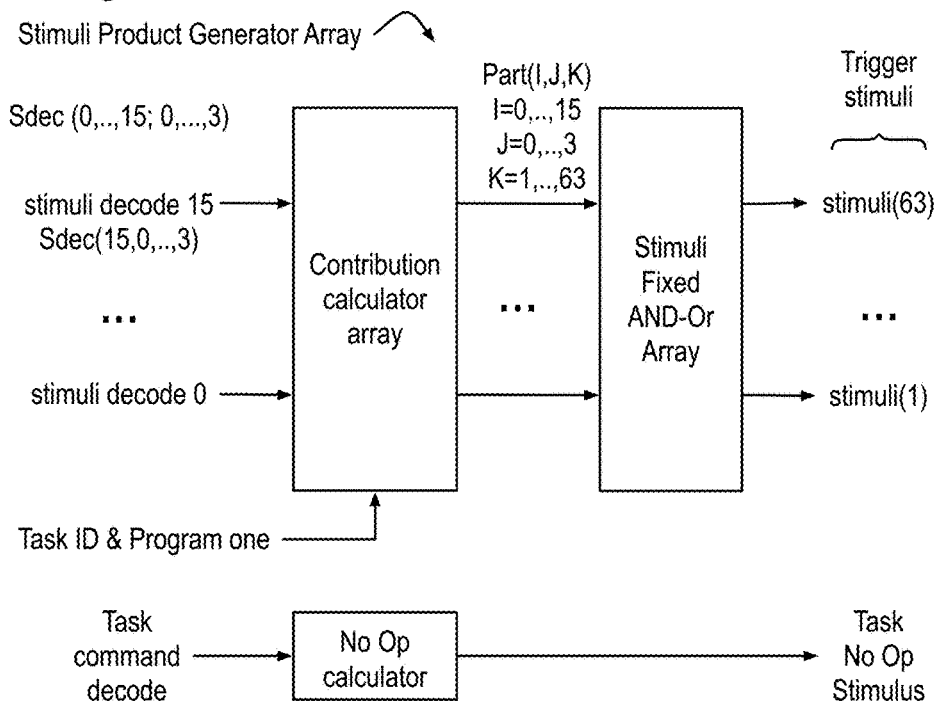

FIG. 62 shows an example implementation of the stimuli generator of FIG. 57, including a one hot decode of each of the stimuli pairs and a stimuli product generator. FIG. 63 shows an implementation of the stimuli product generator array of FIG. 62. Each of the stimuli decodes (I,L) are AND gated with a control bit, and then ORed across the 4 hot decodes ranging over L to create the partial terms Part (I,J,K) for each I and J. Each of the trigger stimuli (k) is the logical sum of four logical products of the partial contributions. This directly supports state transitions from any process state to another as illustrated in FIG. 56. Viewed as Boolean algebra, and assuming that 1 is hot (Boolean 1) and 0 is cold (Boolean 0), this may be implemented as Part(I,J,K)=OR(Sdec(I,J,L) and C(I,J,K,L) at (task_id*16+Prog_one) for L=0, . . . , 3)

Stimuli(K)=OR(AND(Part(I,J,K), for I=0, . . . , 15), for J=0, . . . , 3)

Figure 64:
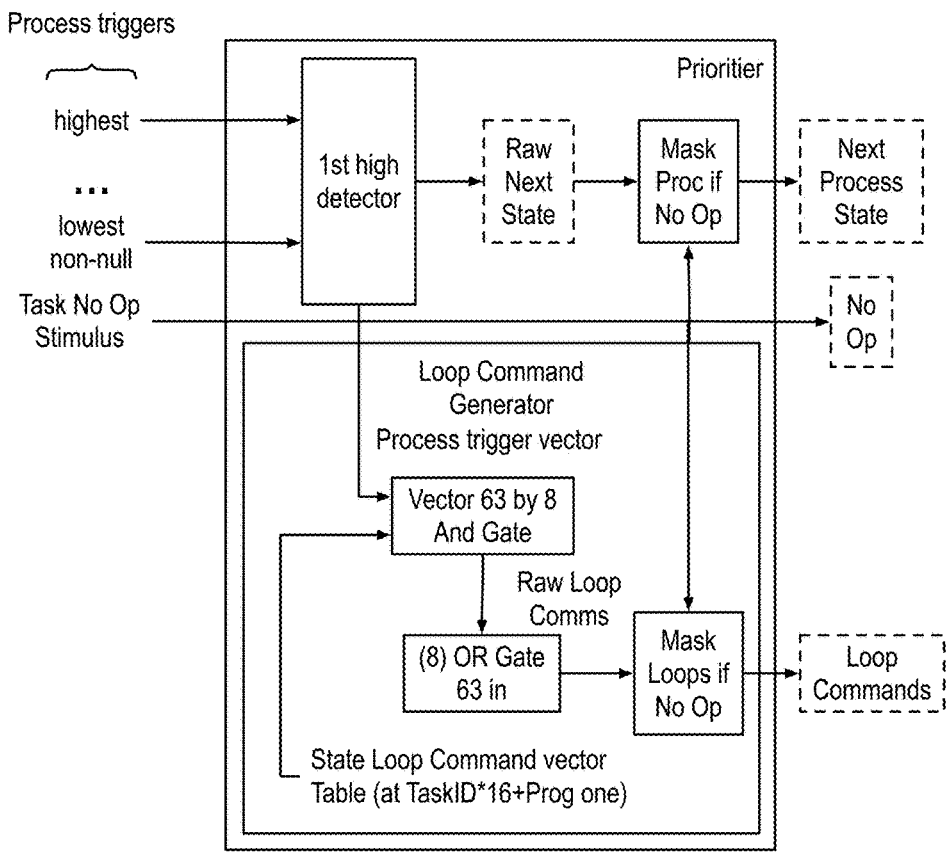

FIG. 64 shows an example of the prioritizer of FIG. 54. The process triggers are the stimulus to a first high detector. The first high detector responds to the process triggers by generating a raw next state and a process trigger vector which has, at most, one bit hot. If the highest process trigger is hot, then the raw next state is the highest integer value and the process trigger vector has the top vector entry hot. Successively lower process triggers are the first of the triggers to be hot. The next raw state is a successively lower integer and the only hot bit in the process trigger vector is also successively lower. When only the lowest non-null stimuli is hot the raw next state is 1 and the lowest bit of the process trigger vector is hot. If none of the process triggers are hot, the raw next state is 0 and none of the process trigger entries are hot.

The loop command generator of FIG. 64 performs the following: A state loop command vector is generated by a table accessed at an address including the Task ID forming the top 4 bits, and the program zone generating the bottom 4 bits. The process trigger vector and state loop command vector stimulate the vector AND gates to generate the stimuli of the (8) OR gates, each receiving 63 gated state loop command components. The (8) OR Gates generate the Raw Loop Commands.

In some implementations the table accessed by the task ID and the program zone may only be accessed by the task ID. In others, the task ID and program zone are both used to address the table. The task No Op stimulus may be used in various ways, depending upon the implementation. In some implementations, there is no masking of the raw next state and the raw loop commands, and the No Op is transmitted directly where needed. In other implementations, the next process state and/or the raw loop commands are masked if the task No Op stimulus indicates a No Op. In these implementations, the No Op may, or may not, be transmitted as part of the execution wave front.

Figure 65:
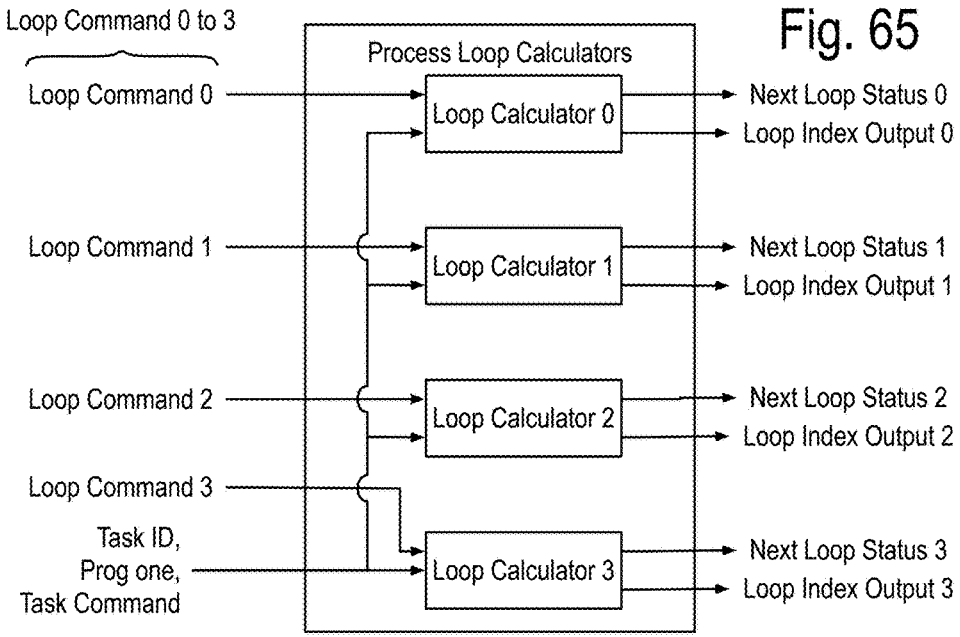

FIG. 65 shows an example implementation of the process loop counters of FIG. 54 including four instances of loop calculators each separately stimulated by a loop command bit pair. All of the loop calculators are also stimulated by the task ID, program zone, and the task command.

Embodiments of the invention separate the loop counting from the loop index and its output. Each process loop calculator responds to a separate loop command generated within the process state calculator to generate the following: a loop index, a loop index output and a next loop state. The loop index output may be used in accessing memories and creating the operand packages. Loop counting is always count down, making zero detection the determination of a loop's end. The initial condition is indexed from a table of several loop initial states, allowing the reuse of the loop calculator as the process state progresses. These entries act to constrain the looping into smaller loop components, thereby removing the need for conditional execution of ranges of loop indexes. Compilation of Fortran loops has to account for conditional execution of the loop body based upon index conditions. To make this efficient in any LSM, each loop initialization table is given 16 entries. The loop index output calculator may add, or subtract, integer increments other than 1, supporting stopping at a boundary, rolling over and sign reversing at the loop index boundary. Each loop calculator of FIG. 65 generates a next loop status as a two bit status code sent to the process state calculator: 00 uninitialized, 01 normal operation, 10 initialized, and 11 loop end encountered.

Each loop calculator responds to the loop command that may be a 2 bit loop command code from the process state calculator: 00 inactive, 01 next loop step, 10 next initial state, and 11 force loop end. Branching becomes a matter of changing the process state, which alters what instructions are fetched locally for the owned resources of the process as the execution wave front moves through them. Looping requirements for Fortran are satisfied in the loop calculators of the process state calculator. Assuming 32 bit down counters, the four loop calculators of one of these processes may be cascaded to provide $2^{128}$ iterations. Rather than branch on an index condition, each loop calculator may have up to 16 sub loops and the process state calculator may respond to the ending each sub loop iteration differently. This provides a good target for conditional processing of loops by Fortran compilers.

Summarizing the Basic Features of Each Process State Calculator: It automatically responds to changes in task ID, program zone and/or task command. It is efficiently implemented with FPGA emulators and with CMOS standard cell libraries. All the power for the next execution wave front is gated off with the no operation signal. The process state and the index output independently change. One adder driven by 1 process state calculator may respond to 16 queue status pairs to add $3^{16}=43,046,721>2^{25}$ numbers. Vector dot products may be summed with just part of one PEM from product results originating anywhere in the EASM. The use of the queues to stimulate process state change removes the need for multiple chip synchronization. Every data process acts based upon the availability of data to it process and its ability to handle the results. With 32 bit down counters, the four loop calculators of one of these processes may be cascaded to provide $2^{128}$ iterations. Rather than branch on an index condition, each loop calculator has up to 16 sub loops and the process state calculator may respond to the ending of each sub loop iteration differently.

Consider an extension of the core architecture that supports local recursive processes. Assume that the local feed queues are configurable as either queues or as stacks on a task-by-task basis. The functional distinction between a queue and a stack is that the queue is a First In-First Out (FIFO) structure whereas a stack is a List In First Out (LIFO) structure. To properly handle the arithmetic requirements, both require the ability to remove their top 3 entries, and both may operate successfully adding one entry at a time.

Figure 66:
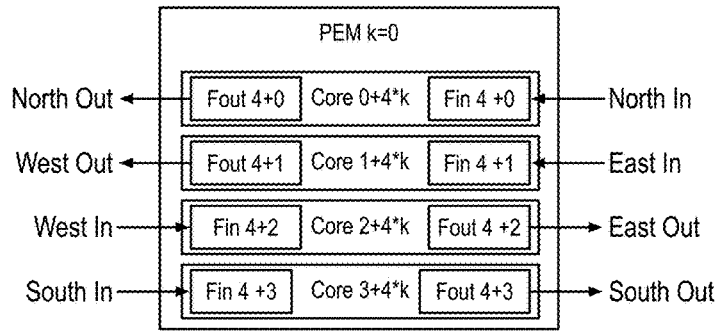
FIG. 66 to FIG. 69 show some details of a local feed North East West South feed network providing local communications among the PEM of the DPC.
Figure 67:
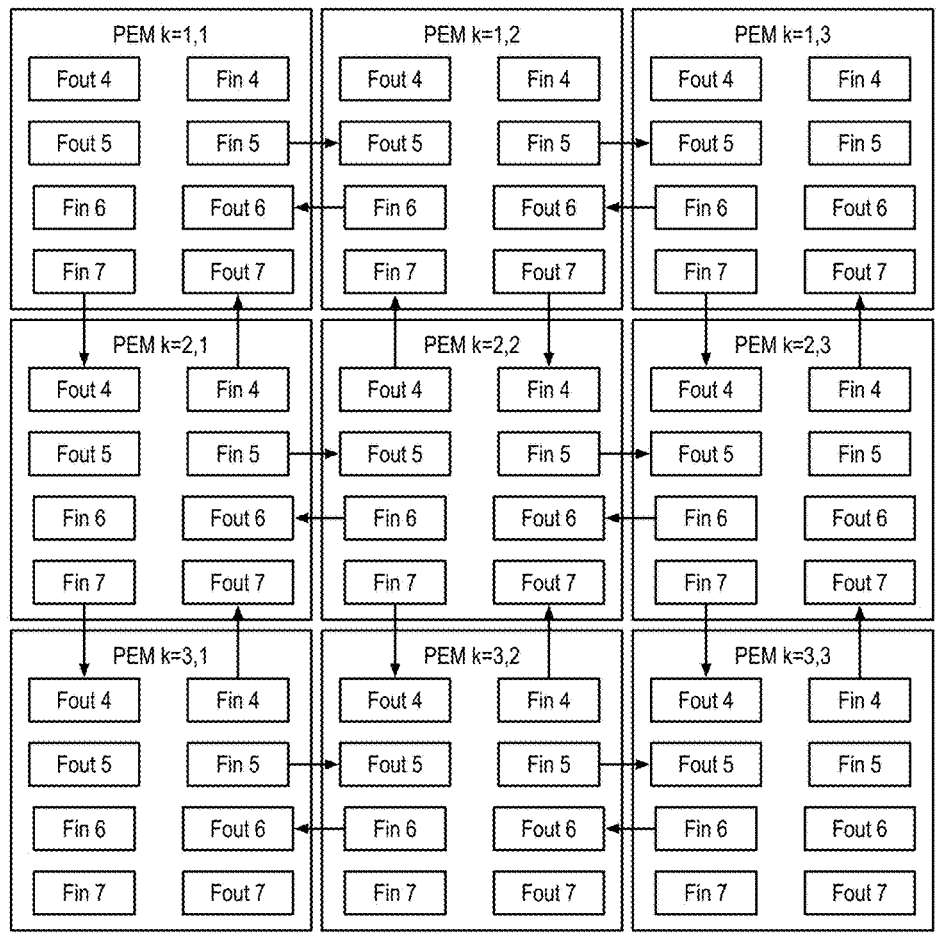
Figure 68:
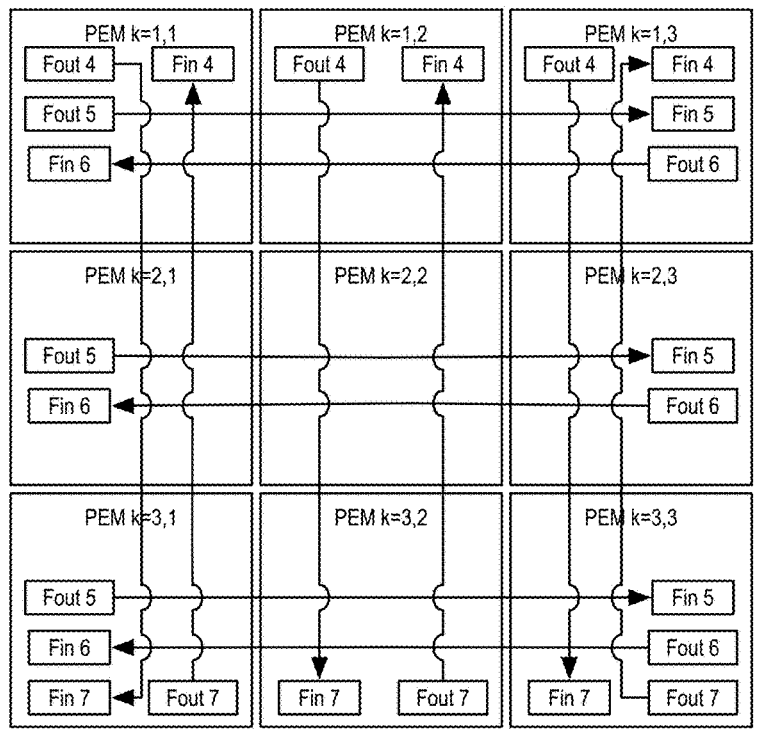
Figure 69:
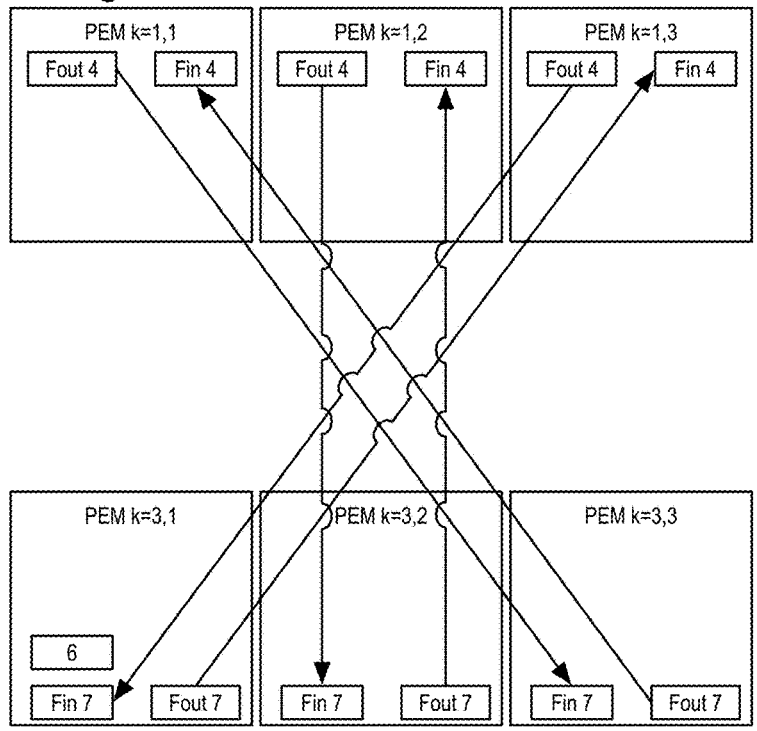

As a first step into communication, note that all the processes within a PEM are able to communicate with any other process within the PEM using the local feedback mechanism of the PEM. FIG. 66 shows an example of an element of a local North East West South (NEWS) feed network between neighboring PEM as shown in FIG. 9 using the same elements as the internal feedback components within the cores and PEM. Core 0 provides the North Input to a feed input port labeled Fin [4+0] and a South output port from Fout[4+0]. Core 1 provides the East Input to a feed input port labeled Fin [4+1] and a West output port from Fout[4+1]. Core 2 provides the West Input to a feed input port labeled Fin [4+2] and a East output port from Fout[4+2]. Core 3 provides the South Input to a feed input port labeled Fin [4+3] and a North output port from Fout [4+3]. FIG. 67 shows an example of using an extension similar to that shown in FIG. 30 to provide a nearest neighbor NEWS feed network between neighboring PEM cells in the DPC. FIG. 68 shows some added detail to the feed network of FIG. 67 which wraps the outer top PEM into communication with the outer bottom PEM and wraps the outer left PEM to the outer right PEM to form a local torus feed network. FIG. 69 shows an alternative detail to the feed network of FIG. 67 and FIG. 68, in which the feed between top and bottom outer PEMs are twisted. One skilled in the art will recognize that the feeds from the left to the right as well as the feed from the top to the bottom could also be twisted. Consider one of them twisted and not feeding in the other direction to form a Moebius strip. Consider both of them twisted to form a Klein bottle. The DPC may be extended to include two configuration bits, one for each of these directions, top to bottom and left to right. In a first configuration setting, coded as "0", the direction of the outer PEM is coupled as in FIG. 68, otherwise, they are twisted as in FIG. 69. These localized feed networks within a DPC may be advantageous for several kinds of localized calculations, such as calculating the pivot within a DPC for Block LU Decomposition. Such networks may also support very fast local communication of rows to swap for matrix inversion by Gaussian elimination and LU Decomposition of matrices that may fit within the DPC.

Summarizing, PEMs of the DPC are adapted to implement a local North East West South (NEWS) local feed network adapted to stimulate and respond to the cores within the PEMs. The NEWS local feed network may be adapted to wrap around from top to bottom within the DPC, wrap around with a twist from top to bottom within the DPC, or wrap around with an offset from top to bottom within the DPC. The DPC may include a configuration state retained over time to configure the NEWS local feed network to operate as one of wrap around from top to bottom within the DPC, wrap around with a twist from top to bottom within the DPC, and wrap around with an offset from top to bottom within the DPC.

There are several problems inherited by existing communications systems within super computers: 1: the standard, message-based communication protocols, stalls both transmission and reception of messages, so that transmission and delivery occurs over multiple clock cycles. 2: standard message formats support variable length data payloads that add a substantial complexity to message transfers and processing. 3: the use of routers to move the messages across standard communications networks do not provide any certainty about the latency to traverse the router from message input to output. 4: communication failures into, within and out of routers are very difficult to handle and almost inevitably engender the intervention of more systems components to roll back to the last point of known good transfers, and in a number of cases, this may not be possible, instead causing large scale crashing of the system. 5: many communication systems grow in complexity faster than the number of clients for that system, causing the communications manufacturing cost, as well as energy consumption to grow more than linearly to the number of data processors.

These problems must be solved to achieve exascale performance of even the first benchmark program, Linpack as some implementation of Block LU Decomposition. To simplify this discussion, all the communication nodes, the sources, the destinations of all the messages in these supercomputers satisfy the following requirements. Note that in some implementations there may be other messaging protocols used to provide additional non-critical path communication, say to provide cabinet status across an Ethernet channel.

Figure 70:
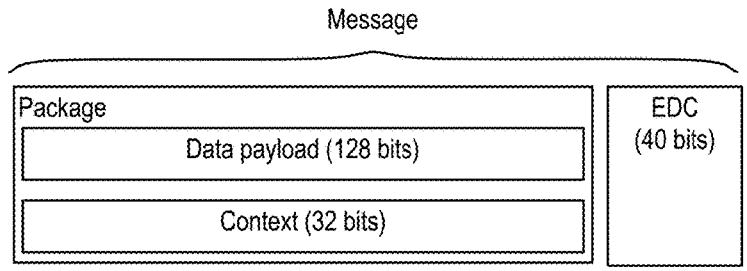
FIGS. 70 to 73 show some details of the message structure and physical transfer mechanism, including the alignment of incoming messages to a local clock.

FIG. 70 shows an example of a fixed structural message format and are adapted to be delivered or sent in one local clock cycle, whether at the source, the communication node, and at the destination of the message. By way of example, the message is shown with a data payload of 128 bits, a movement context or direction of 32 bits and an EDC component of 40 bits. This message format within the DPC or AC may be implemented with wires as electrical signals within an essentially synchronous system. This is an example of a message that includes sufficient error detection and correction to fix most small problems and immediately identify larger problem so that the link where a communication error occurs may be detected at the next node. However, upon leaving a Data Processor Chip (DPC), the wiring demand may require a time division multiplexing scheme. Also, when leaving a module stack or node stack, the distances being traversed and noise related issues may further require the time division multiplexing scheme to be implemented using some kind of optical fiber physical transport. For the sake of simplifying the discussion, both of these situations are addressed by a single set of definitions, that within a module stack of node stack, may be implemented by an electrical implementation somewhat like Ethernet, but which outside the module or node stack, is implemented by fiber optics.

Figure 71:
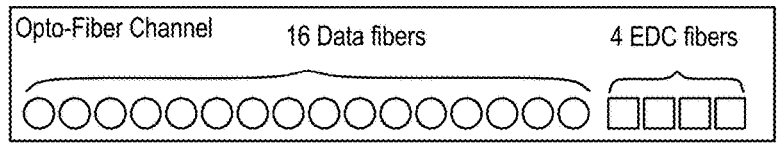
Figure 72:
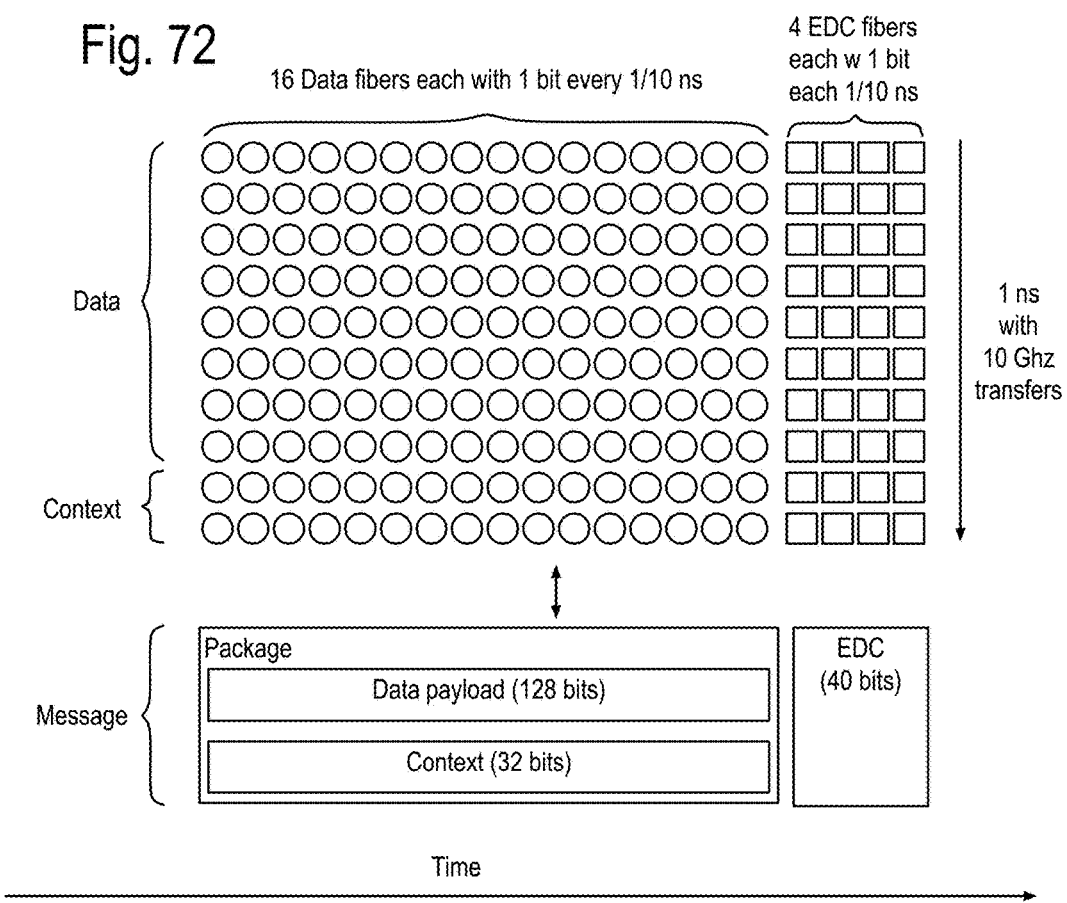
Figure 73:

FIG. 71 defines an opto-fiber channel and FIG. 72 shows the delivery and/or transmission of one of the messages of FIG. 70 across the opto-fiber channel of FIG. 71. FIG. 71 shows an opto-fiber channel composed of 16 data fibers and 4 Error Detection Correction (EDC) fibers, each bidirectionally delivering 10 Gbits/sec provide the mechanism for systems level communication. In what follows, the opto-fiber channels will usually be referred to as "channels". FIG. 72 shows the delivery and/or transmission of one of the messages of FIG. 70 across the opto-fiber channel of FIG. 71. Over the course of 1 ns, each channel delivers a package and an EDC component. The package is seen by programs as a data payload of 128 bits and a context of 32 bits. The context defines how the program responds to the data payload. Context is also referred to as direction in the Running Linpack. The EDC component is used to insure correct transmission and to determine communication errors. The EDC component is essentially hidden from the programs. What the programs and operating environment normally know is when package reception is messed up, and whether the communication channel may be replaced. In task management (which is part of every program), all the diagnostic info based upon the EDC is available. FIG. 73 shows an example of an incoming alignment circuit applicable for destinations that may be receiving messages that are essentially asynchronous with the local clocking, such as a message incoming interface, as shown in FIG. 80. Using two pipe stages, the reception of two successive messages may be aligned to the internal clocking of the destination. The received message may overlap two of the local clock cycles, because the propagation delays to this destination are not synchronized. Using two pipe stages to capture and align received messages provides a fixed latency constant throughput solution to locally synchronize the reception of these messages.

Figure 90:
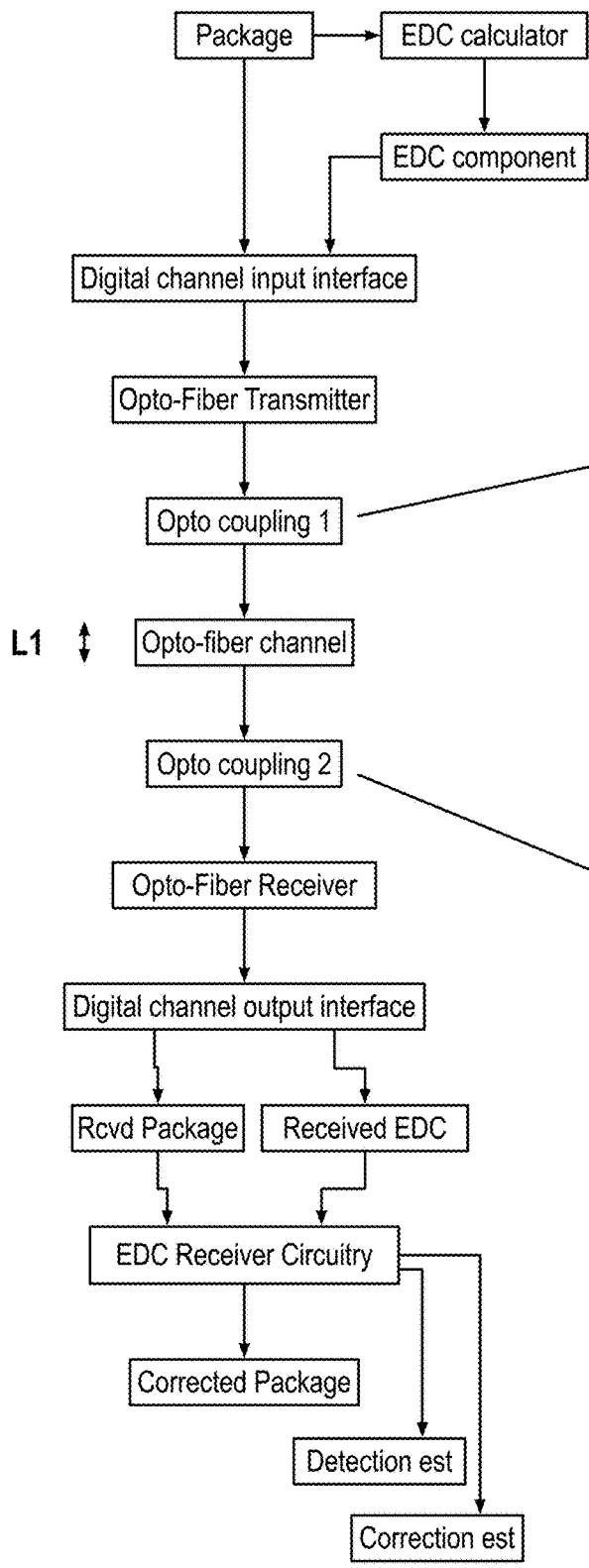
FIG. 90 to FIG. 92 show some details of a method of deriving, calibrating and testing optical transmitters, the optical physical transport, and optical receivers, as well as the EDC circuitry for use in the bundles of opto-fiber channels.
Figure 91:
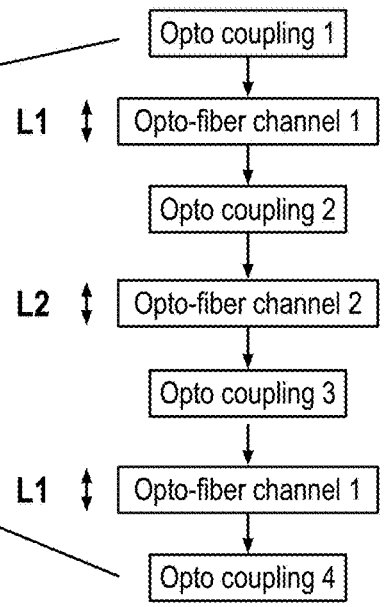
Figure 92:
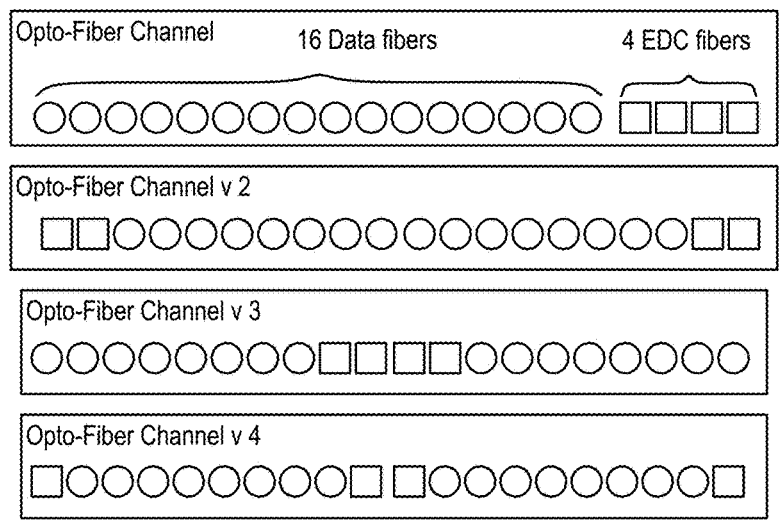

FIGS. 74 to 85 show some details of the bundles of channels, stairways, and landing modules, in terms of the Simultaneous Multi-Processor Channel (SMPC) cores, and bundle modules of the SMPC cores. FIG. 90 to FIG. 92 show some details of a method of deriving, calibrating and testing optical transmitters, the optical physical transport, and optical receivers, as well as the EDC circuitry for use in the bundles of opto-fiber channels.

FIG. 74 shows an example of a simplified floor plan view of an external bidirectional simultaneous binary graph communications network whose nodes are landing modules interfacing through stairways to PEM 0:3 in the Data Processor Chip (DPC) of FIG. 9. FIG. 75 shows the communications network seen as a graph of nodes connecting the PEM 0:3 through their respective stairways 0:3 to the binary graph of Node 0:2. In some embodiments, the stairways may be included in the instructed resources of a specific kind of core, for example the SMP FP cores or possibly SMP integer cores. In either case, a rounding circuit may be added to the instructed resources of the SMP FP core(s), with the instructions including the option to round an FP+k guard bit floating point number into one of two kinds of outputs: a FP with no guard bit floating point number or the FP number and a separate k bit component for possible inclusion into the index list and/or the context, either of which may be part of a message entering an input message processor of the stairway.

Figure 78:
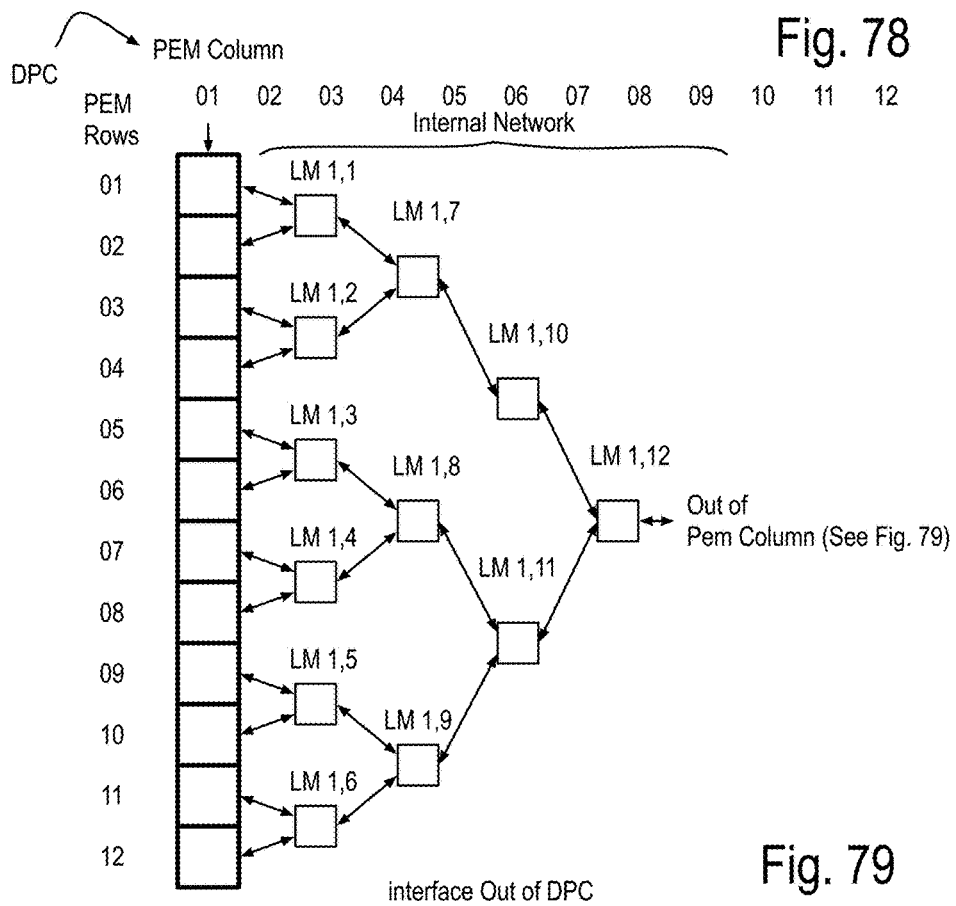
Figure 79:
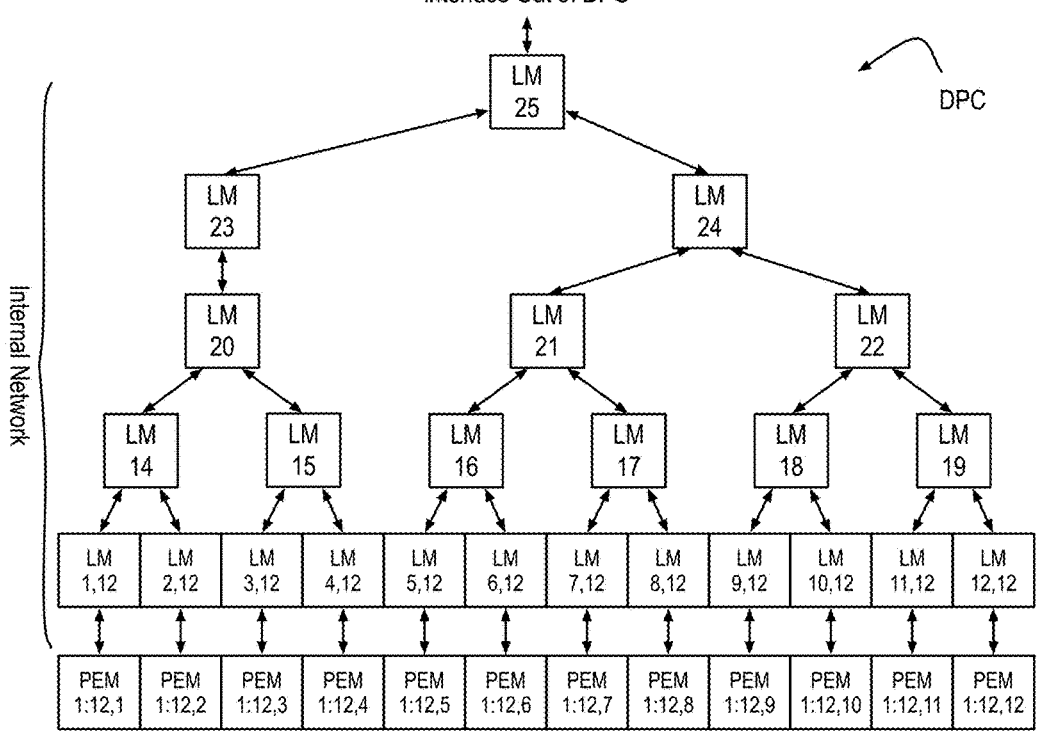

FIG. 76 shows the communication node including an integrated landing module (LM) a bundle from above and two bundles from below connected to the LM. The LM is configured to bidirectionally communicate through each bundle on a local clock, which in this example is a 1 ns clock. FIG. 77 shows each bundle of FIG. 76 including 16 data channels, a task control/status channel, a transfer request channel and two spare channels. The spare channels support fault resilience if one of the other channels fails. Each of the channels moves a message as shown in FIG. 72 in and out of the communication node of FIG. 76 in and out every clock. FIG. 78 shows a column of PEM in the DPC coupled through instances of the nodes of FIG. 76 in a binary graph. The nodes are labeled as LM, highlighting the integrated landing modules. Note that these communication nodes may or may not require the alignment circuitry operations outlined in FIG. 73. FIG. 79 shows the communications network extended as a landing modules traversing PEM 1:12, y for y=1:12 in the DPC. Each of these lines is a bundle. Also note, that there are approximately the same number of landing modules (communication nodes) as there are PEM. Thus, one bundle connects the top landing module (communication node) within the DPC to the rest of the super computer. This bundle may send and receive 16 data payloads of two double precision numbers (128 bits) every nanosecond, providing the DPC with 2 Terabits (thousand gigabits) sustainable I/O bandwidth with the rest of the system.

The Data Processor Chip (DPC) may include an interface, an internal network, at least Npem of Programmable Execution Modules (PEMs). The interface adapted to transfer a signal bundle into and out of the DPC at a data bandwidth of two numbers for each of Nchannels on each local clock cycle with a clock period of at most 2 ns, where the NChannels is at least 8, and the number is at least 32 bits. The internal network couples to the interface and is adapted to communicate across the interface without stalling the data bandwidth. The internal network may include a binary graph of internal nodes (landing modules), each of the landing modules adapted to communicate across up to 3 three links, each adapted to bi-directionally transfer the data bandwidth. Each of the PEMs may include at least Ncore-per-module cores and a module communication interface (stairway) adapted to support communication into and out of the internal network at the data bandwidth, where the Npem is at least 64, where Ncore-per-module is at least one. Each of the cores may be adapted to operate at least two simultaneous and independent processes owning separate instructed resources of the core configured to locally implement part of the Block LU Decomposition as a block processor of a block of Nblock rows and Nblock columns of numbers adapted to respond to channel receptions of at least one of the channels at the module communication interface, where Nblock is at least 8.

The DPC may be adapted to create the system configured to execute a version of Block LU Decomposition with partial pivoting of a matrix A with at least N rows and at least N columns of the number by performing at least ¼ exaflop for a sustained run time of at least 8 hours by using at least NDPC of DPC, wherein the number implements double precision floating point. Wherein the N is at least 16 K*K, wherein the K is 1024, and the NDPC is at least ¼ K*K.

Each of the cores may adapted to perform at least one exaflop divided by the product of NDPC multiplied by Npem multiplied by Ncore-per-module per the clock period. The internal network may be adapted for simultaneous communication across each of the internal nodes and the links for simultaneous data bandwidth delivery to and from the module communication interface of each of the core modules. And Npem is at least 32 and Ncore-per-module is at least 1.

FIG. 80 shows two instances of a Simultaneous Multi-Processor Channel (SMPC) core. Each of the SMPC cores are adapted and configured to simultaneously preform two communications activities by operating two separate message processors, an incoming and an outgoing message processor. The Outgoing Message Processor (OMP) responds to an outgoing payload being presented to the SMPC core by generating a transmitted message across a channel. The Incoming Message Processor (IMP) responds to a received message from the channel to generate an Error In flag (ERI), a good data payload, and controls for at two least destinations.

The two SMPC cores are labeled SMPC core 1 situated above the second instance labeled SMPC core 2. On the left side, the OMP 2 of the SMPC core 2 is aligned with the IMP 1 of SMPC Core 1 to communicate in a first direction through the channel labeled as channel direction 1. On the right side, the OMP1 of the SMPC core 1 is aligned with the IMP 2 of the SMPC core 2 to communicate in a second direction through the channel labeled as channel direction 2.

The operations of the left side begin with the outgoing payload 2 being presented to OMP 2, which responds by generating transmitted message 1, which is transported in channel direction 1 to create the received message 1 presented to IMP 1. The IMP 1 responds to the received message 1 by generating a first ERror In (ERI 1), a good payload 1 and destination controls 1, for at least two first destinations, labeled as $1^{st}$ In dest 1, $1^{st}$ In dest . . . , and $1^{st}$ In dest InDn1, where InDn1 is at least two. The good data payload 1 may be sent and/or presented to one or more of the first destinations based upon the destination controls 1.

The operations of the right side begin with the outgoing payload 1 being presented to OMP 1, which responds by generating transmitted message 2, which is transported in channel direction 2 to create the received message 2 presented to IMP 2. The IMP 2 responds to the received message 2 by generating a second ERror In (ERI 2), a second good payload 2 and destination controls 2 for at least two second destinations, labeled as 2' In dest 1, 2' In dest . . . , and 2' In dest InDn2, where InDn2 is at least two. The good data payload 2 may be sent and/or presented to one or more of the second destinations based upon the destination controls 2.

Each of the transmitted messages 1 and 2 have the same structure. Transmitted message k, for k=1 to 2, includes an ECC k for the data payload k and the context k. Each of the received messages 1 and 2 have the same structure. Received message k, for k=1 to 2, includes an ECC k for the data payload k and the context k.

Note that the activities and structure of the left side of FIG. 80 are mirrored in the right side, where on the left, operations begin from the bottom and successively move to the top, and on the right, operations begin from the top and successively move to the bottom. Further note that as the operations on either side are successive, they can and often do occur in separate pipe stages, with each of the cores, and that the cores may or may not be aligned to the same clock. Transversal of the channel in the two directions may well be about the same duration, they are not required to be identical. Because of these facts, the discussion will focus on the left side of FIG. 80 in the discussion of FIG. 82 and FIG. 83, showing some details of the left side of FIG. 80, which are structurally similar to the right.

FIG. 81 shows an example of two bundle modules interacting across a bundle of channels as first shown in FIG. 77. Each of the bundle modules includes a SMPC core for each of the channels of the bundle. One of the spare channels, and its SMPC core are shared with the data channels and their SMPC cores to provide fault resilience for the data channels and their SMPC cores. The other spare channel, and its SMPC core are shared with the CS channels and their SMPC cores to provide fault resilience for the CS channels and their SMPC cores.

Figure 82:
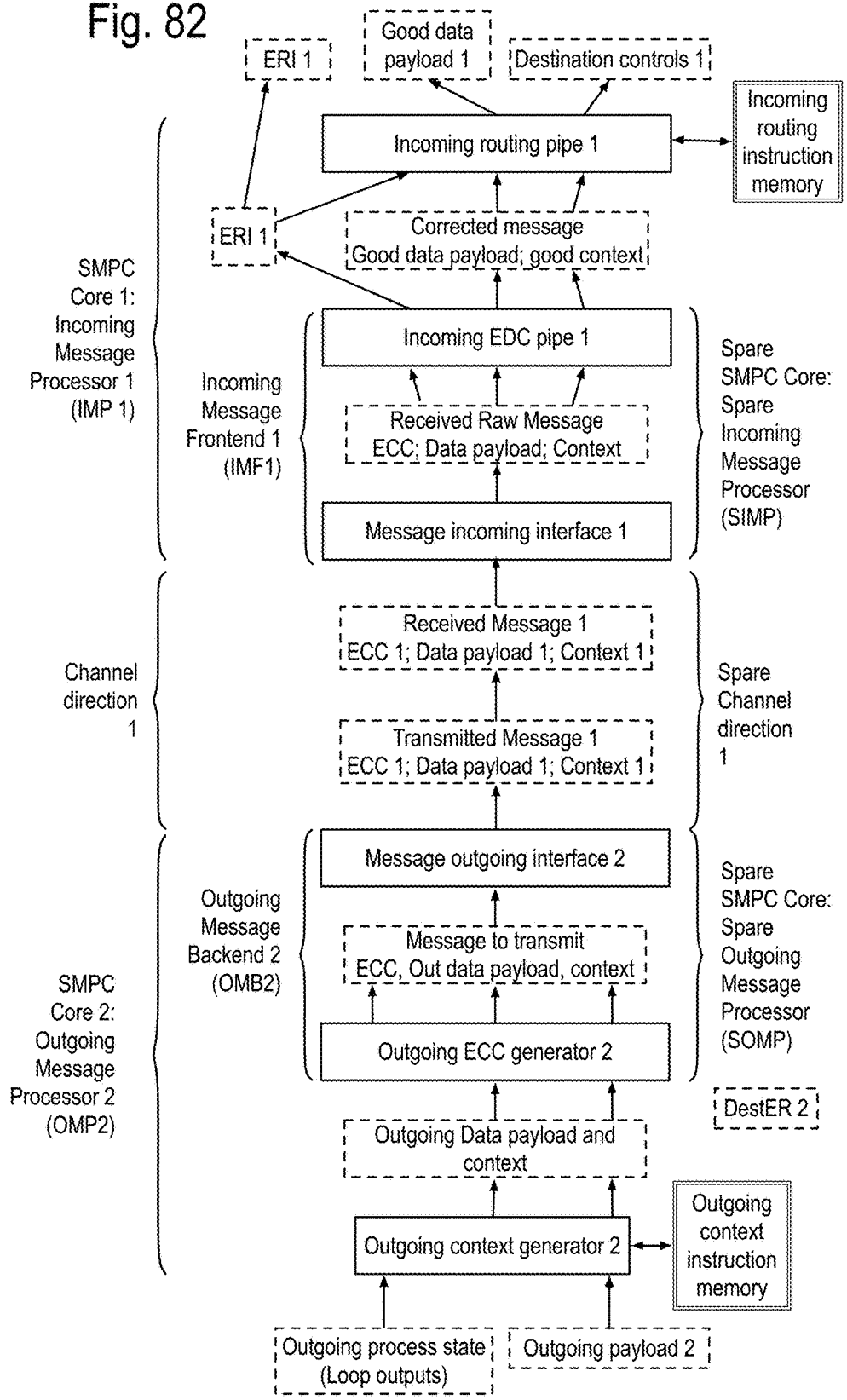
Figure 83:
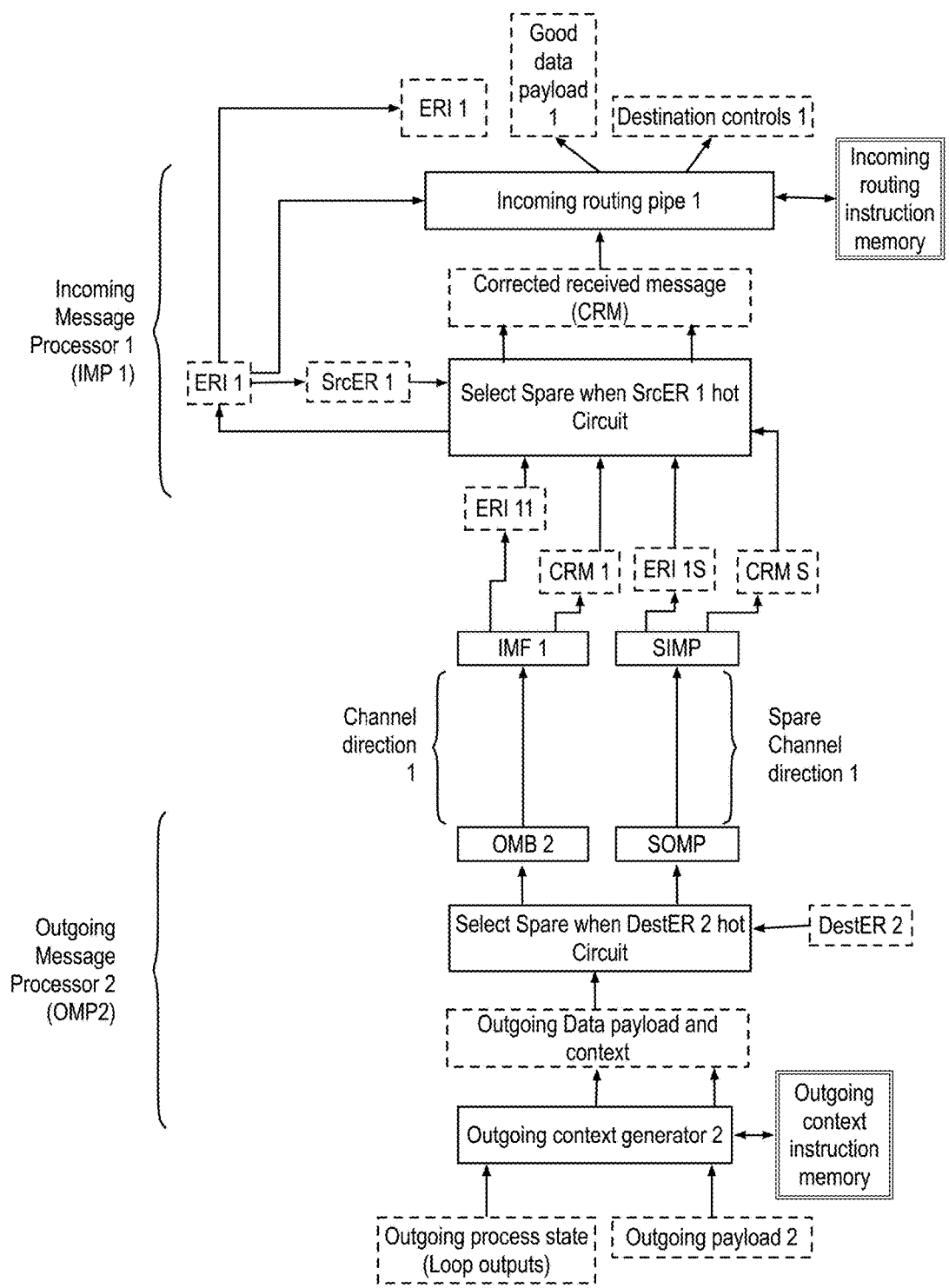

FIG. 82 shows the left side of FIG. 80 in the context of interactions with a spare channel associated with the channel of the bundle as shown in FIG. 81.

The Incoming Message Processor (IMP) 1, of SMPC core 1, includes an Incoming Message Frontend 1 (IMF 1), and an incoming routing pipe 1. The IMF 1 includes a message incoming interface 1 and an Error Detecting and/or Correcting (EDC) pipe 1.

The Outgoing Message Processor 2 (OMP 2), of SMPC core 2, includes an Outgoing Message Backend 2 (OMB 2) and an outgoing context generator 2. The OMB 2 includes the outgoing Error Control Code (ECC) generator 2 and a message outgoing interface 2.

The spare SMPC core includes a Spare Incoming Message Processor (SIMP). The SIMP includes a replacement for the message incoming interface 1, and a replacement for the incoming EDC pipe 1. Note, that the SIMP may not include a replacement for the incoming routing pipe 1, which may differ from one channel to the next.

The spare SMPC core includes a Spare Outgoing Message Processor (SOMP) that can replace the outgoing ECC generator 2 and the message outgoing interface 2. Note, that the SOMP may not include a replacement context generator 2, which may differ from one channel to next.

Assume that no errors have been reported by the IMP 1 asserting ERI 1. In this situation, the left hand side indicates the components operated for this communication activity. Starting from the bottom, in SMPC core 2, the outgoing context generator 2 responds to an outgoing payload 2 and possibly an outgoing process state and also possibly, loop outputs of the simultaneous process to generate the outgoing data payload and context. The outgoing ECC generator 2 responds to the outgoing data payload and the context by generating the message to transmit, which includes the outgoing data payload, the context and the ECC for the payload and context. The message outgoing interface 2 responds to the message to transmit by generating the transmitted message 1 traversing the channel in channel direction 1 to create the received message 1.

At the SMPC core 1, the message incoming interface 1 responds to the received message by generating the received raw message, including an ECC, a data payload and a context. The incoming EDC pipe 1 responds to the received raw message by generating the ERI 1, and a corrected message that includes a good data payload and a good context. The incoming routing pipe 1 responds to the ERI 1, and the corrected message as follows. If the ERI 1 is asserted, the corrected message is not delivered into the destinations. If the ERI 1 is not asserted, the corrected message is used to generate the good data payload 1 the destination controls 1, which are then used to deliver the good data payload 1 to the first input destinations as shown in FIG. 80.

However, over time this channel direction 1 may be in error, or about to begin to be in error, and the ERI 1 signal may be asserted. When the ERI 1 signal is asserted, OMP2 responds a short time later by setting Destination Error 2 (DestEr2). After DestEr2 is set, the right side shows the SIMP, the Spare channel direction 1 and the SOMP replacing the IMF 1, the Channel direction 1 and the OMB 2 on the left side. DestEr 2 may be the state of a memory. The memory may retain its contents until reset or written, and may persist in retaining its content with or without power being provided.

FIG. 83 shows a simplified view of FIG. 82, in that the IMF 1, the SIMP, the OMB 2 and the SOMP are not shown in terms of their constituents. During normal operations, ERI 1 is not asserted and ScrEr1 is not set, so that the Select Spare when SrcEr1 is hot circuit selects the received message from Channel direction 1. DestER 2 is not set, again because ERI 1 has not been asserted. The Select Spare when DestER 2 is hot circuit responds to the state of Dest ER2 by stimulating the OMB 2 with the outgoing data payload context as shown in FIG. 82. The Select Spare when SrcEr 1 hot circuit selects the ERI 11 and CRM 1 generated by IMF 1 for use in IMP 1 as the ERI 1 and Corrected Received Message (CRM). Summarizing normal operation, the left side of FIG. 83 and FIG. 82 are used.

Over time, the channel direction 1 may be in error, or about to begin to be in error, and the ERI 1 signal may be asserted. When the ERI 1 signal is asserted, IMP1 sets SrcER1 and OMP2 responds a short time later by setting Destination Error 2 (DestEr2). This triggers the fault resilient mode of operation, using the right side components to replace the left side components of FIG. 82 and FIG. 83. The Select Spare when DestER 2 hot circuit stimulates the SOMP with the outgoing data payload and context as shown in FIG. 82. The SOMP uses the spare channel direction 1 to deliver the received message to the SIMP which responds by generating the ERI 1S and CRM S. The Select Spare with SrcER 1 hot circuit selects the ERI 1S and CRM S for use in IMP 1 as the ERI1 and the CRM, respectively. Summarizing the fault resilient mode of operation, the right hand side of FIG. 83 and FIG. 82 are used to replace the left side.

One skilled in the art may recognize that a specific program may not allocate for use all of the data channels or each of the channel directions in at least some of the bundles. Extensions of the circuitry shown in FIG. 82 and FIG. 83 may also include a local allocation vector to support replacing faulty channel direction components with unallocated channel components in a very similar way. This is within the scope of this invention and its claims, but is not being shown in detail as it can be derived by one of ordinary skill from the discussion of FIG. 82 and FIG. 83.

Power to unused components of the Input Message Processors (IMPs) and the Output Message Processors (OMPs) may preferably be gated off in a manner similar to the discussion of gating off power in an SMP core found in FIG. 51 and FIG. 53 based upon a local channel usage vector similar to the overall use vector. Note that the incoming and outgoing interfaces may not be gated on and off in some implementations, because it may take longer for the transmitters and receivers to stabilize for normal operations that one or a few local clock cycles.

Figure 84:
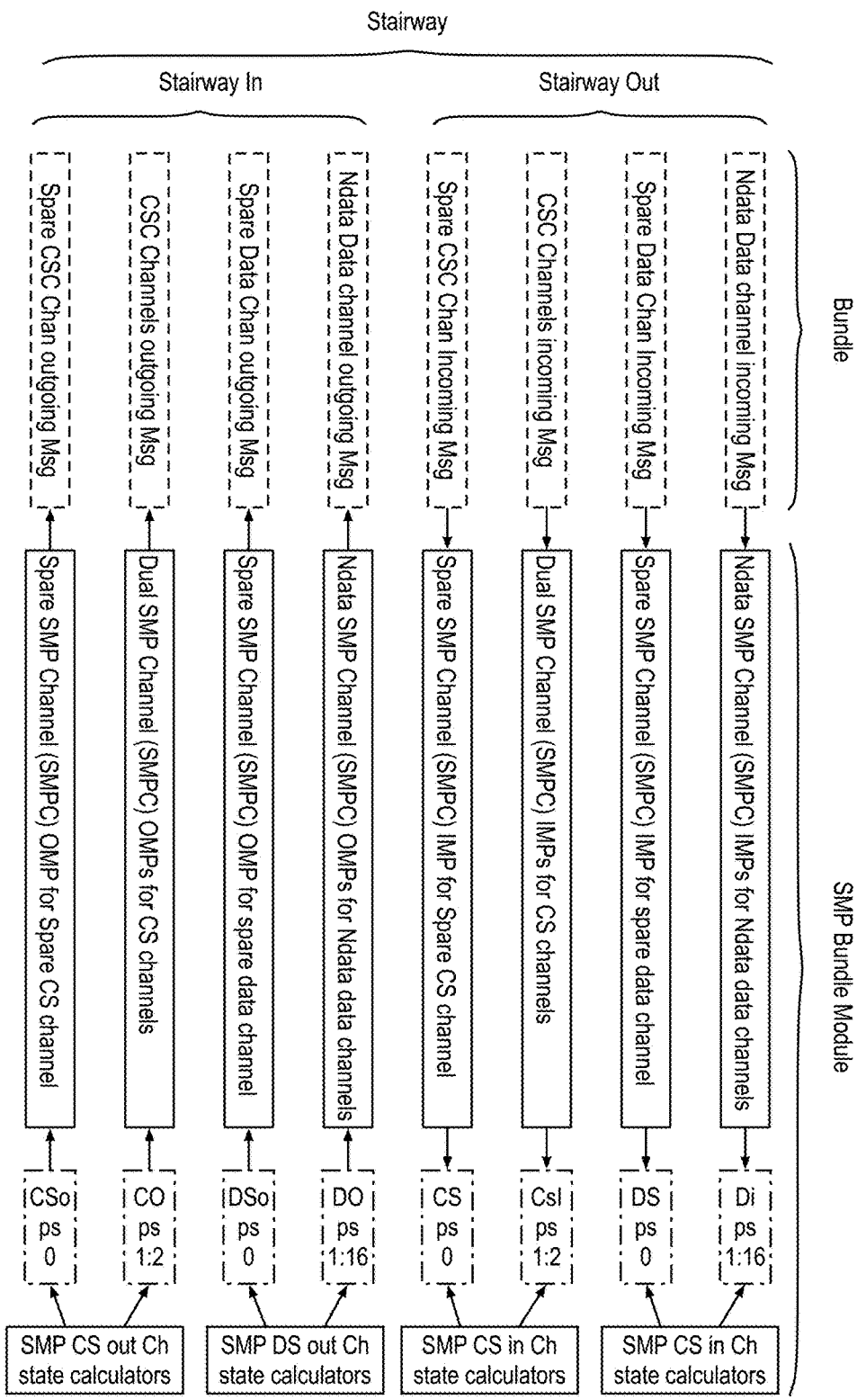

FIG. 84 shows some details of the stairway of FIG. 74 and FIG. 75, and further details of the SMP Bundle Module shown in FIG. 81 including a SMPC core for each of the channels of the bundle. Each of the incoming, and outgoing, message processors are simultaneously controlled by a separate process state calculator shown generating a process state. Note that any and/or all of these process state calculators may also be generating loop outputs, which have not been shown to simplify this drawing.

The stairway of FIG. 74 and FIG. 75 includes the stairway in and stairway out components. FIG. 84 further shows the stairway in component including each of the SMPC Output Message Processors (OMP), each delivering their respective outgoing messages for transmission across the bundle. The stairway out component includes each of the SMPC Incoming Message Processors (IMP) receiving their respective incoming message (Msg) from their respective channel of the bundle.

Figure 85:
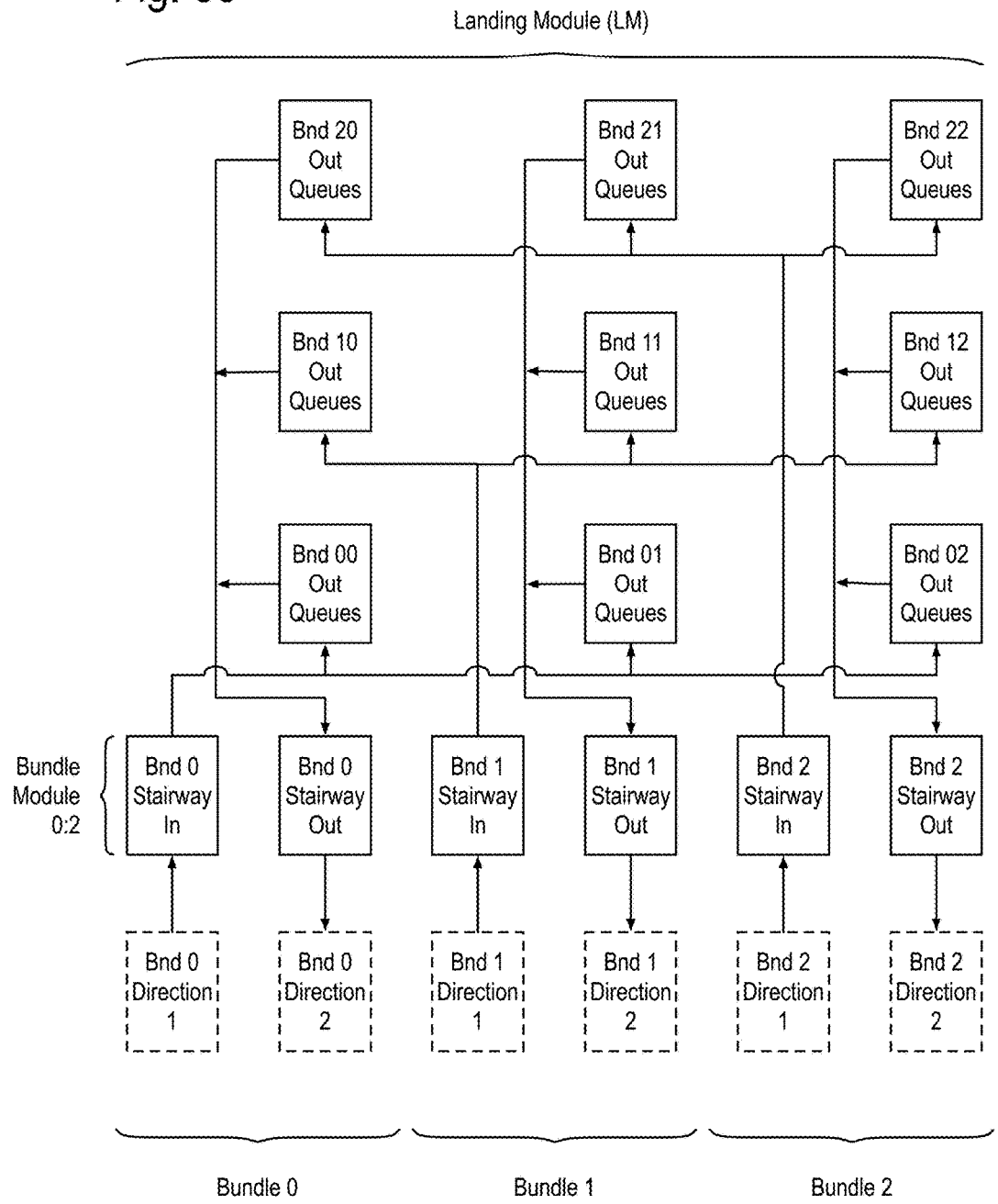

FIG. 85 shows some details of the Landing Module (LM) of FIG. 74 to FIG. 79. Each landing module includes three instances of the bundle modules 0:2 shown in FIG. 81 and FIG. 84, each coupled to a separate bundle, Bundle 0:2, forming three stairways. The LM frequently has the requirement of maintaining the order in which messages are received through to their output, possibly on other Bundles, and possibly interleaved with message from other channels in other bundles.

For each stairway in, labeled Bnd 0:2 stairway in, for each of the incoming message processors IMP shown in FIG. 84, their incoming data payloads, and possibly some or all of their corresponding contexts, are presented into one or more of three queues. For example, Bnd 0 stairway in, each of its IMPs has destinations of Bnd 00 out queues, Bnd 01 out queues and Bnd 02 out queues. Also, for Bnd 0 stairway out, the process state calculator for each of its output message processors (OMPs) receives the status of the corresponding queues of Bnd 00 out queues, Bnd 10 out queues and Bnd 20 out queues. The execution wave from for these processes starts by accessing the corresponding output queues to generate the outgoing data payload, which may also include part, or all, of the incoming context associated with the payload. The outgoing payload and possibly part or all of the context are stimulate the OMP to generate the transmitted message on the channel of the corresponding bundle.

Figure 86:
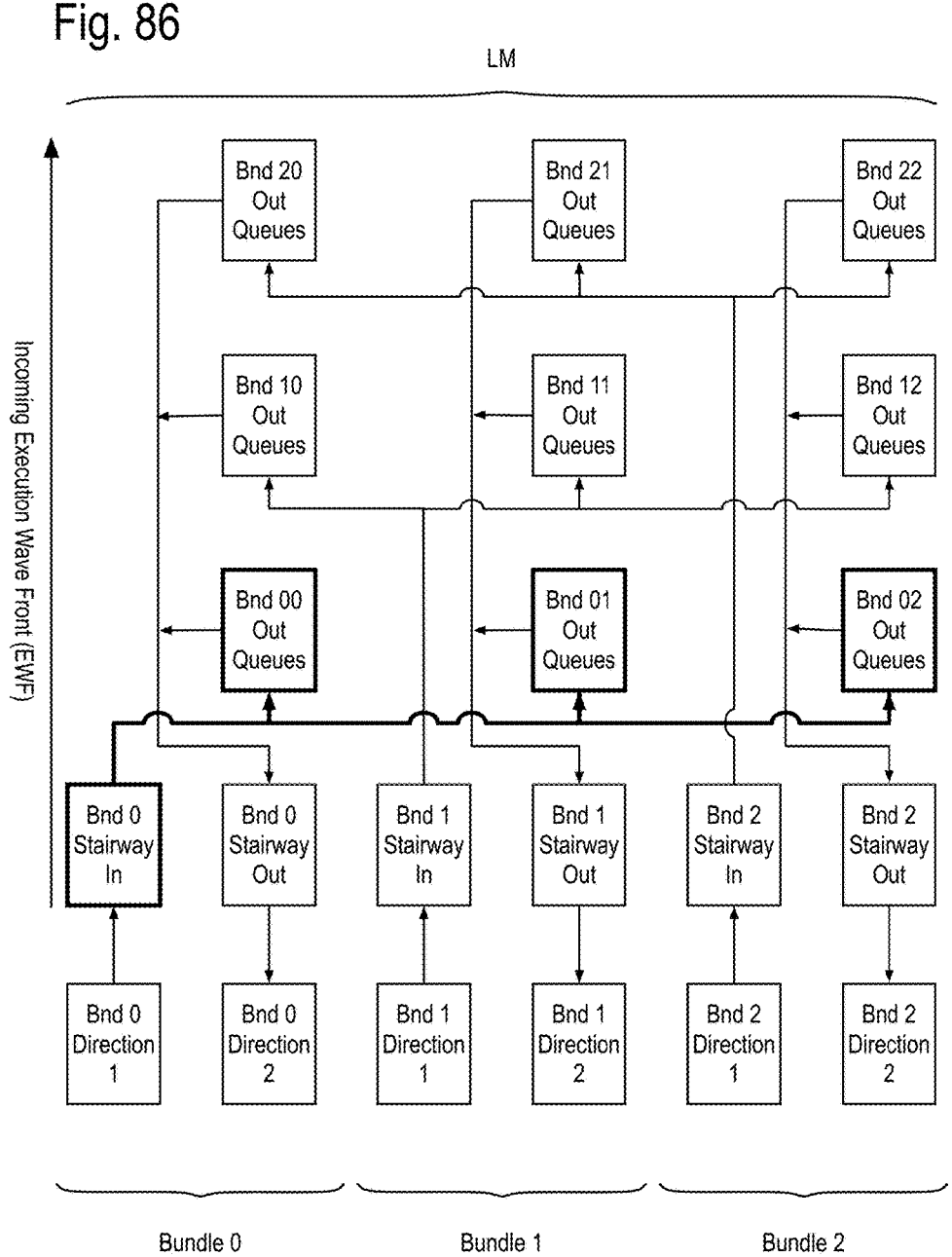

FIG. 86 is a version of FIG. 85 showing the incoming execution wave front for the stairway in components of the bundles 0:2 with the execution wave front for the bundle 0 stairway in components highlighted with thicker lines than the rest of the components and their lines. The incoming execution wave front starts at the Bundle k Stairway in for k=0:2.

Figure 87:
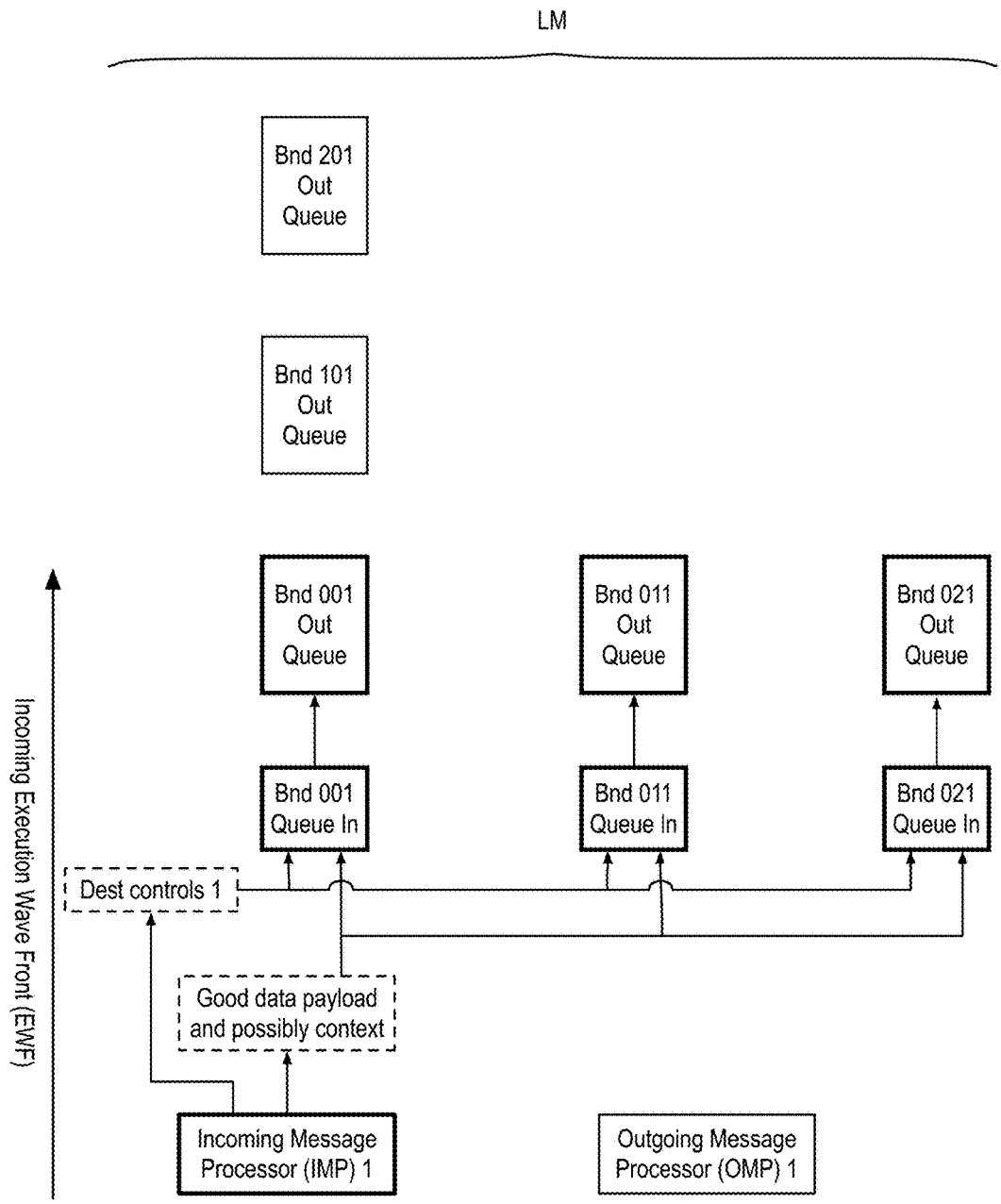

FIG. 87 shows the incoming execution wave front of FIG. 86 in terms one channel's Incoming Message Processor 1 (IMP 1), which generates the destination controls (Dest controls 1) and the good data payload and possibly the context. The Dest controls 1 are sent to Bnd 001 Queue In, Bnd 011 Queue In, and Bnd 021 Queue In to control input to the channel queues 001, 011 and 021. In one implementation, the Dest controls 1 may implement a no more than one hot selection of these channel queues. If hot, Bnd 001 presents the good data payload and possibly the context to bundle 001 out queue, where it is retained in sequence with the other good data payloads and possibly part or all of the context received with the good data payload.

Figure 88:
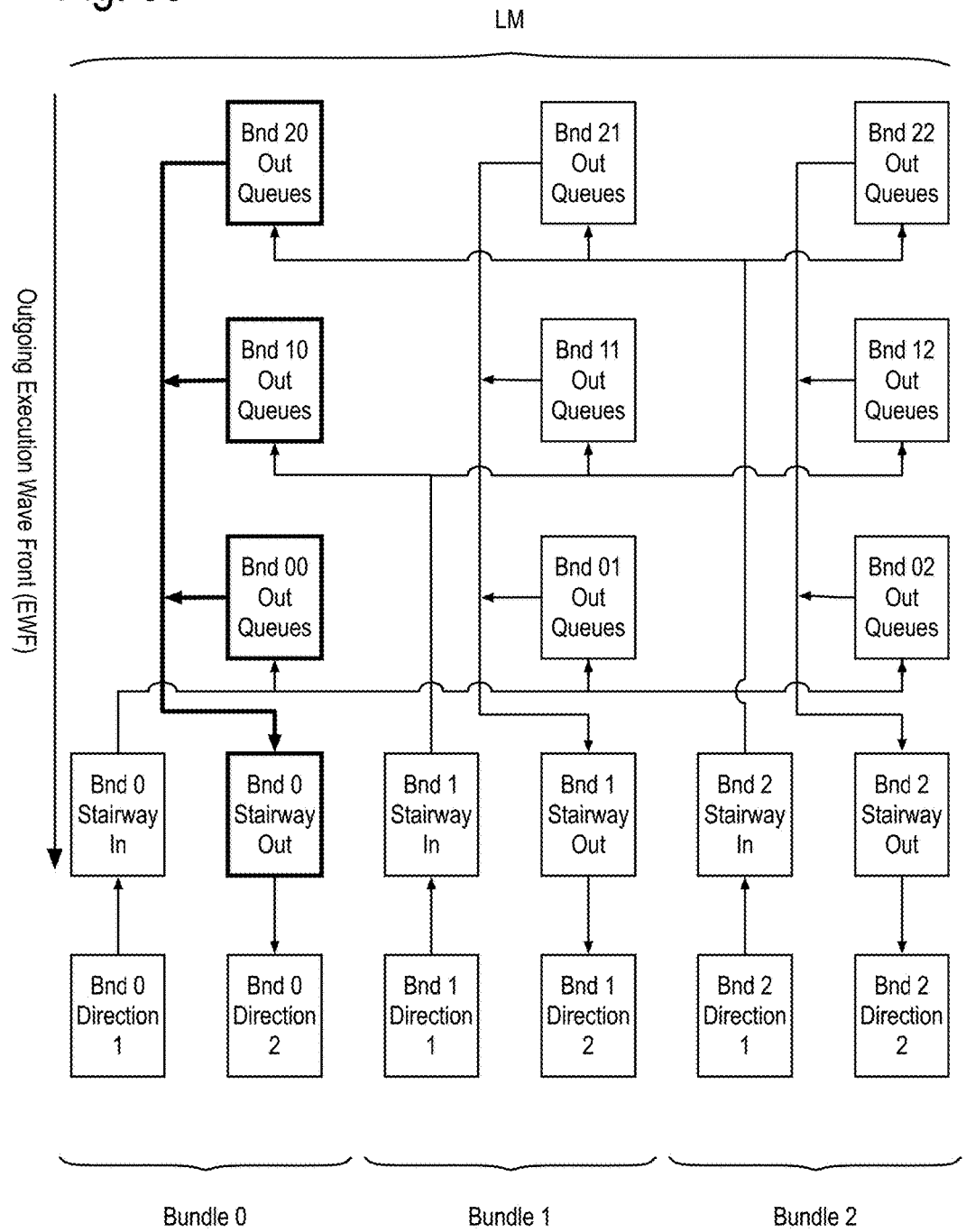

FIG. 88 is a version of FIG. 85 showing the outgoing execution wave front for the stairway out components of the bundles 0:2 with the execution wave front going to the Bnd 0 stairway out highlighted in thicker lines than the rest of the components and their lines. The outgoing wave front starts with the Bnd 20, 10, 00 Queues, and proceeds to the Bnd 0 stairway out components.

Figure 89:
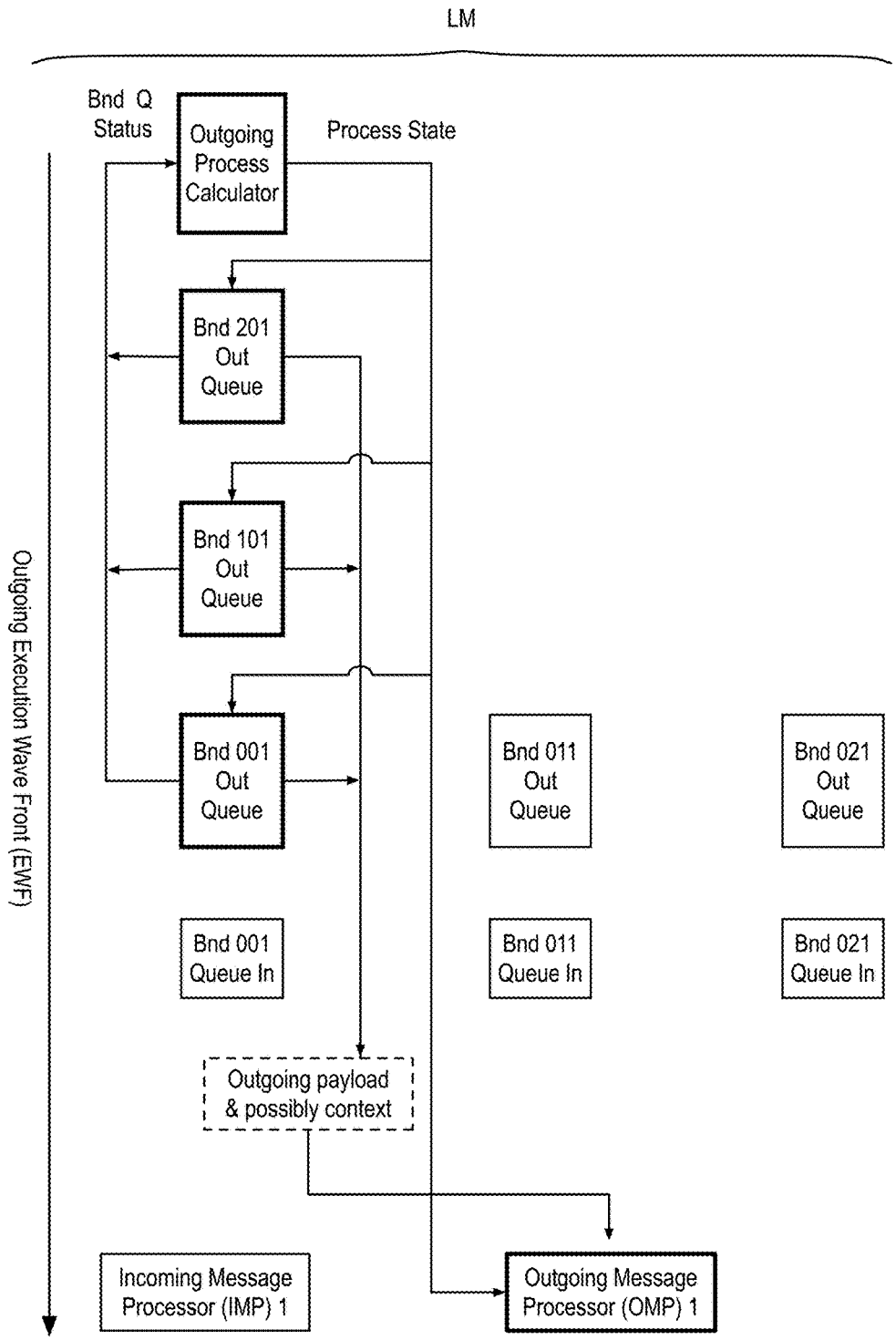

FIG. 89 shows the outgoing execution wave front of FIG. 88 in terms one channel's Outgoing Message Processor (OMP) 1. The outgoing execution wave front starts at the outgoing processor state calculator responding to the queue status of Bnd 001, 101, and 201 queues. The Bnd 001 queue is fed from the first channel of bundle 0's incoming wave as shown in FIG. 87. The Bnd 101 queue is fed from the first channel of bundle 1's incoming wave, which is similar to FIG. 87. The Bnd 201 queue is fed from the first channel of bundle 2's incoming wave, which is similar to FIG. 87. The process state calculator responds to these and other state information to generate the process state which is sent to the Bnd 201, 101 and 001 queues, which respond to the process state by sometimes generating the outgoing data payload and possibly part or all of a context, which are presented to the OMP 1. The OMP 1 responds to receipt of the outgoing data payload and possibly part or all of the context by generating a new context and the ECC for the outgoing data payload and the new context as shown and discussed in previous Figs. The new context may or may not differ from the incoming message's context. While various additional capabilities may be implemented, and are within the scope of this disclosure and claims, this document has focused on the basic operations and discussion.

The invention includes at least one channel including Ndata optical fibers (fibers) and Nedc Error Detection and/or Correction (EDC) fibers, wherein the Ndata is at least 8 and the Nedc is at least one. Nchannels may be at least 16. Ndata may be at least 16. Nedc may be at least two. Nedc may be at least four. At least one channel for control and/or status may include a control channel and a status channel. The apparatus may further include the two channels for control and/or status including a task control and/or status channel and a transfer control and/or status channel. The apparatus may further include the bundle coupled to a first harness coupling, and the bundle coupled to a second harness coupling opposite the first harness coupling, each of the first harness coupling and the second coupling adapted to optically transfer all of the fibers included in the bundle. A printed circuit board (PCB) including at least one of the bundles adapted to present the first harness coupling on one side of the PCB. The PCB includes at least two of the bundles.

The Landing Module (LM) may include a local clock cycle with a local clock period and at least three link interfaces, each adapted to communicate with a link simultaneously sending and/or receiving each of Nchannels of data payloads sufficient to transfer two double precision numbers (referred to hereafter as numbers) per local clock cycle, where the Nchannels is at least 8. Each of the link interfaces includes a link input interface and a link output interface, at least one spare link input interface, at least one spare link output interface and a fault recovery circuit. The fault recovery circuit is adapted to control the link interfaces to respond to at least one output channel fault and/or at least one input channel fault in the link interface by using a spare channel within the link interface and resending a recent history of an output channel associated with the output channel fault, and/or using the spare channel within the link interface to repeat reception of the recent history of an input channel associated with the input channel fault.

Each of the link input interfaces responds to receiving messages as synchronized input messages to the local clock cycle, and further may include an error correction and detection pipeline adapted to receive the synchronized input messages and generate error corrected output messages and an error detection signal, and a message routing pipeline adapted to successively respond to each of the error corrected output messages to generate a routing decision for each of the error corrected output messages. Each of the link input interfaces further includes a link synchronizer adapted to receive the messages and generate the synchronized input messages to the local clock cycle in response to receiving the messages. Each of the link output interfaces may include a message fault generator adapted to respond to at least one of the error detection signal of the link interface for transmission from the link interface by asserting an output channel fault, and an output message prioritizer configured to respond to each of the routing decisions of the error corrected messages of each of the link input interfaces to perform generating an output message for transmission by the link interface, and/or queuing the output message in a link output queue. At least one of the output message prioritizer may be further configured to respond to each of the routing decisions of the error corrected messages of each of the link input interfaces to further perform possibly queuing a second of the output message for later transmission.

A chip may include at least one LM. The DPC may be such a chip. An integrated landing module may be the chip, referred to as the LM chip, or simply as an LM. A module stack may include at least one LM chip. A node stack may include at least one of the LM chips.

FIG. 90 shows an example of a test stand that without undue experimentation may determine the optoelectronic and optical components required to reliably sustain communications between the module stacks at the opto-pin sites and the node sites of the PCB 1, PCB 2 and PCB 3 components of FIG. 5. The test stand may exercise a single channel meeting the requirements of the project delivering the 160 bit data payload (package) and 40 bit EDC in every ns. The EDC component insures that small bit errors may be corrected, and slightly larger errors may be detected, at each landing module and stairway. The exact number of corrected, and detected bit, errors as well as the structure of the EDC component are deliverables of an initial development phase using this test stand. The digital channel input interface and the output interface are organized to bring the optical bandwidth into something compatible with components available as of December 2015. The opto-fiber transmitter may include 20 transmitter units experimentally configured to confirm synchronization and exercise foreseeable variations in clocking between among the transmitters and receivers of this test stand. Opto-Couplings 1 and 2 allow for exercising PCB1 signal paths onto and off of the Landing Modules (LMs) and the Data Memory Nodes (DMN) of PCB1. The opto-fiber channel length L1 exercises variations found on PCB1. L1 ranges from 25 mm to 600 mm. The opto-fiber receiver also has 20 receiver units configured for synchronization and clock variance exercising. The EDC receiver circuitry responds to the received package and the received EDC by generating a corrected package, a correction estimate (how many bits fixed) and a detection estimate (errors detected but could not be corrected). FIG. 91 shows the test stand of FIG. 90 extended to exercise a single channel meeting the requirement of delivering the 160 bit package and 40 bits EDC in every ns. Opto-Couplings 1 through 4 allow for exercising the PCB2 signal paths onto and off of the Landing Modules and the across maximum distances within the system. Channel length L1 exercises variations found on PCB1 and/or PCB2: L1 ranges from 25 mm to 600 mm. Channel length L2 exercises variations from one cabinet to another to across the system: L2 varies from 1 meter to 40 and possibly up to 100 meters. One skilled in the art will recognize that follow-up extensions to these test stands may go from opto-channel testing to opto-bundle testing that may increase the fibers in test from 20 to 400, but the same schema basically apply. FIG. 92 shows four implementations of the opto-fiber Channel that may be tested. These four implementations place the EDC bits in differing geometric relationships with the data fibers.

FIGS. 93 to 99 show examples of the structure and system considerations for the opto-Printed Circuit Boards (PCBs), the module stacks, opto-pin sites, the node sites and the node stacks, including the Data Memory Node (DMN), Memory Node (MN) and QUAD Link Anticipator Modules (Quad-Lam). FIG. 100 to FIG. 104 show some details of the PCB 1, PCB 2 and PCB 3 of FIG. 5, including the Ai,j, Bi,j, Ci,j QuadLam linkages available from each row i,j of the cabinets of FIG. 4.

Figure 93:
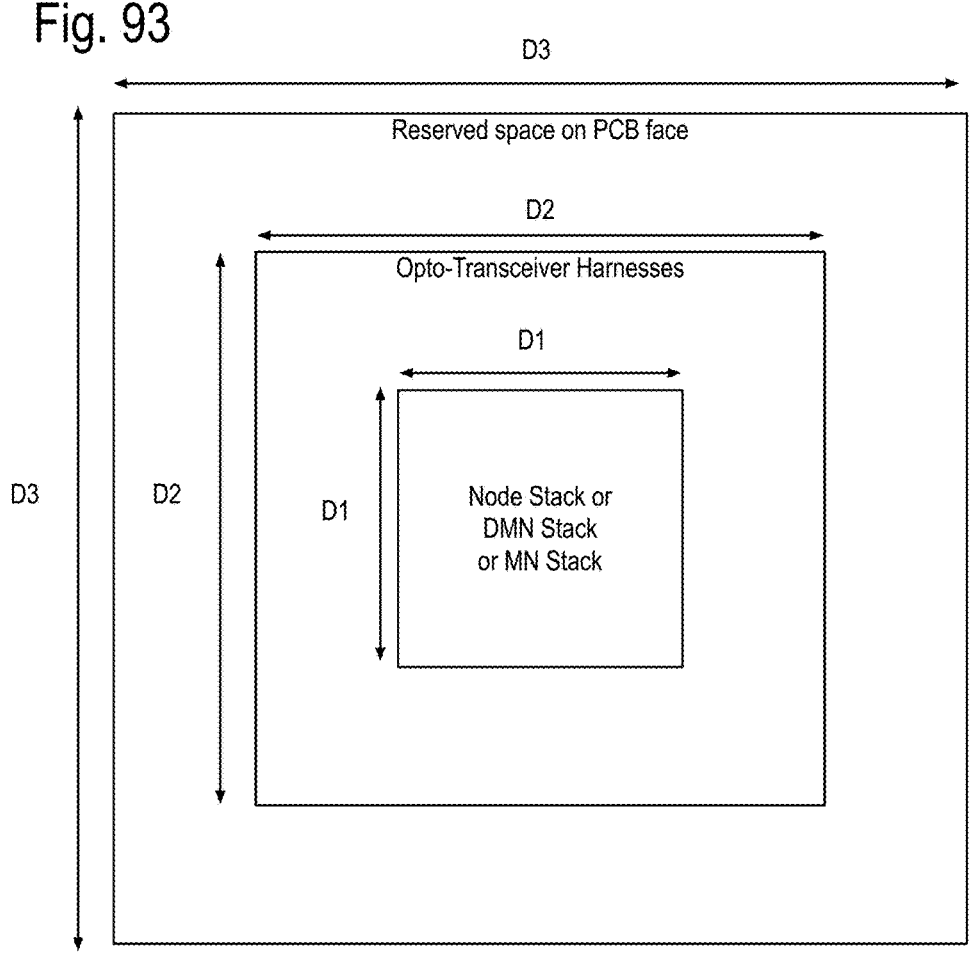
FIGS. 93 to 99 show examples of the structure and system considerations for the opto-Printed Circuit Boards (PCBs), the module stacks, opto-pin sites, the node sites and the node stacks, including the Data Memory Node (DMN, Memory Node (MN) and QUAD Link Anticipator Modules (Quad-Lam).

FIG. 93 shows an example of a PCB1 and/or PCB2 opto-transceiver harness floorplan region of about D3 on a side which may be confirmed with the above test stands and other industrial engineering activities including integrated circuit floor planning and packaging analyses: The landing module chip is roughly D1 on a side. As a first estimate, the DPC and AC are assumed to be about the same footprint. Each of the opto-transceiver harnesses has an active region of D2 on a side centered about the LM chip. For first order approximations, hypothesize that D1 is about 5 cm, D2 is about 10 cm and D3 is about 15 cm. Each opto-transceiver harness may couple to no more than four bundles. Each opto-bundle includes a minimum of 19 channels using 16 data fibers & 4 EDC fibers for each channel. Each opto-bundle may have 20 channels of 20 fibers. This will also be used in testing the harnesses couplings, transceivers and the physical transport. Consequences: Each opto-coupling in each transceiver harness may be assigned a coordinate in a 40 by 40 grid across a D2 square, implying a minimum distance between opto-couplings of about 2.5 mm.

Figure 94:
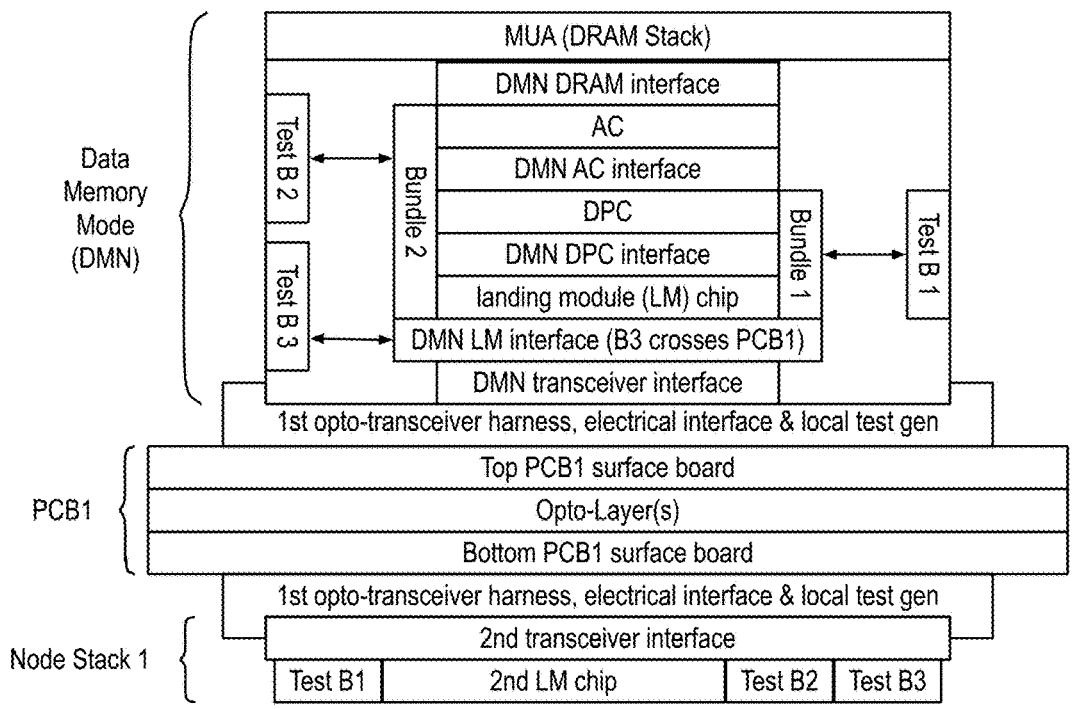
Figure 95:
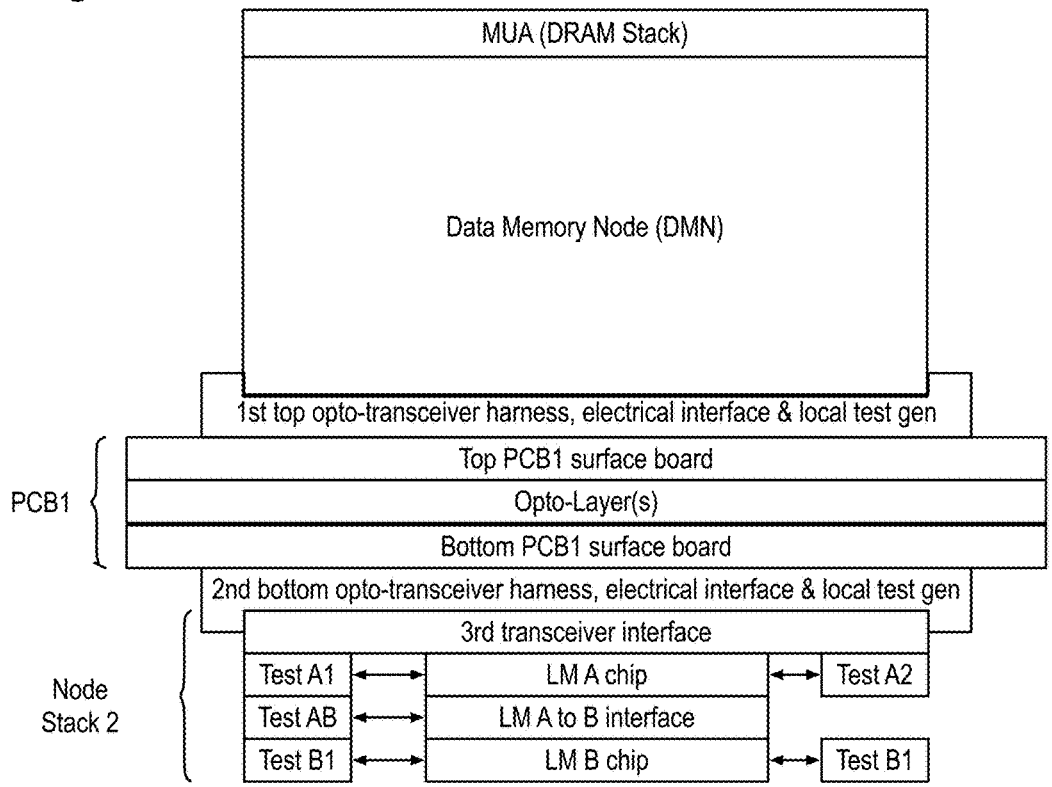

FIG. 94 shows a cross section of the DMN Stack, the PCB1 and the Node Stack 1. By way of example, the local test indicators on the top side may include, but are not limited to, a harness Power (Good/not) indicator, a stack connected indicator, a transceiver power indicator, a LM power indicator, a DPC power indicator, a AC power indicator, a DRAM (MUA) power indicator. Testing the state of the LM chip may include test indicators B1, B2 and B3 to test local bundles at the LM chip. The Local test indicators on bottom side may include, but are not limited to, a second harness Power indicator, a second Stack connected indicator, a second opto-transceiver power indicator, and a second LM power indicator. Testing the local bundles of the second LM chip may use the test B1, B2 and B3 indicators. FIG. 95 shows a modified version of FIG. 94 with a Node Stack 2 representative of the circuitry needed for the two LM's by the Node Stacks of DMN 2,2 and DMN 2,3 in FIG. 100. The testing of Node Stack 2 may need tests for more bundles than in FIG. 94.

Figure 96:
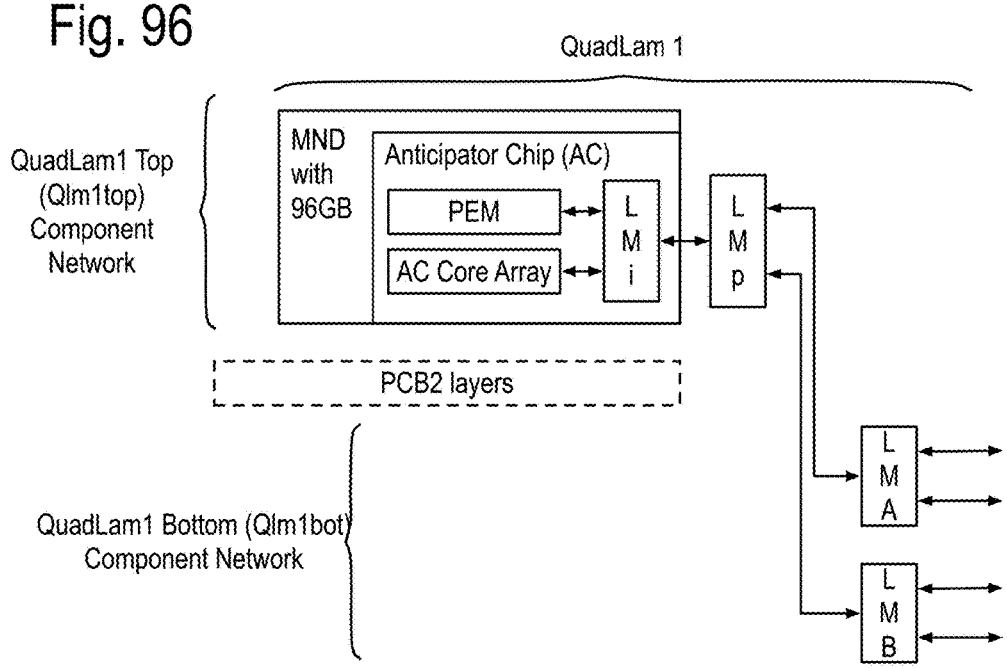
Figure 97:
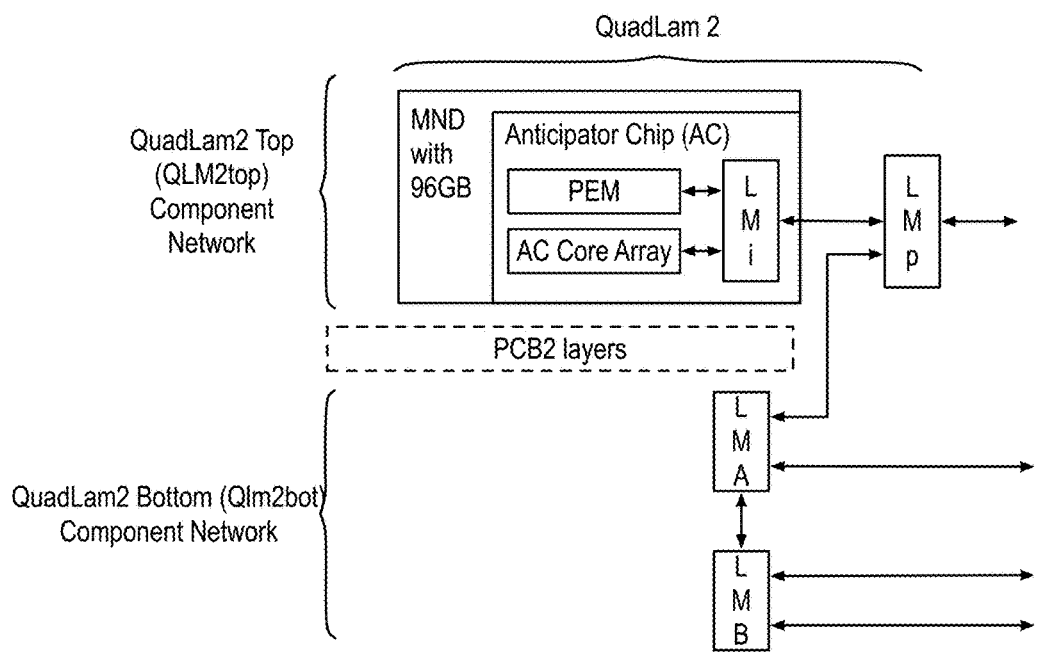
Figure 98:
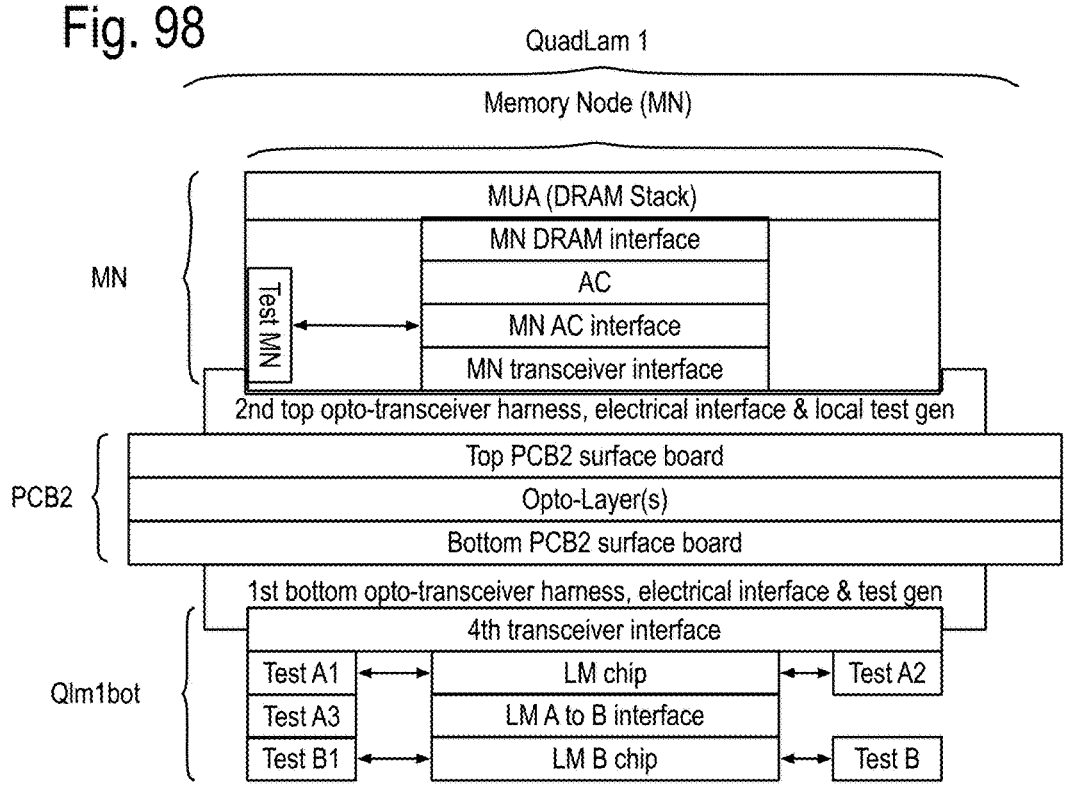
Figure 99:
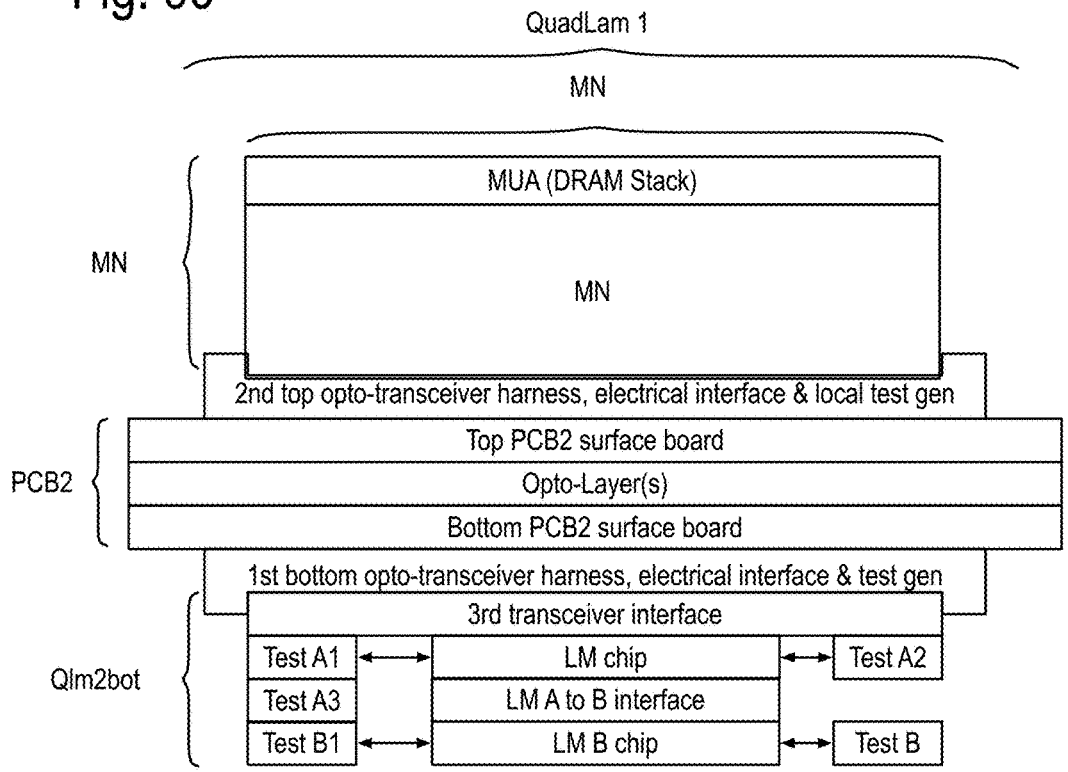

FIG. 96 and FIG. 97 show two simplified cross sections of two potential implementations of the QUAD Link Anticipator Memory (QUADLAM) circuitry. FIGS. 98 and 99 show two representative cross-sections of the respective implementations of the QUADLAM of FIG. 96 and FIG. 97.

Figure 100:
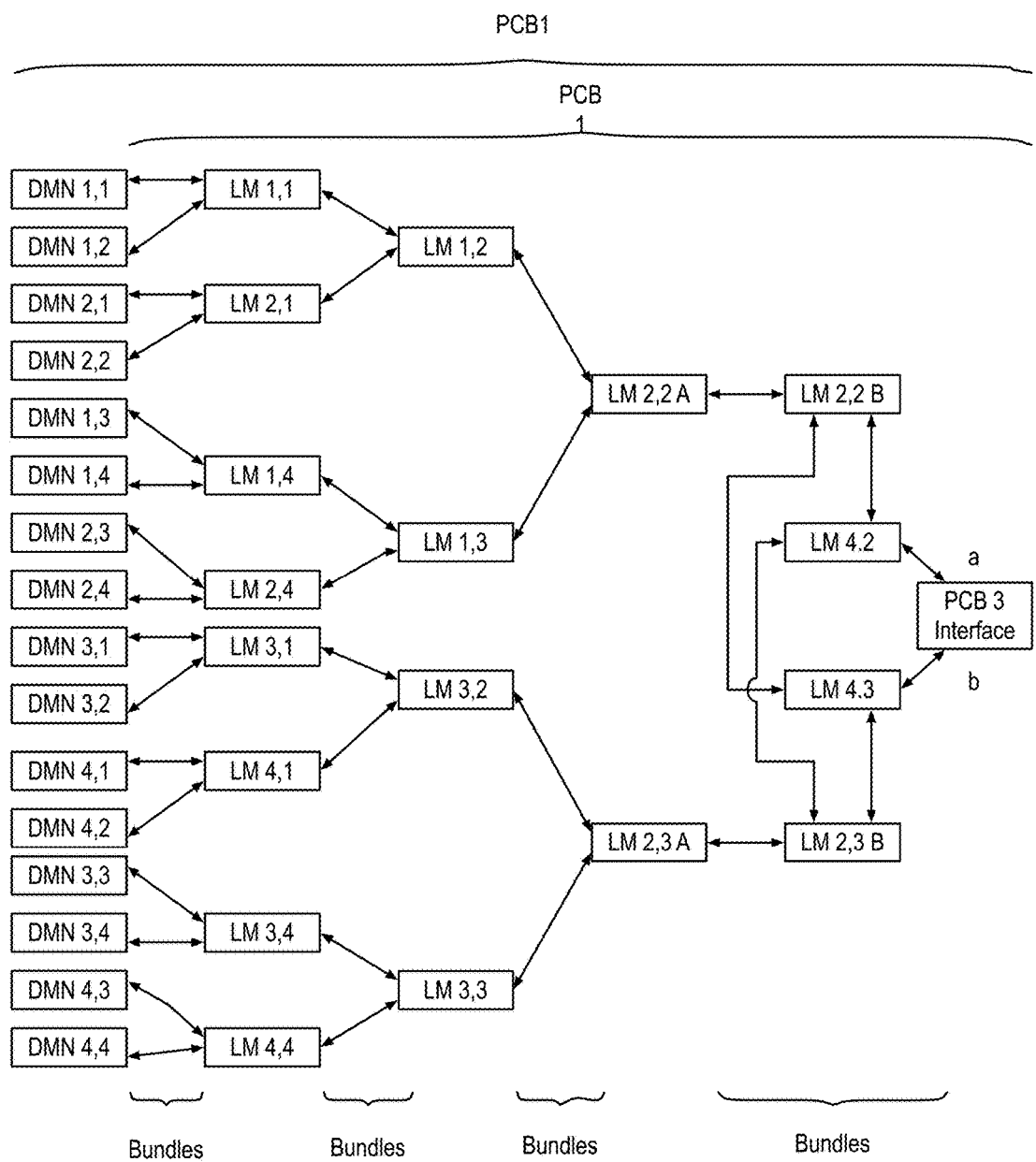
FIGS. 100 to 104 show some details of the PCB 1, PCB 2 and PCB 3 of FIG. 5, including the Ai,j, Bi,j, Ci,j QuadLam linkages available from each row i,j of the cabinets of FIG. 4.
Figure 101:
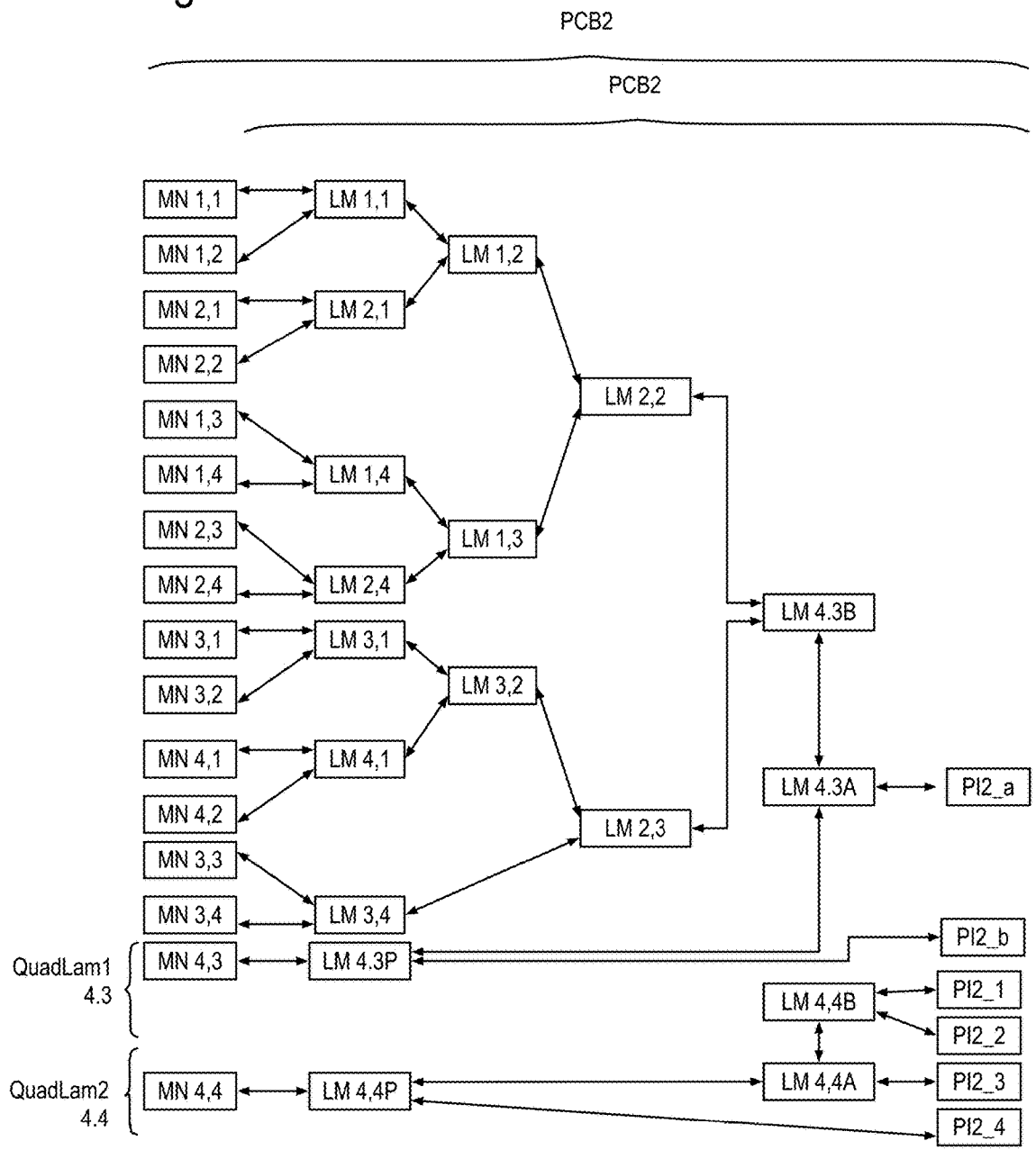
Figure 102:
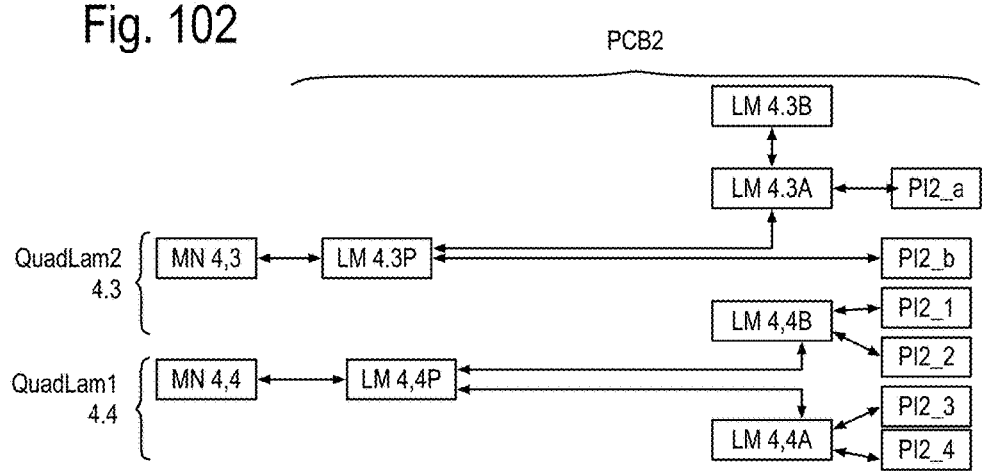
Figure 103:
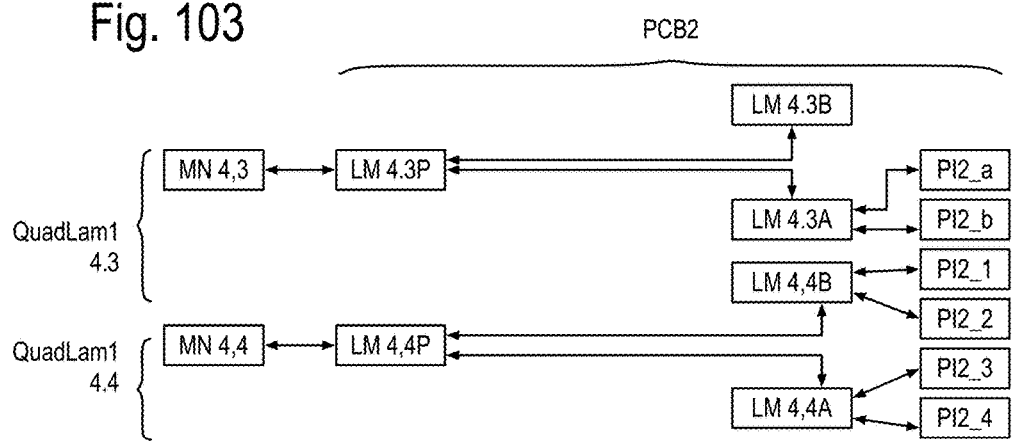
Figure 104:
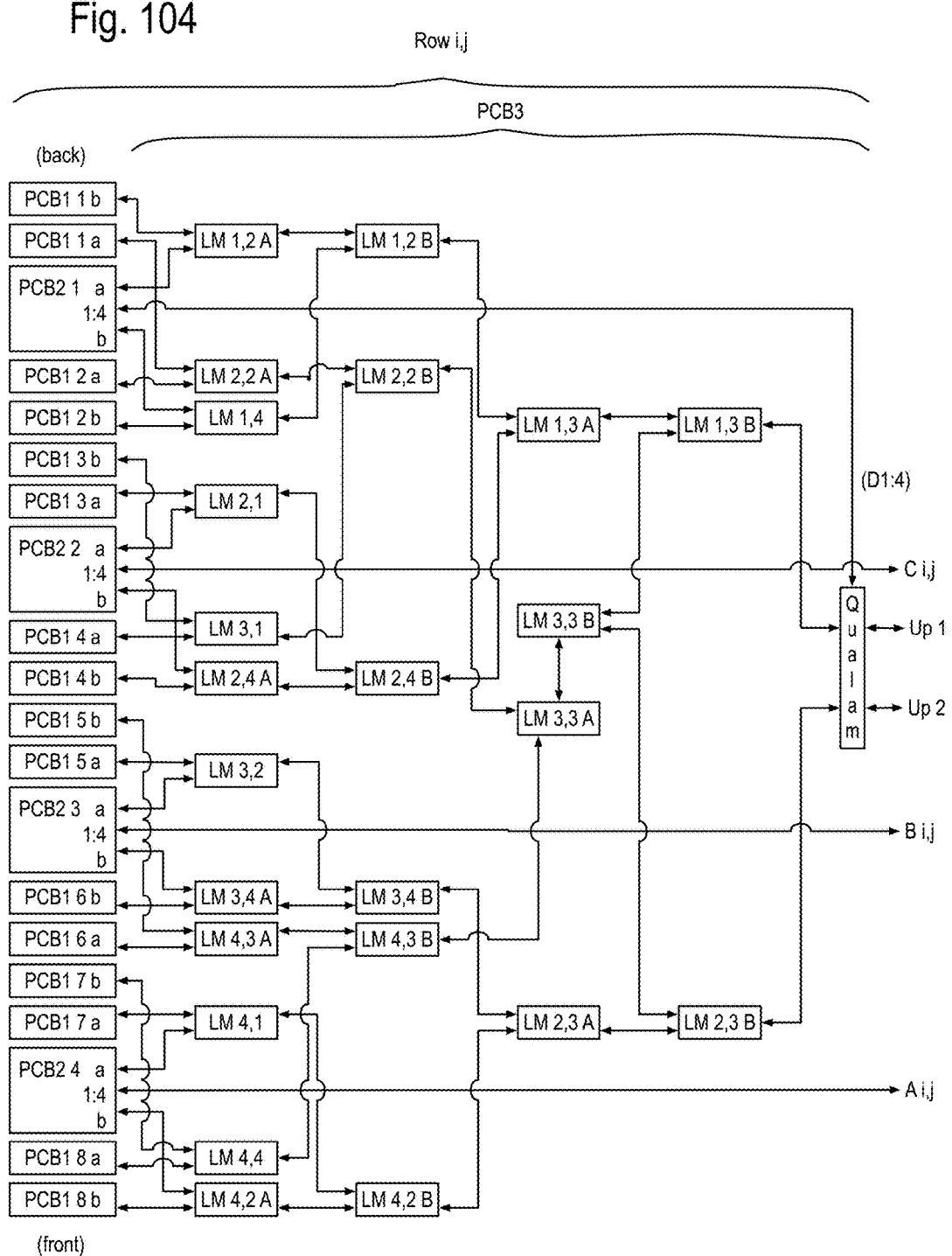

FIG. 100 to FIG. 104 show some details of the PCB 1, PCB 2 and PCB 3 of FIG. 5, including the Ai,j, Bi,j, Ci,j QuadLam linkages available from each row i,j of the cabinets of FIG. 4. FIG. 100 shows the two perspectives on PCB 1, first perspective concentrates on the communication network of landing modules coupling the DMN 1:4,1:4 on the left side, to two bundle portals interfacing to bundles on a PCB 3 shown on the right hand side. The second perspective includes the first perspective and adds the effects of the DMN 1:4,1:4 module stacks coupled to the PCB 1. FIG. 101 shows the same two perspective on PCB 2 first described for PCB 1 in FIG. 100. By way of example, it may be said that at least two module sites and their corresponding node sites may implement some version the QuadLam. FIG. 102 and FIG. 103 show examples of some alternatives that may be included in the PCB 2 of FIG. 101. FIG. 104 shows an example of the row of FIG. 5, showing some of the details of the communications network(s) within at least some of the rows of at least some of the cabinets in the system that present the QuadLam linkages Ai,j, Bi,j and Ci,j for use within some or all of the cabinets of FIG. 1.

Figure 105:
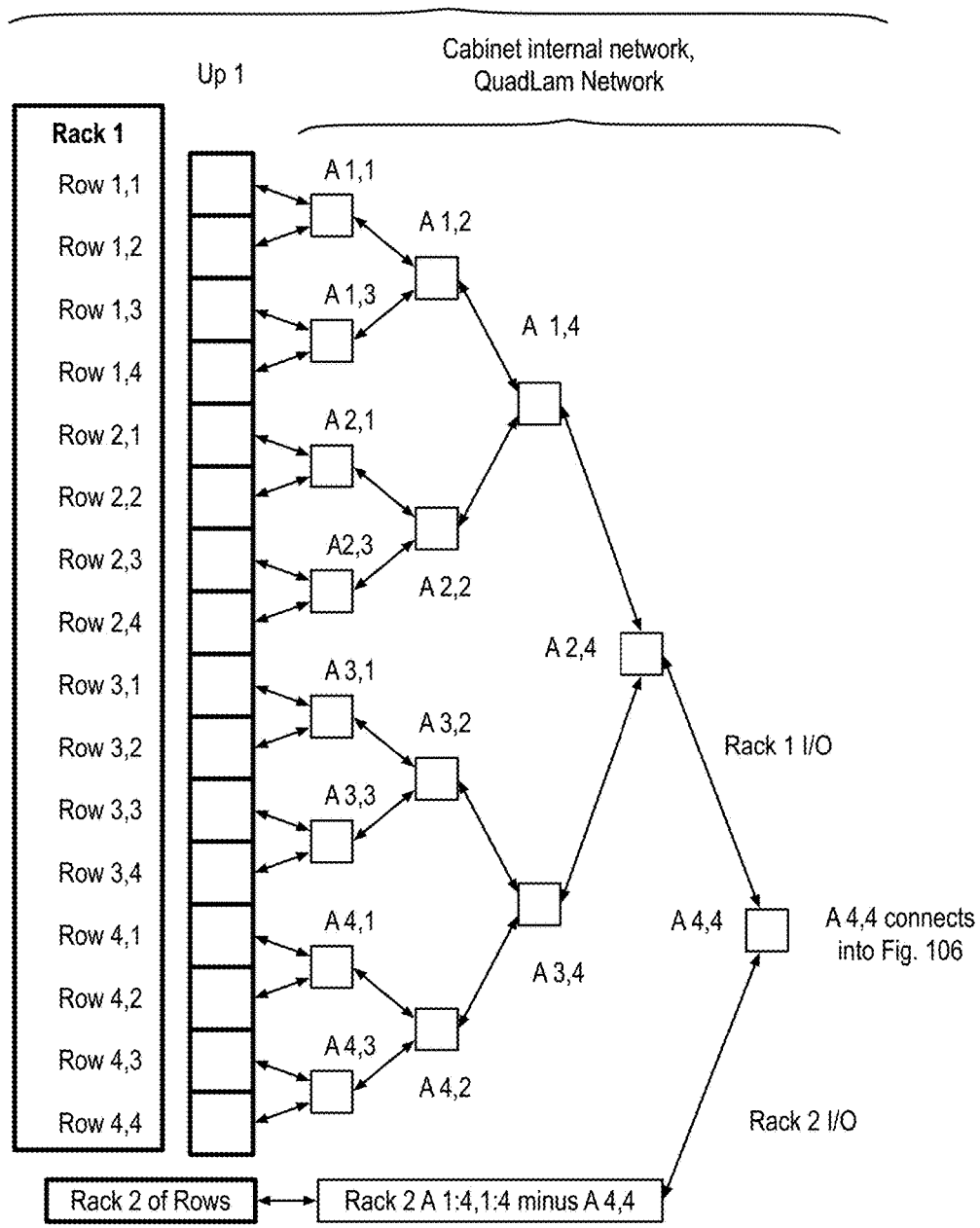
FIG. 105 to FIG. 111 show examples of using the Quad-Lam linkages Ai,j, Bi,j, and Ci,j to create binary graph networks traversing the cabinet array of FIG. 2D by using three of the four links of the QuadLams.
Figure 106:
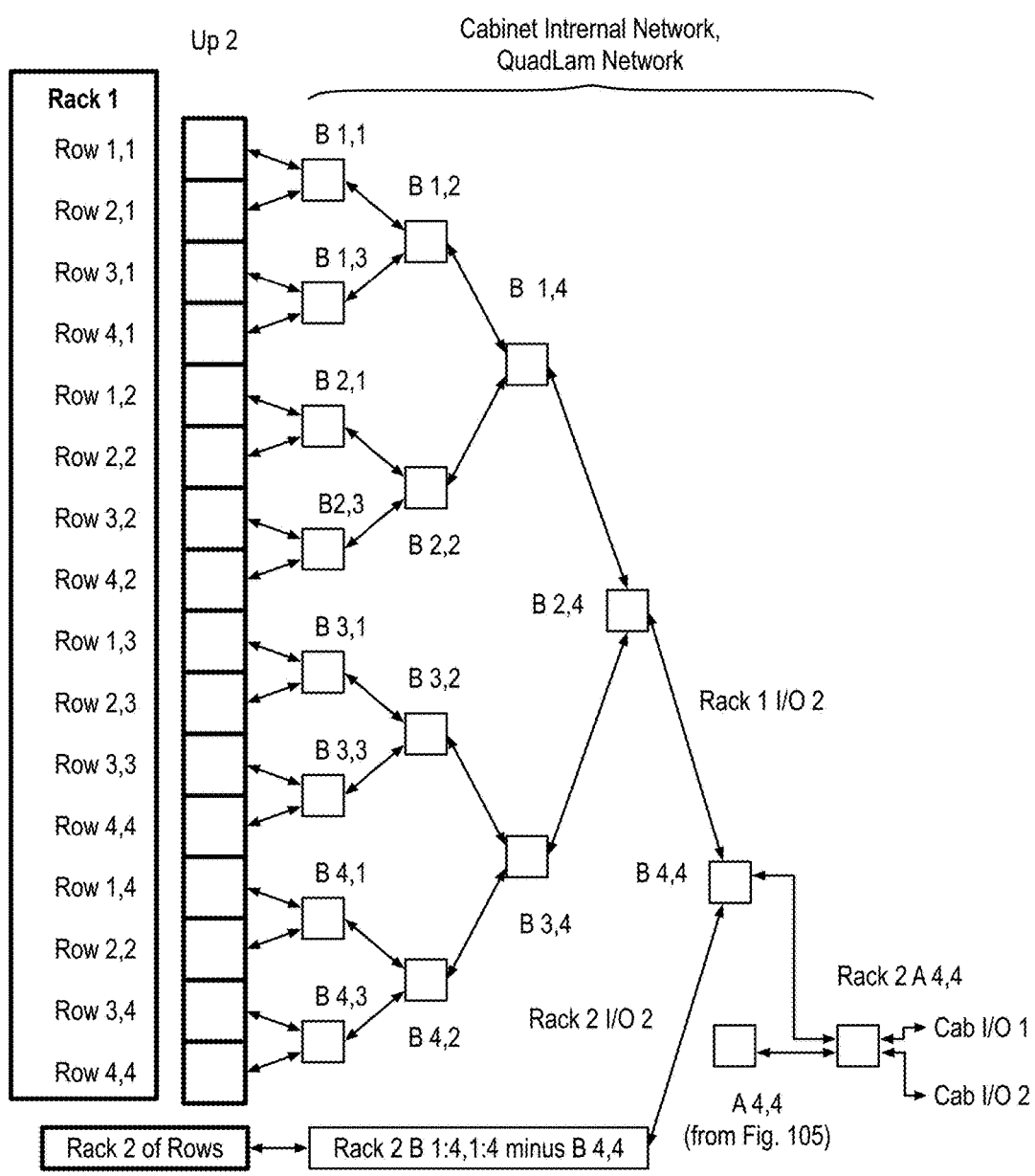
Figure 107:
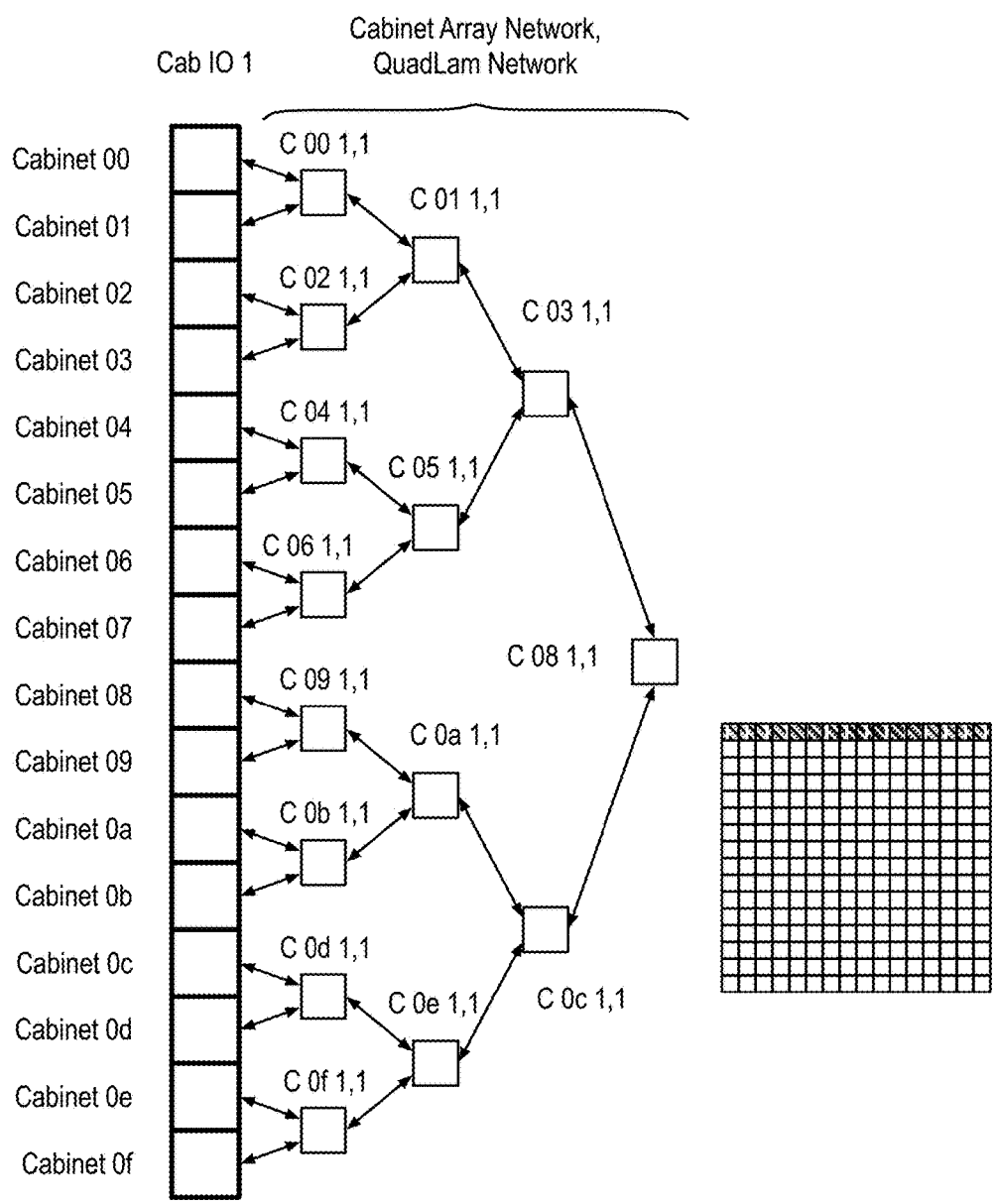
Figure 108:
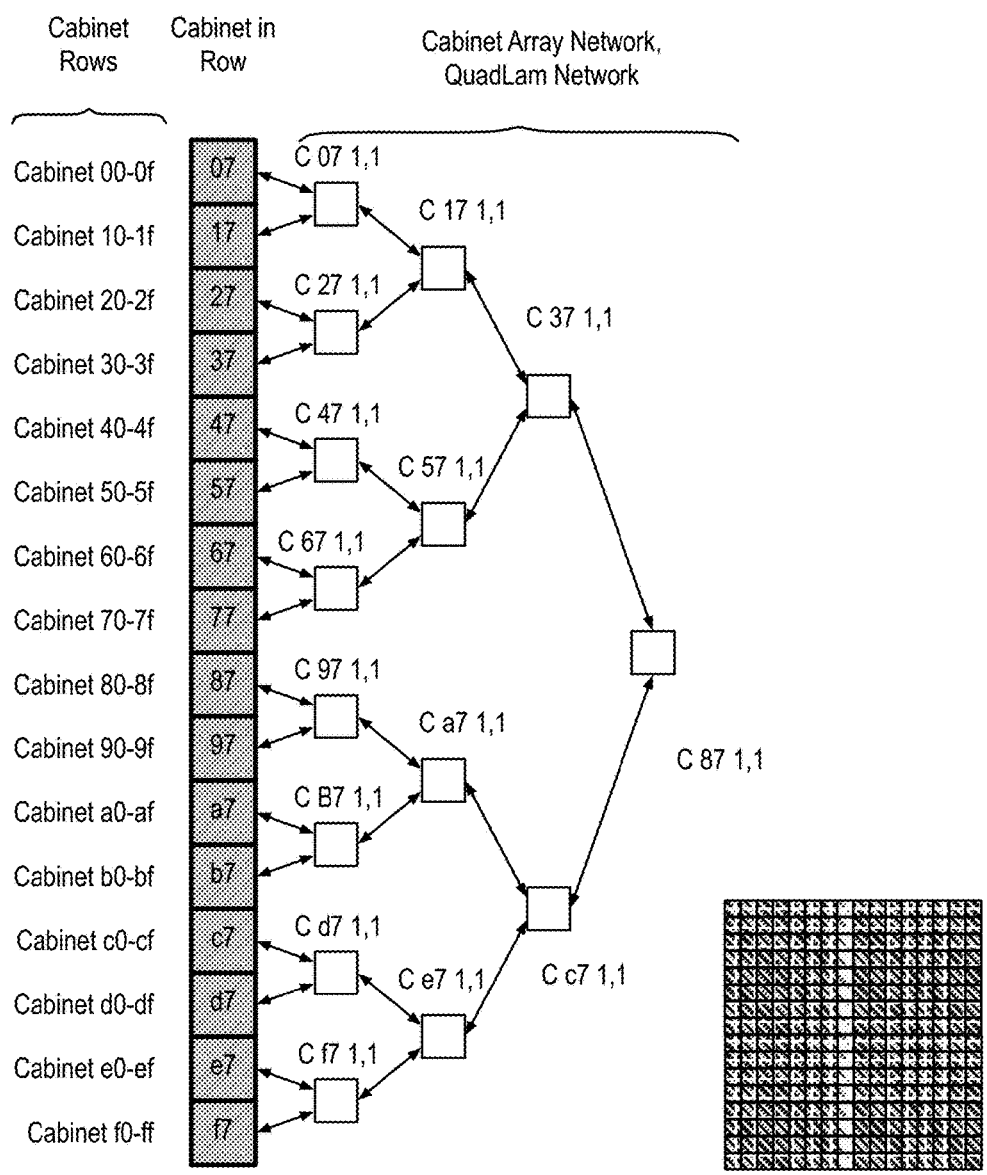
Figure 109:
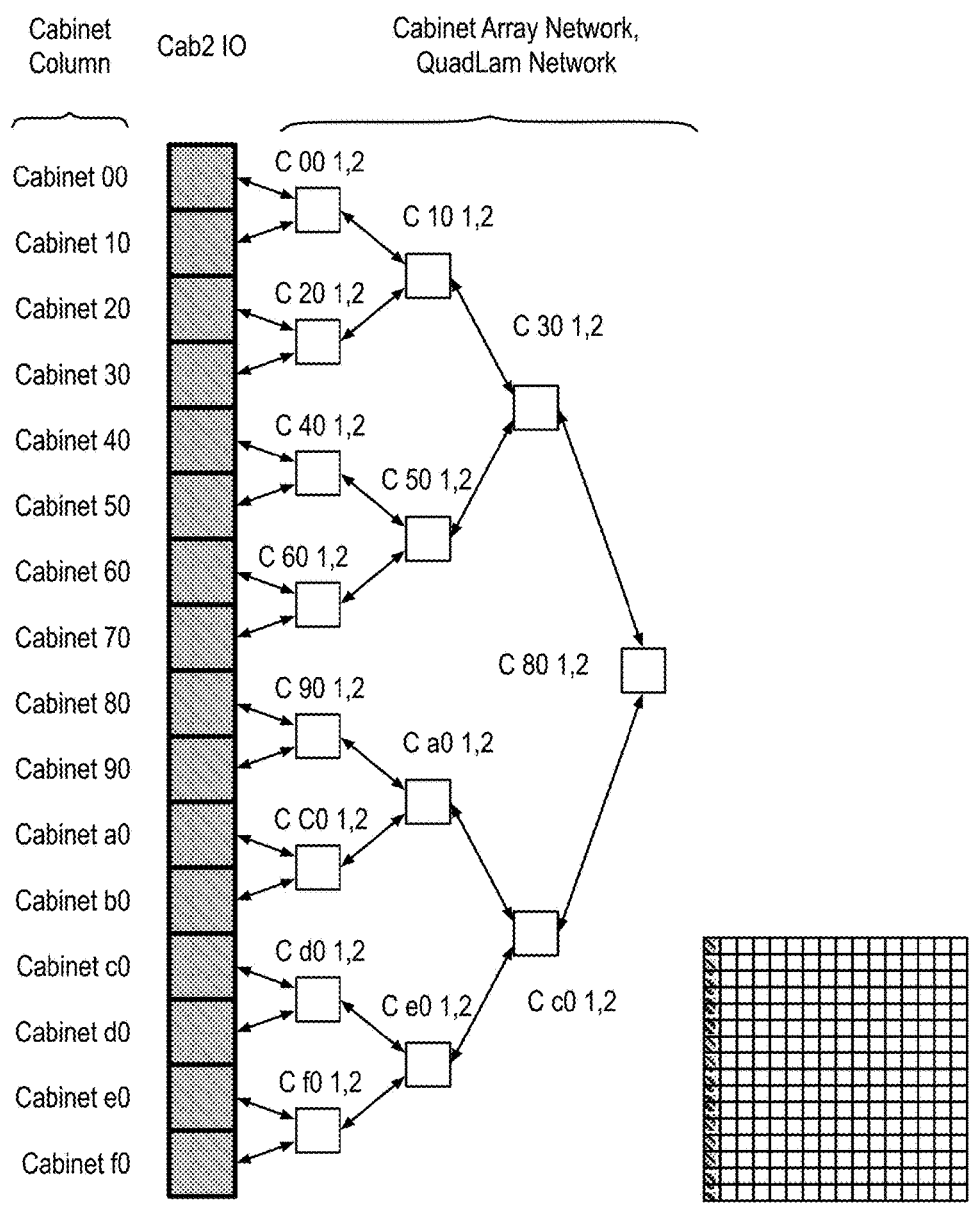
Figure 110:
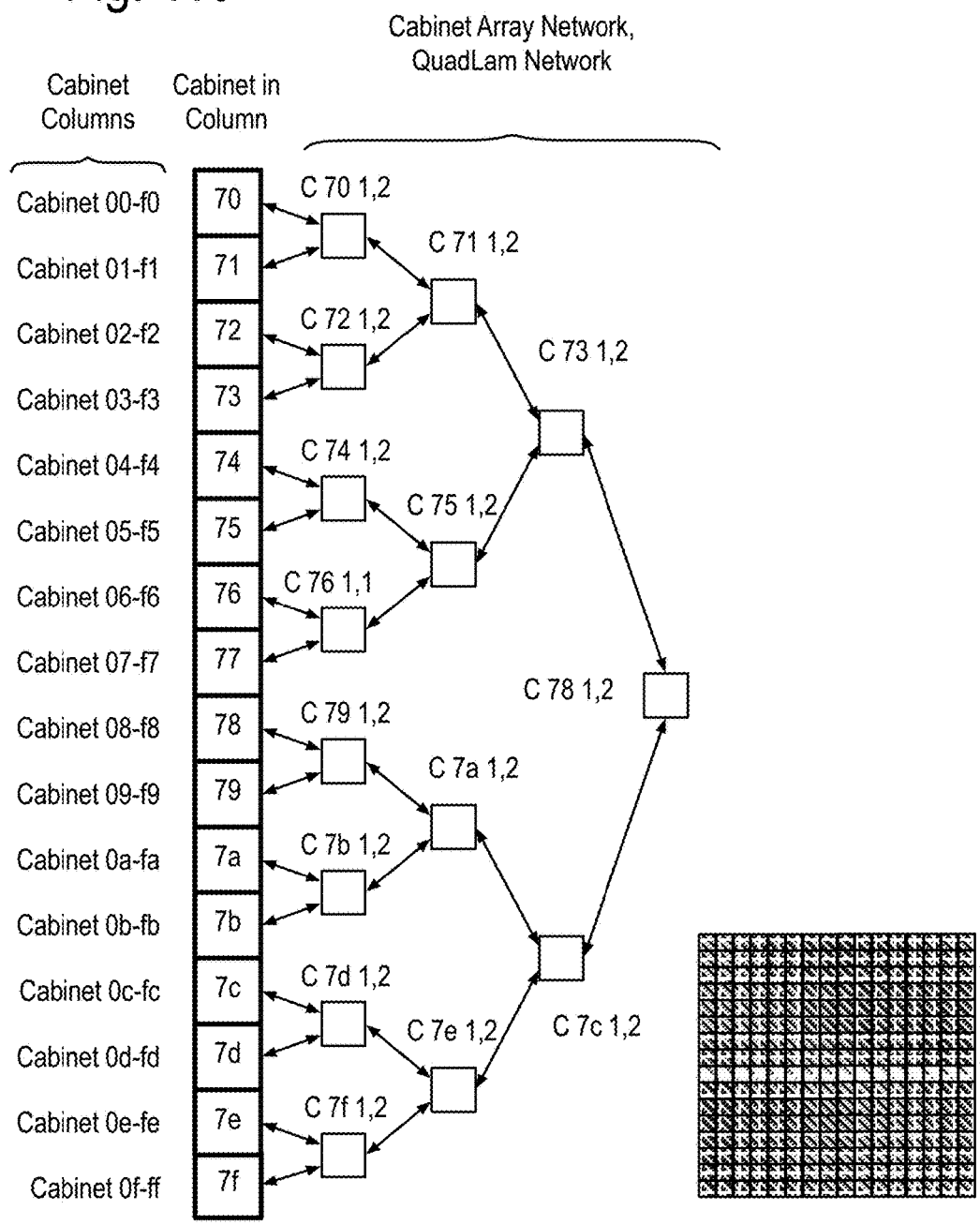
Figure 111:
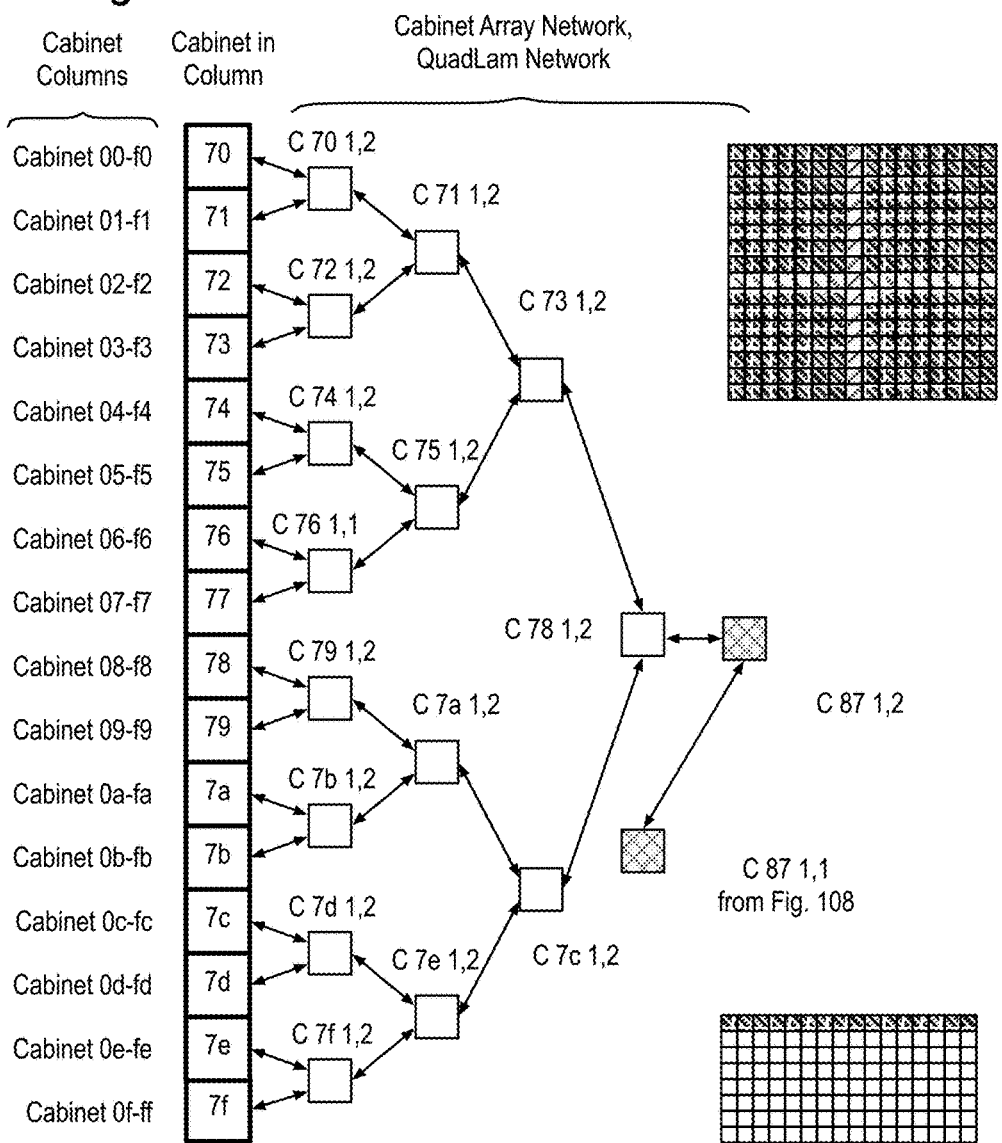

FIG. 105 to FIG. 111 show examples of using the QuadLam linkages Ai,j, Bi,j, and Ci,j to create binary graph networks traversing the cabinet array of FIG. 1 by using three of the four links of the QuadLams. FIG. 105 and FIG. 106 show some details of using the QuadLam linkages Ai,j and Bi,j creating a cabinet internal network as a binary graph network within a rack, and/or between two racks, traversing the cabinet of FIG. 1 by using three of the four links of the QuadLams. Note that all four links of Rack 2 A 4,4 are being used, whereas all the other Ai,j and Bi,j quadlams use only 3 of the four links. FIG. 107 to FIG. 111 show some details of using the QuadLam linkages Ci,j to create a cabinet array network as a binary graph network traversing the system of FIG. 1.

Figure 112:
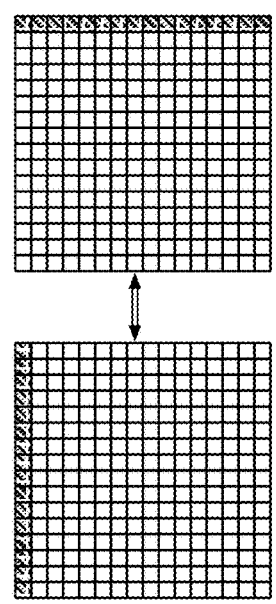
FIG. 112 shows coupling one link from each cabinet in a row to one cabinet each in a column of FIG. 2 to extend the binary graph of FIG. 105 to FIG. 111.
Figure 113:
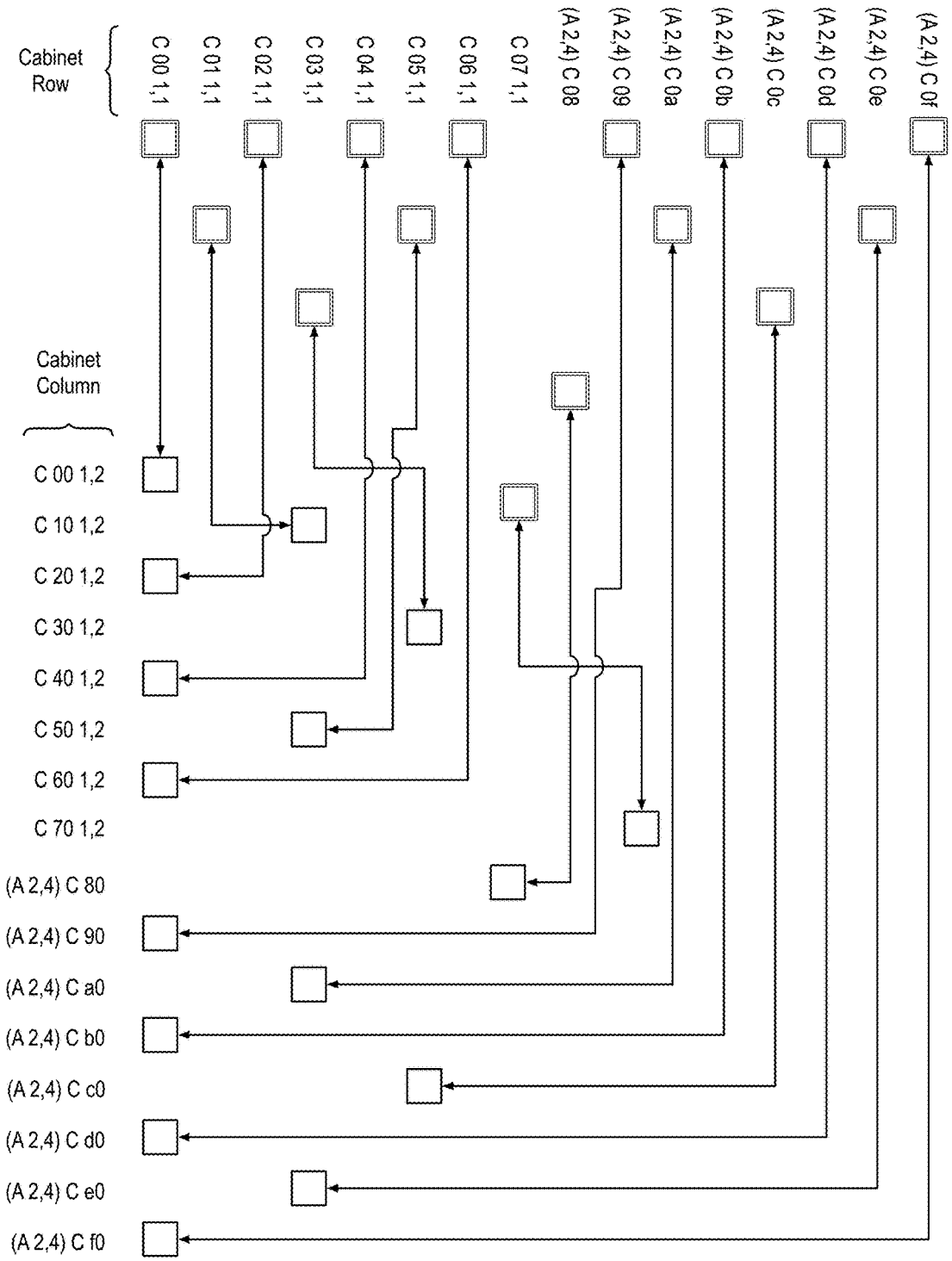
FIG. 113 shows an example of such a coupling in accord with FIG. 112 using the four links of some of the QuadLams.
Figure 114:
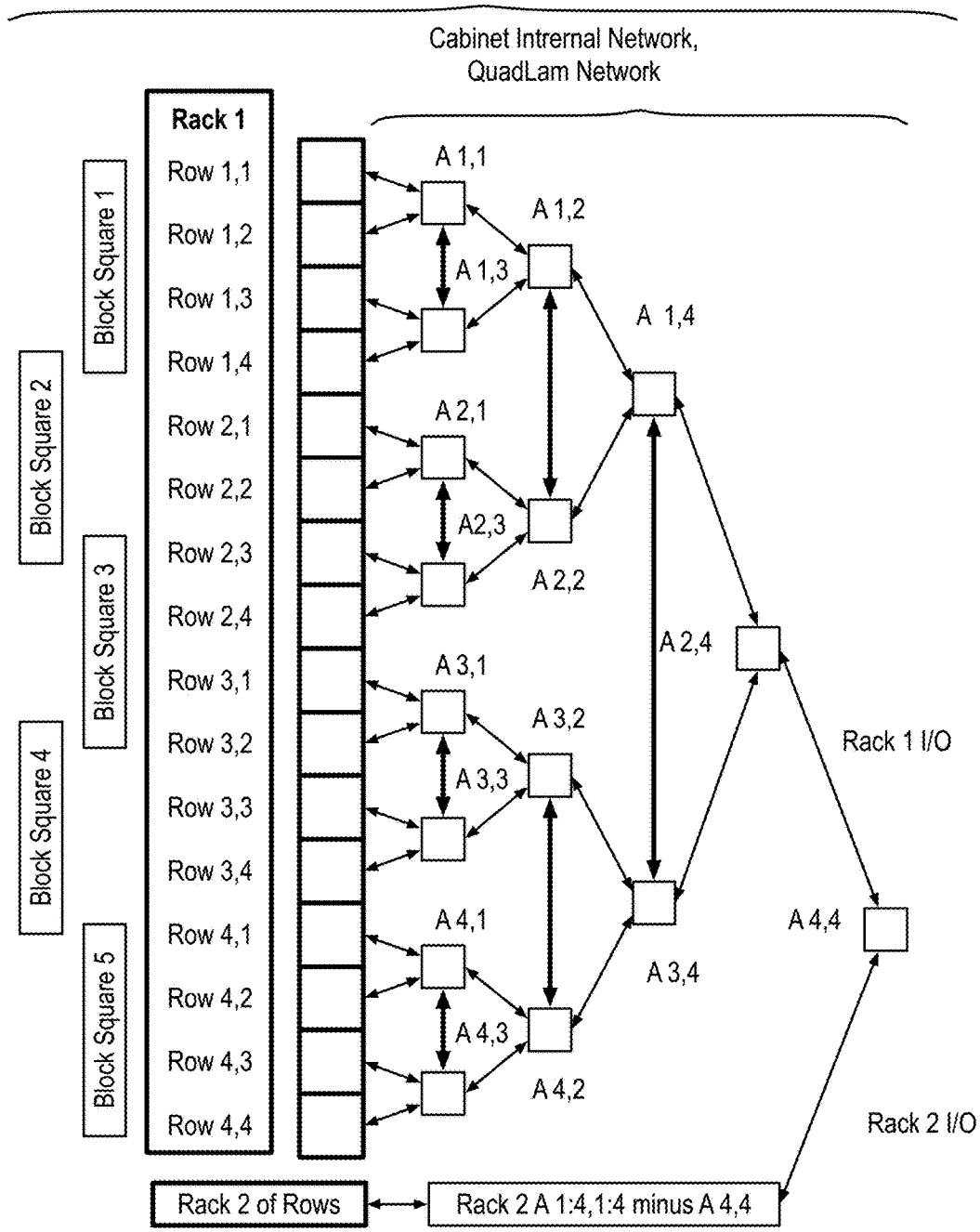
FIG. 114 shows an example of augmenting the binary graph network of FIG. 105 within the cabinet by using some of the four links of the Ai,j Quad-Lams.

FIG. 112 shows coupling one link from each cabinet in a row to one cabinet each in a column of FIG. 2 to extend the binary graph of the cabinet array network of FIG. 105 to FIG. 111. FIG. 113 shows an example of such a coupling in accord with FIG. 112 using the fourth links of some of the QuadLams Ci,j or A2,4 within each of the cabinets. FIG. 114 shows an example of augmenting the binary graph network of FIG. 105 within the cabinet by using some of the fourth links of the Ai,j QuadLams. The new couplings can provide a reduction in traversal time between the cabinets, and also allow specific rows within cabinets to be target nodes for transfers between software defined entities, such as block squares. A software defined computing entity can implement a computing floor window for an algorithm or program system such as Block LU Decomposition. These software defined entities may be configured through such coupling to improve network performance and/or localized storage of data for the specific algorithms and/or program systems being implemented.

When parallel processing became something other than a computer research activity, there was a common memory model and of a main memory and possibly localized, smaller memories. A location for memory contents usually meant where did it live in the big system. That perspective has several problems today. First, assume that a big memory is a unit of 64Gbytes or more, but the system memory capacity is roughly a millions that size. There is no single main memory, because it's access would be forever bottlenecked. Instead, consider the term intermediate memory. Intermediate memory is always part way to whatever is most local and to whatever else can be reached by the communication networks of the cabinet and system as a whole. Intermediate memory frequently needs to perform two very important operations: First, sequester data to be later used in subsequent transfers. Second, perform intermediate calculations to locally determine which of several paths will be later needed in transfer operations.

The apparatus addressing these needs includes a QUAd Link Anticipating Memory node (QUADLAM), comprising: a first External Link Coupling (ELC), a second ELC, a third ELC, and a fourth ELC, as members of an external link group, each adapted for optical transmission; a first, second and third Landing Module (LM); the first ELC and the second ELC communicatively interfaced to the first LM; the third ELC and the fourth ELC communicatively interfaced to the second LM; both a third Link coupling of the first LM and a fourth link coupling of the second LM communicatively interfaced to the third LM as link couplings; an anticipator including an anticipator link coupling, communicative interfaced to the third LM; and a Memory unit array (MUA) communicatively coupled to the anticipator and adapted for memory access by the anticipator. The memory unit array includes at least one Dynamic Ram accessible by the anticipator.

The anticipator may be adapted to respond to a system performance requirement by a system for an algorithm, with the system including the QuadLam, and the anticipator may be configured to receive an incremental state of the algorithm from at least one member of the external link group. The anticipator may be configured to respond to the incremental state by creating an anticipated requirement. And the anticipator is configured to respond to the anticipated requirement by directing the system to achieve the system performance requirement. The anticipator may be further configured to respond to the anticipated requirement by at least one of the anticipator configuring the first landing module; the anticipator configuring the second landing module; the anticipator configuring the third landing module; and the anticipator configuring the memory access to the MUA.

At least one of the first, second and third LM includes the following: A local clock cycle with a local clock period. At least three link interfaces, each adapted to communicate with a link simultaneously sending and/or receiving each of Nchannels of data payloads sufficient to transfer two double precision numbers (referred to hereafter as numbers) per local clock cycle, where the Nchannels is at least 8.

Each of the link interfaces includes a link input interface and a link output interface, at least one spare link input interface, at least one spare link output interface and a fault recovery circuit. The fault recovery circuit is adapted to control the link interfaces to respond to at least one output channel fault and/or at least one input channel fault in the link interface by using a spare channel within the link interface and resending a recent history of an output channel associated with the output channel fault, and/or using the spare channel within the link interface to repeat reception of the recent history of an input channel associated with the input channel fault.

The apparatus of the invention includes, but is not limited to, a system including multiple system components and a communication network communicatively coupling the multiple system components. Each of the system components is coupled by a QUADLAM to create at least part of the communication network. The communication network includes a binary tree formed by the QUADLAM to the system components using three members of the external link group of the QUADLAM. And the QUADLAM is distinct for distinct pairs of the system components.

The system may be configured to achieve a second system performance by a second algorithm by configuring the coupling of at least two of the QUADLAMs fourth, unused member of the external link group to each other. The communication network includes the coupling of the at least two of the QUADLAMs fourth, unused member of the external link group to each other.

The system may be further configured to a third system performance by a third algorithm by a bidirectional switch adapted to select another coupling of at least two of the QUADLAMs fourth, unused member of the external link group to each other. The system may include the bidirectional switch.

At least one of the system components is included in at least one of a printed circuit board (PCB), a row of the PCB, a shelf of at least one of the row, a rack of at least one of the shelves, a cabinet of at least one of the racks.

As used herein, the following design rules are used to specify a system may achieve exascale performance. These design rules are referred to as the Exascale Design Rules. Multiplications must not stall and everything else must keep up. Every hardware element must be simple and regular with as few exceptions and special cases as possible. Exascale architectures must enable the programmer to succeed at every level of integration. There may be no hidden programmed states. The architecture must be organized to make debugging the program, at every level, only about the inputs, instructions, and outputs of each instructed resource. The program, therefore the programmer, must be in control, not only of the data processes, but also communication network structures, memory access and task management, at every level of integration. Feedback must be separate hardware from the arithmetic units, and must be configured and controlled by the programmer. Fault detection must be in every exascale program's task management. Fault recovery must also be part of every exascale program's task management. The Exascale Algorithm State Machine (EASM) must partition into many local state machines simultaneously responding to task commands, the local process state, and the local availability of data. Instruction processing must be in terms of the process state of the local state machine, which is part of the EASM. System state snapshots must minimize system overhead and support run-time rollback within each data processor chip. Given a tradeoff between a small increase in complexity in a component and the opportunity for resilience to flaws in that component, resilience wins, particularly if there was no resilience before. While these design rules are necessary for exascale, when implemented, they greatly reduce the size and increase the efficiency of petascale computers.

The invention claimed is:

1. A third apparatus, comprising: a Landing Module (LM) including
   A) a local clock cycle with a local clock period of at most 2 nanoseconds (ns);
   B) at least three link interfaces, each adapted to communicate with a distinct link bundle simultaneously sending and/or receiving each of Nchannels of data payloads sufficient to transfer at least 64 bits per local clock cycle of said Nchannels of data channels, where said Nchannels is at least 8;
   C) each of said link interfaces includes a link input interface and a link output interface, at least one spare link input interface, at least one spare link output interface and a fault recovery circuit;
   D) said fault recovery circuit is adapted to control said link output interfaces to respond to at least one output channel fault by using a spare channel within said link interface and resending a recent history of an output channel associated with said output channel fault; and
   E) said fault recovery circuit is adapted to control said link input interfaces to respond to at least one input channel fault by using said spare channel within said link interface to repeat reception of said recent history of an input channel associated with said input channel fault.

2. The third apparatus of claim 1, further comprising each of said link input interfaces of said link bundle responds to receiving messages as synchronized input messages to said local clock cycle, and further includes
   a) an error correction and detection pipeline adapted to receive said synchronized input messages and generate error corrected output messages and an error detection signal;
   b) a message routing pipeline adapted to successively respond to each of said error corrected output messages to generate a routing decision for each of said error corrected output messages.

3. The third apparatus of claim 2, further comprising each of said link input interfaces further includes a link synchronizer adapted to receive said messages and generate said synchronized input messages to said local clock cycle in response to receiving said messages.

4. The third apparatus of claim 2, further comprising each of said link output interfaces of said link bundle includes
   a) a message fault generator adapted to respond to at least one of said error detection signal of said link interface for transmission from said link interface by asserting an output channel fault; and
   b) an output message prioritizer configured to respond to each of said routing decisions of said error corrected messages of each of said link input interfaces to perform
      1) generating an output message for transmission by said link interface, and/or
      2) queuing said output message in a link output queue for resend if reception of said output message fails at its incoming message processor.

5. The third apparatus of claim 4, further comprising at least one of said output message prioritizer is further configured to respond to each of said routing decisions of said error corrected messages of each of said link input interfaces to further perform queuing a second of said output message for later transmission if reception of said second of said output message fails at its said incoming message processor.

6. The third apparatus claim 4, further comprising a chip including at least one of said LM.

7. The third apparatus of claim 6, further comprising a module stack and/or a node stack including at least one of said chip.

8. The third apparatus of claim 1, wherein at least one of said link bundles includes at least one optical fiber to physically transport said data payload.

9. The third apparatus of claim 8, wherein said optical fiber is adapted to transport said data payload with a bandwidth of Nbits per second; wherein said Nbits is at least 10 billion bits.

10. The third apparatus of claim 9, wherein said NBits is at least 100 billion bits.

11. The third apparatus of claim 8, wherein at least one of said link interfaces includes a transceiver adapted to transport said data payload onto and/or off of said optical fiber.

12. The third apparatus of claim 8, wherein each of said link bundles includes at least one of said optical fiber to physically transport one of said data payload.

13. The third apparatus of claim 12, wherein said each of said link interfaces includes at least two of said optical fiber to physically transport said one of said data payload.

* * * * *